US012249261B2

(12) United States Patent
Kim et al.

(10) Patent No.: US 12,249,261 B2
(45) Date of Patent: Mar. 11, 2025

(54) DISPLAY DEVICE

(71) Applicant: LG ELECTRONICS INC., Seoul (KR)

(72) Inventors: Hoyoung Kim, Seoul (KR); Dongkyoon Han, Seoul (KR); Changwan Noh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 171 days.

(21) Appl. No.: 18/009,958

(22) PCT Filed: Jun. 12, 2020

(86) PCT No.: PCT/KR2020/007672
§ 371 (c)(1),
(2) Date: Dec. 12, 2022

(87) PCT Pub. No.: WO2021/251532
PCT Pub. Date: Dec. 16, 2021

(65) Prior Publication Data
US 2023/0343250 A1 Oct. 26, 2023

(51) Int. Cl.
*G09F 9/30* (2006.01)

(52) U.S. Cl.
CPC .................................... *G09F 9/301* (2013.01)

(58) Field of Classification Search
CPC ... G06F 1/1652; G06F 1/1601; H10K 77/111; H10K 2102/311; H10K 59/12; G09F 9/301; G09F 9/35; G09F 11/02; G09F 11/08; H05K 1/028; H05K 2201/051
See application file for complete search history.

(56) References Cited

U.S. PATENT DOCUMENTS

| | | | | |
|---|---|---|---|---|
| 2017/0156219 A1* | 6/2017 | Heo | ...................... | G06F 1/1679 |
| 2017/0325343 A1* | 11/2017 | Seo | .......................... | H05K 5/03 |
| 2018/0114471 A1* | 4/2018 | Park | ...................... | G06F 1/1652 |
| 2018/0160554 A1* | 6/2018 | Kang | .................. | H05K 5/0017 |

* cited by examiner

*Primary Examiner* — Jacob R Crum
(74) *Attorney, Agent, or Firm* — LEE, HONG, DEGERMAN, KANG & WAIMEY

(57) ABSTRACT

Disclosed is display device. The display device of the present disclosure includes: a flexible display panel; a roller around which the display panel is wound or from which the display panel is unwound; a base which extends in a longitudinal direction of the roller, and in which the roller is rotatably installed; a link mount supported by the base; a link which is pivotally connected to the link mount, and lifts the display panel; a pivot magnet fixed to a pivot center of the link; a magnetic sensor which detects a position of the pivot magnet; and a controller which controls a movement of the link, wherein when a position section of the pivot magnet is divided into an effective position section Ieff and an error position section Ierr, a position of the pivot magnet is changed within the effective position section, wherein the controller calculates angle information formed by the link with respect to the base from position information of the pivot magnet, and adjusts movement of the link based on the angle information.

16 Claims, 76 Drawing Sheets

(a)

(b)

(a)

(b)

(a)

(b)

DISPLAY DEVICE

CROSS-REFERENCE TO RELATED APPLICATIONS

This application is the National Stage filing under 35 U.S.C. 371 of International Application No. PCT/KR2020/007672, filed on Jun. 12, 2020, the contents of which are all incorporated by reference herein in their entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), and Vacuum Fluorescent Display (VFD) have been researched and used in recent years.

Among them, a display device using an organic light emitting diode (OLED) has superior luminance characteristics and viewing angle characteristics compared to a liquid crystal display device, and can be implemented in an ultra-thin shape as it does not require a backlight unit.

In addition, a flexible display panel can be bent or wound on a roller. By using the flexible display panel, it is possible to implement a display device that is roll out from a roller or wound on a roller. A lot of research has been done on a structure for winding or unwinding a flexible display panel on/from a roller.

DISCLOSURE

Technical Problem

An object of the present disclosure is to solve the above and other problems.

Another object of the present disclosure may be to provide a display device capable of minimizing an error in movement of a link that winds a display panel around a roller or unwinds the display panel from the roller.

Another object of the present disclosure may be to provide a display device capable of continuously detecting and adjusting a movement of a link that winds a display panel around a roller or unwinds the display panel from the roller.

Another object of the present disclosure may be to provide a display device capable of comparing and adjusting angles of a right link and a left link that wind a display panel around a roller or unwind the display panel from the roller.

Technical Solution

According to an aspect of the present disclosure for achieving the above object, there is provided a display device including: a flexible display panel; a roller around which the display panel is wound or from which the display panel is unwound; a base which extends in a longitudinal direction of the roller, and in which the roller is rotatably installed; a link mount supported by the base; a link which is pivotally connected to the link mount, and lifts the display panel; a pivot magnet fixed to a pivot center of the link; a magnetic sensor which detects a position of the pivot magnet; and a controller which controls a movement of the link, wherein when a position section of the pivot magnet is divided into an effective position section Ieff and an error position section Ierr, a position of the pivot magnet is changed within the effective position section, wherein the controller calculates angle information formed by the link with respect to the base from position information of the pivot magnet, and adjusts movement of the link based on the angle information.

Advantageous Effects

The effect of the display device according to the present disclosure will be described as follows.

According to at least one of the embodiments of the present disclosure, there is provided a display device capable of minimizing variation in movement of a display panel that is repeatedly wound around or unwound from a roller.

According to at least one of the embodiments of the present disclosure, there is provided a display device capable of continuously detecting and adjusting the movement of a display panel that is wound around or unwound from a roller.

According to at least one of the embodiments of the present disclosure, there is provided a display device capable of detecting and adjusting a left or right inclination of a display panel that is wound around or unwound from a roller.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Figure 1:
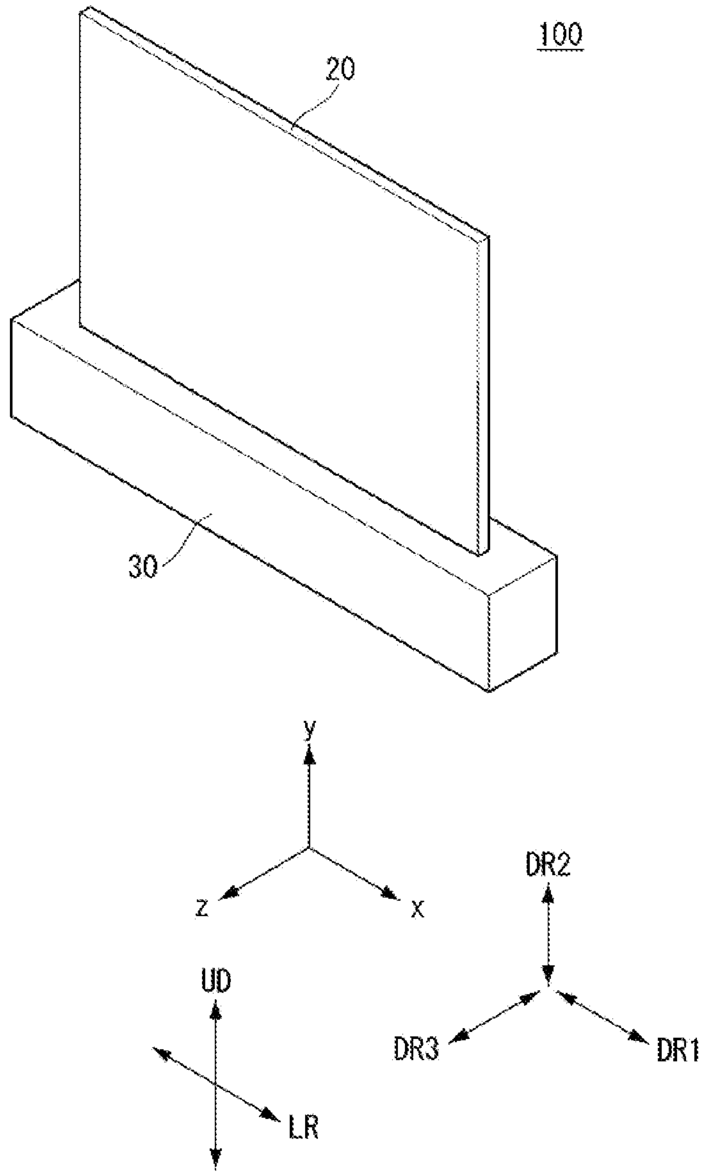
FIGS. 1 to 81 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Referring to FIG. 1, a display device 100 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

A direction parallel to the length direction of the housing 30 may be referred to as a first direction DR1, +x-axis direction, −x-axis direction, a left direction, or a right direction. A direction in which the display unit 20 displays a screen may be referred to as +z-axis, a front side direction, or a forward direction. A direction opposite to the direction in which the display unit 20 displays a screen may be referred to as a −z axis, a rear side direction, or a rearward direction. A third direction DR3 may be parallel to +z-axis direction or −z-axis direction. A direction parallel to a height direction of the display device 100 may be referred to as a second direction DR2, +y-axis direction, −y-axis direction, an upper direction, or a lower direction.

The third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. The left-right direction LR may be parallel to the first direction DR1, and the up-down direction UD may be parallel to the second direction DR2.

Figure 2:
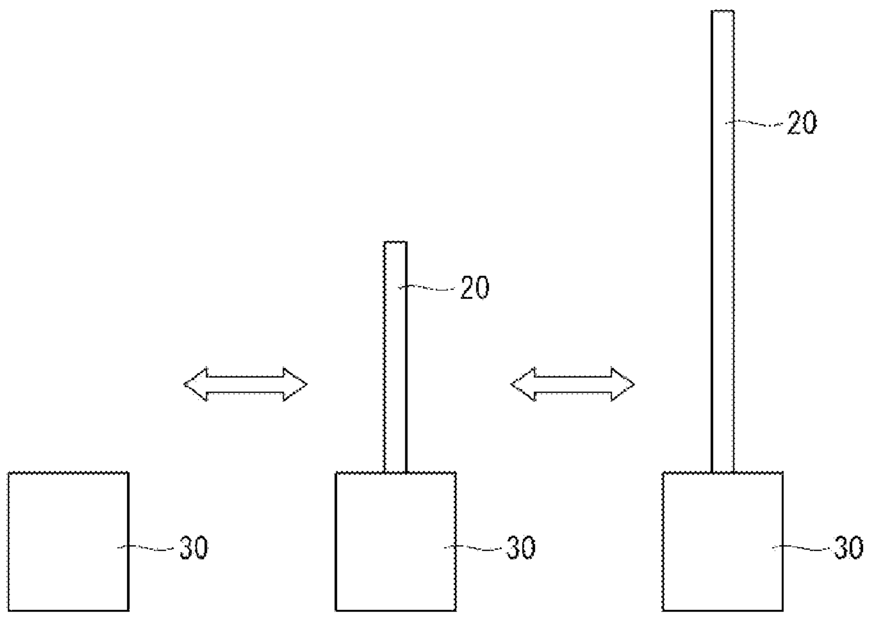

Referring to FIG. 2, the entire display unit 20 may be located inside the housing 30. At least a portion of the display unit 20 may be located outside the housing 30. The extent to which the display unit 20 is exposed to the outside of the housing 30 may be adjusted as necessary.

Figure 3:
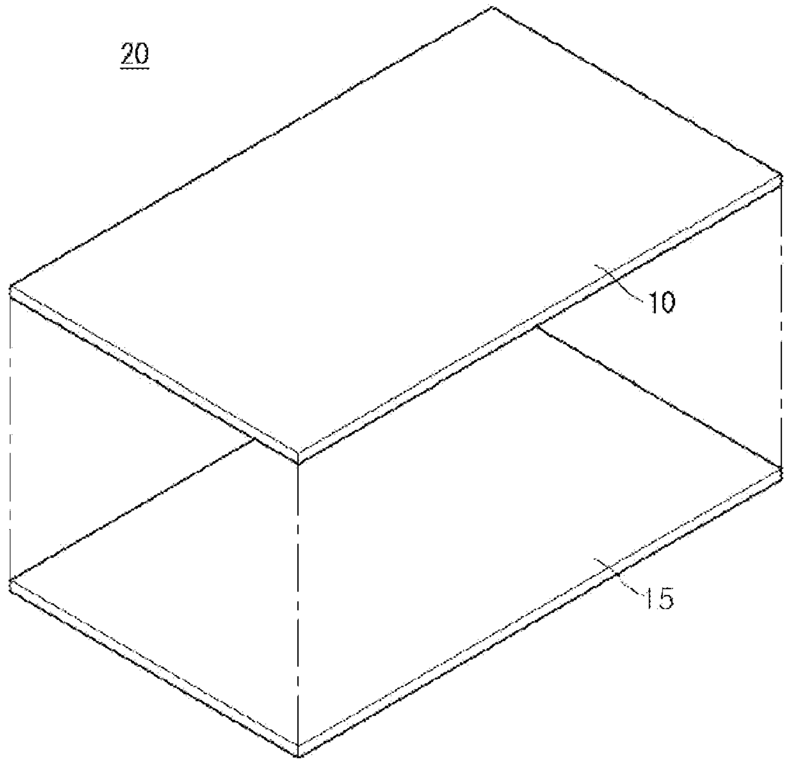

Referring to FIG. 3, the display unit 20 may include a display panel 10 and a plate 15. The display panel 10 may be flexible. For example, the display panel 10 may be an organic light emitting display (OLED).

The display panel 10 may have a front surface for displaying an image. The display panel 10 may have a rear surface opposite to the front surface. The front surface of the display panel 10 may be covered with a light-transmitting material. For example, the light-transmitting material may be a synthetic resin or a film.

The plate 15 may be coupled, fastened, or attached to the rear surface of the display panel 10. The plate 15 may include a metal material. The plate 15 may be referred to as a module cover 15, a cover 15, a display panel cover 15, a panel cover 15, or an apron 15.

Figure 4:
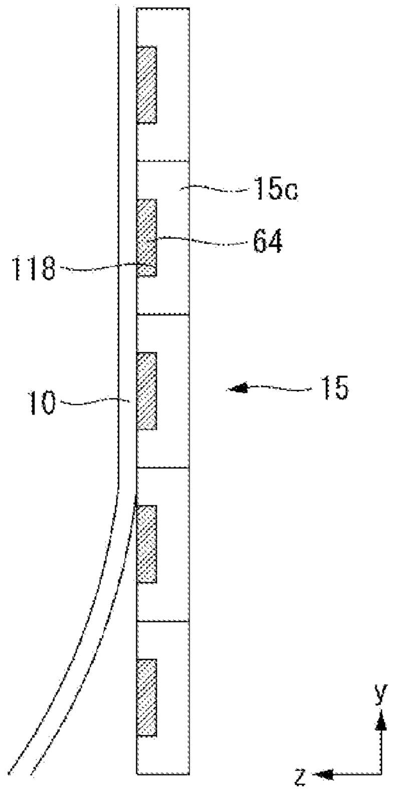

Referring to FIG. 4, the plate 15 may include a plurality of segments 15*c*. A magnet 64 may be located inside a recess 118 of the segment 15*c*. The recess 118 may be located on a surface of the segment 15*c* facing the display panel 10. The recess 118 may be located in the front surface of each segment 15*c*. Since the magnet 64 is received inside the recess 118, the magnet 64 may not protrude out of the segment 15*c*. The display panel 10 may be flat without being crumpled even when it comes into contact with the segment 15*c*.

Figure 5:
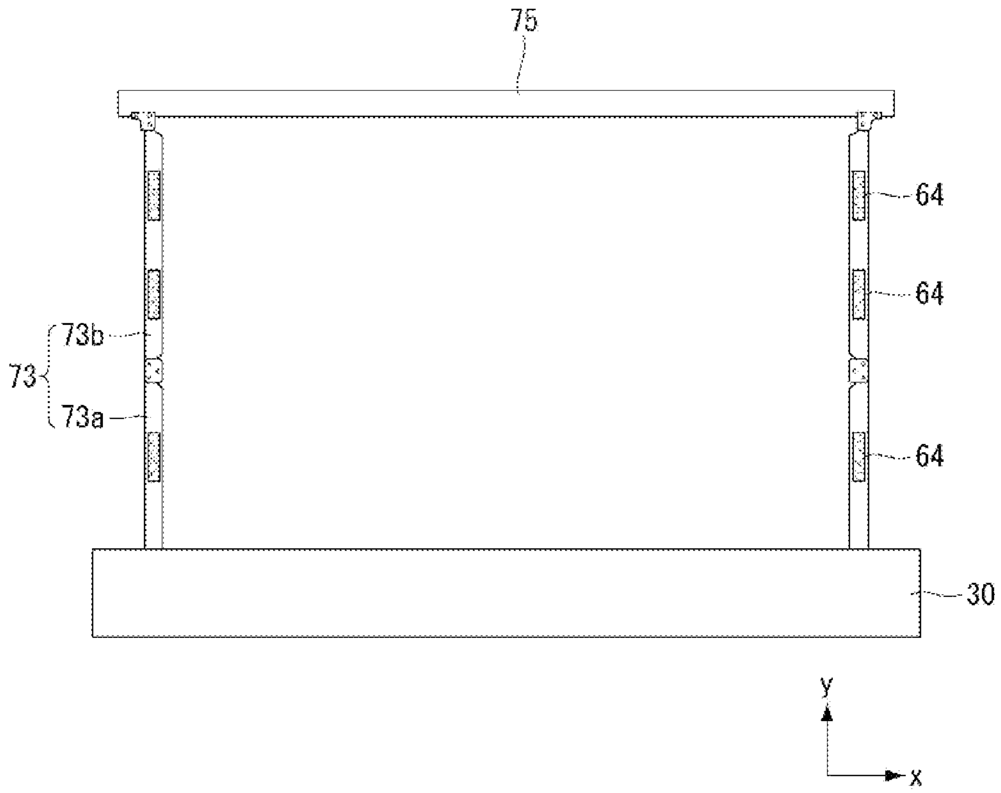

Referring to FIG. 5, a plurality of magnets 64 may be located on a link 73. For example, at least one magnet 64 may be located on a first arm 73*a* and at least one magnet 64 may be located on a second arm 73*b*. The plurality of magnets 64 may be spaced apart from each other.

Figure 6:
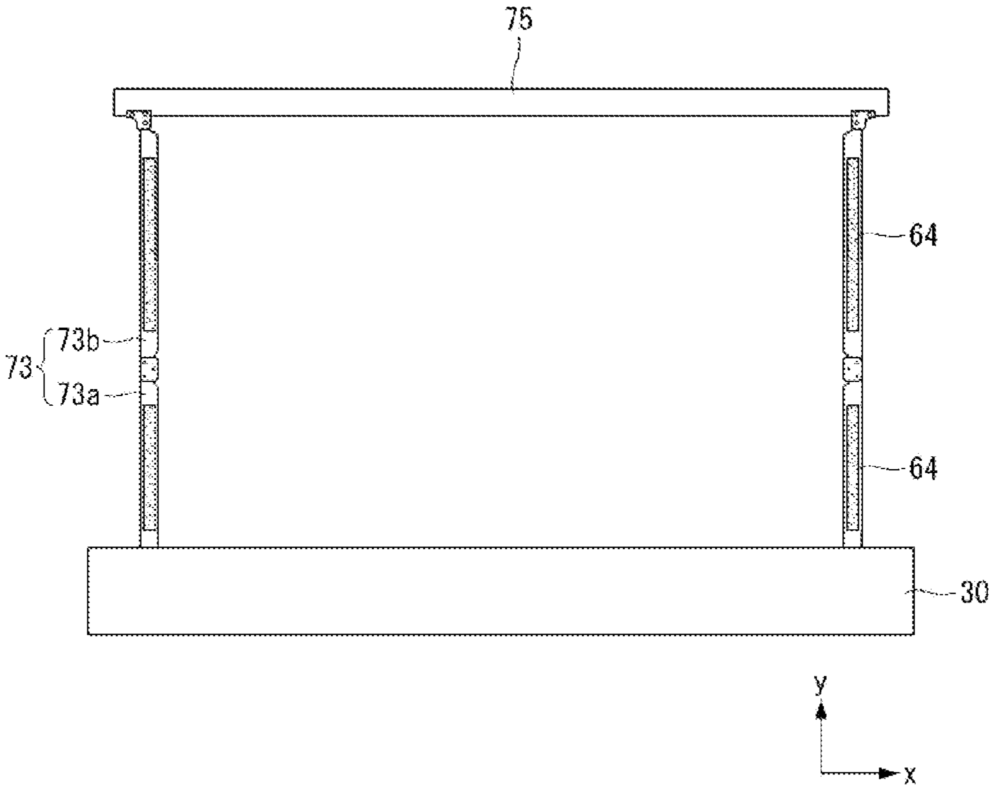

Referring to FIG. 6, one magnet 64 may be located on each of the first arm 73*a* and the second arm 73*b*. The magnet 64 may have a shape extending long in the direction of the long sides of the first arm 73*a* and the second arm 73*b*. Since the magnet 64 has a shape extending long in the direction of the long sides of the first arm 73*a* and the second arm 73*b*, the area of the part where the link 73 comes into close contact with the display panel and the module cover may be increased. Accordingly, adhesion between the link 73, the display panel, and the module cover may be strengthened.

Figure 7:
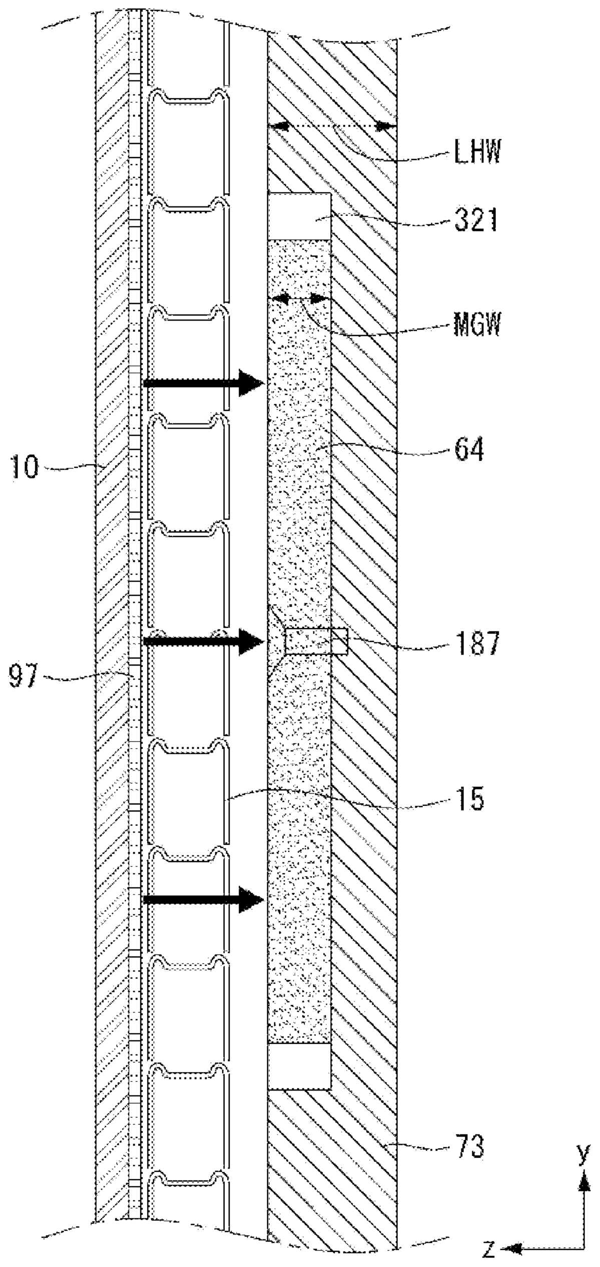

Referring to FIG. 7, the magnet 64 may be located in a recessed portion 321 formed on the link 73. The recessed portion 321 may have a shape recessed toward the inside of the link 73. The magnet 64 may be coupled to the link 73 through at least one screw 187.

A width (LHW) by which the recessed portion 321 is recessed into the link 73 may be equal to or greater than a thickness (MGW) of the magnet 64. If the thickness (MGW) of the magnet 64 is greater than the width (LHW) of the recessed portion 321, the display panel 10 and the module cover 15 may not come into close contact with the link 73. In this case, the display panel 10 may be wrinkled or not flat.

A panel protection part 97 may be located in the rear surface of the display panel 10. The panel protection part 97 can prevent the display panel 10 from being damaged due to friction with the module cover 15. The panel protection part 97 may include a metal material. The panel protection part 97 may have a very thin thickness. For example, the panel protection part 97 may have a thickness of about 0.1 mm.

Since the panel protection part 97 includes a metal material, mutual attraction with the magnet 64 may act. Accordingly, the module cover 15 located between the panel protection part 97 and the link 73 may be in close contact with the magnet 64 even if it does not contain a metal material.

Figure 8:
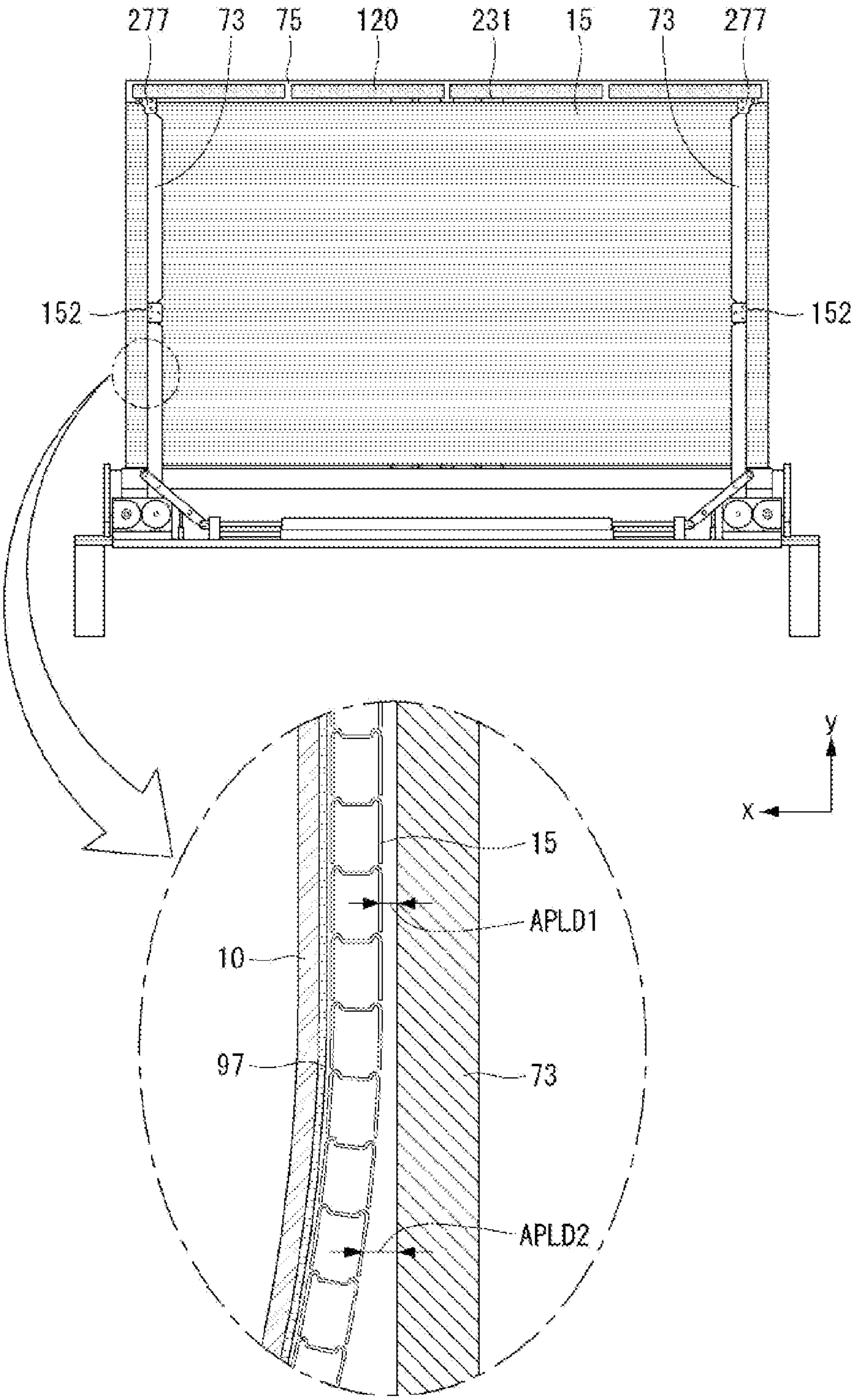

Referring to FIG. 8, the module cover 15 may be in close contact with the link 73 by an upper bar 75 in the upper side and a guide bar 234 (see FIG. 15) in the lower side. A portion of the link 73 between the upper bar 75 and the guide bar 234 may not come into close contact with the module cover 15. Alternatively, a central portion of the link 73 may not come into close contact with the module cover 15. The central portion of the link 73 may be near an arm joint 152. In this case, the distances APRD1, APLD2 between the module cover 15 and the link 73 may not be constant. In this case, the display panel 10 may be bent or crooked.

Figure 9:
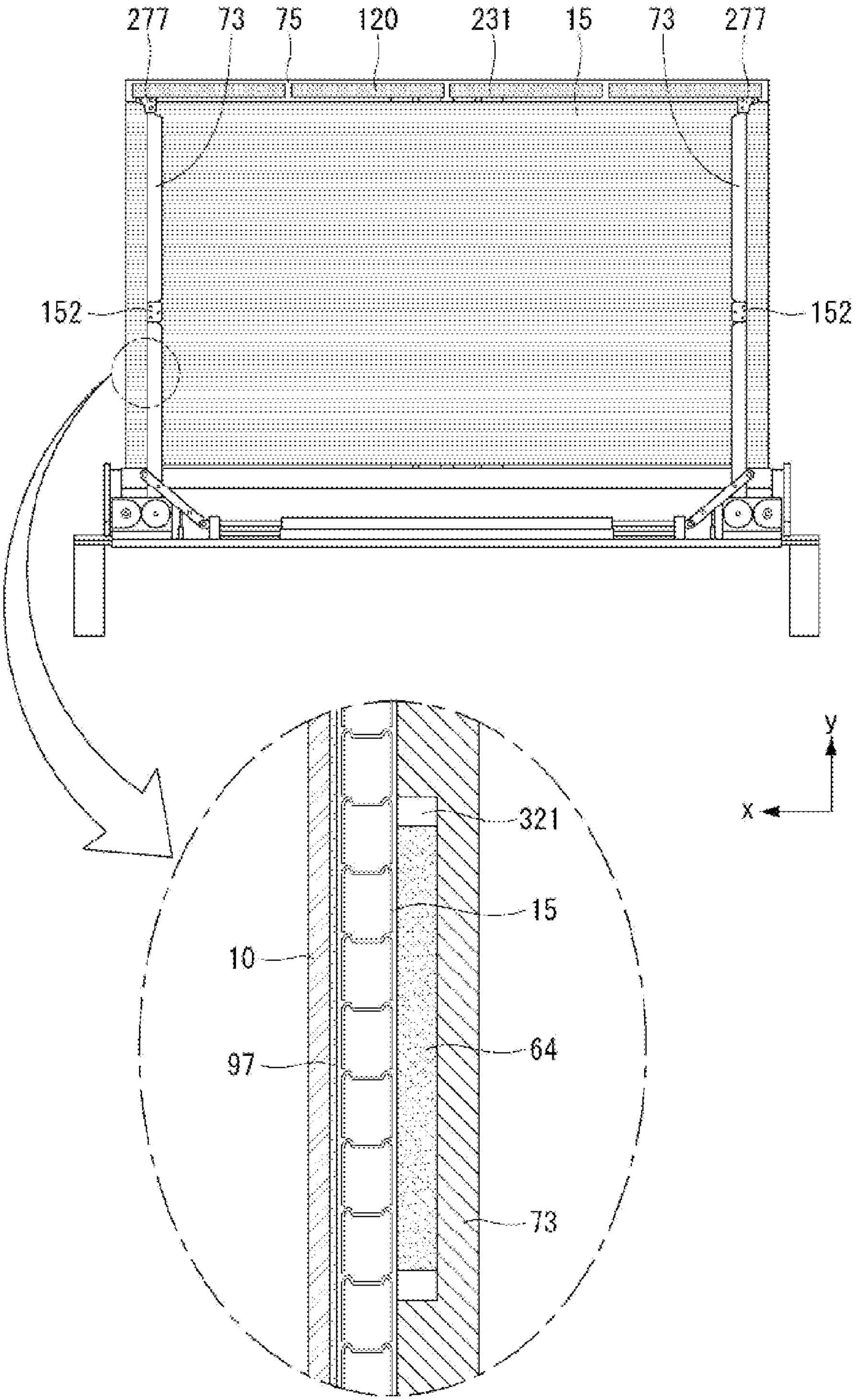

Referring to FIG. 9, when the magnet 64 is located on the recessed portion 321 of the link 73, the magnet 64 attracts the panel protection part 97. Thus, the module cover 15 also comes into close contact with the magnet 64 at the same time. That is, the central portion of the link 73 may be in close contact with the module cover 15.

Figure 10:
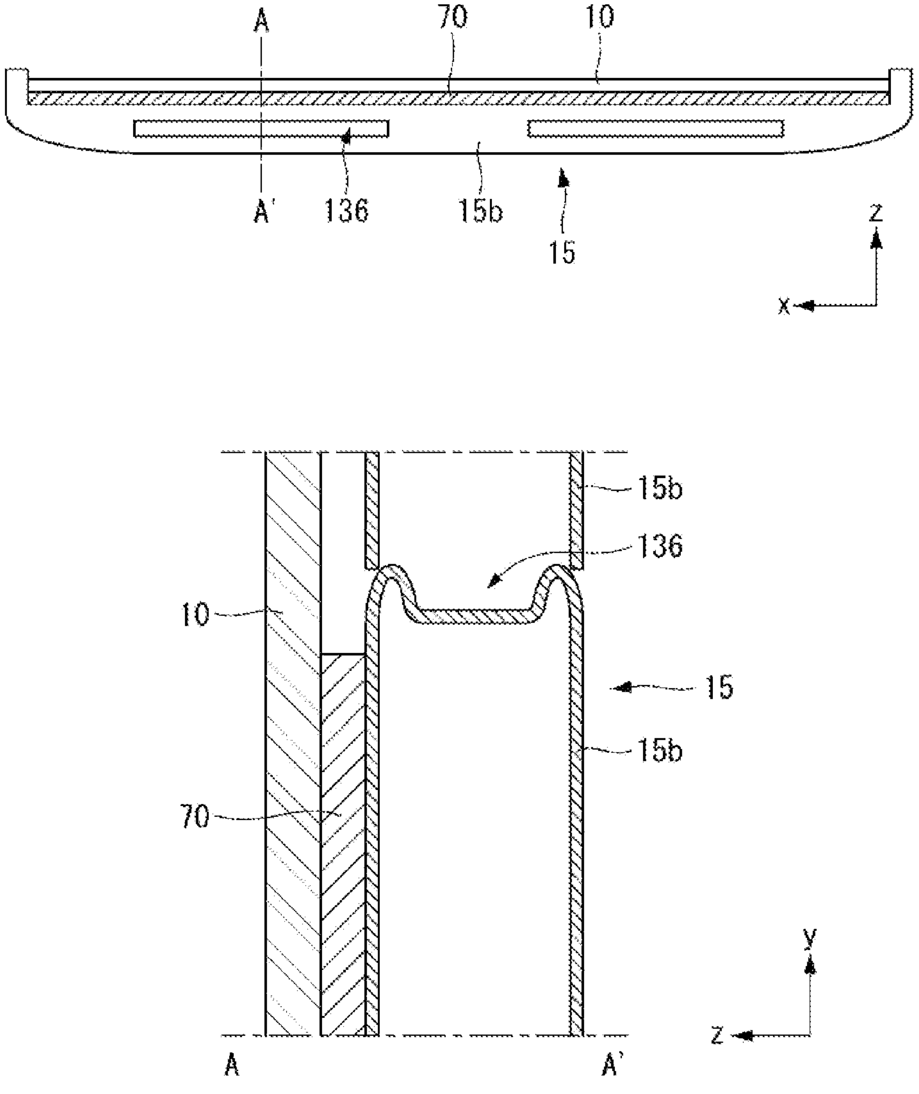

Referring to FIG. 10, a bead 136 may be formed on the upper surface of the segment 15*b*. The bead 136 may have a shape recessed to the inside of the segment 15*b*. The bead 136 may have a shape that is recessed in the −y axis direction. For example, the bead 136 may be formed by pressing the segment 15*b*. A plurality of beads 27 may be formed in the segment 15*b*. The plurality of beads 27 may be spaced apart from each other. The bead 136 may improve the rigidity of the segment 15*b*. The bead 136 may prevent the shape of the segment 15*b* from being deformed from an external impact.

Figure 11:
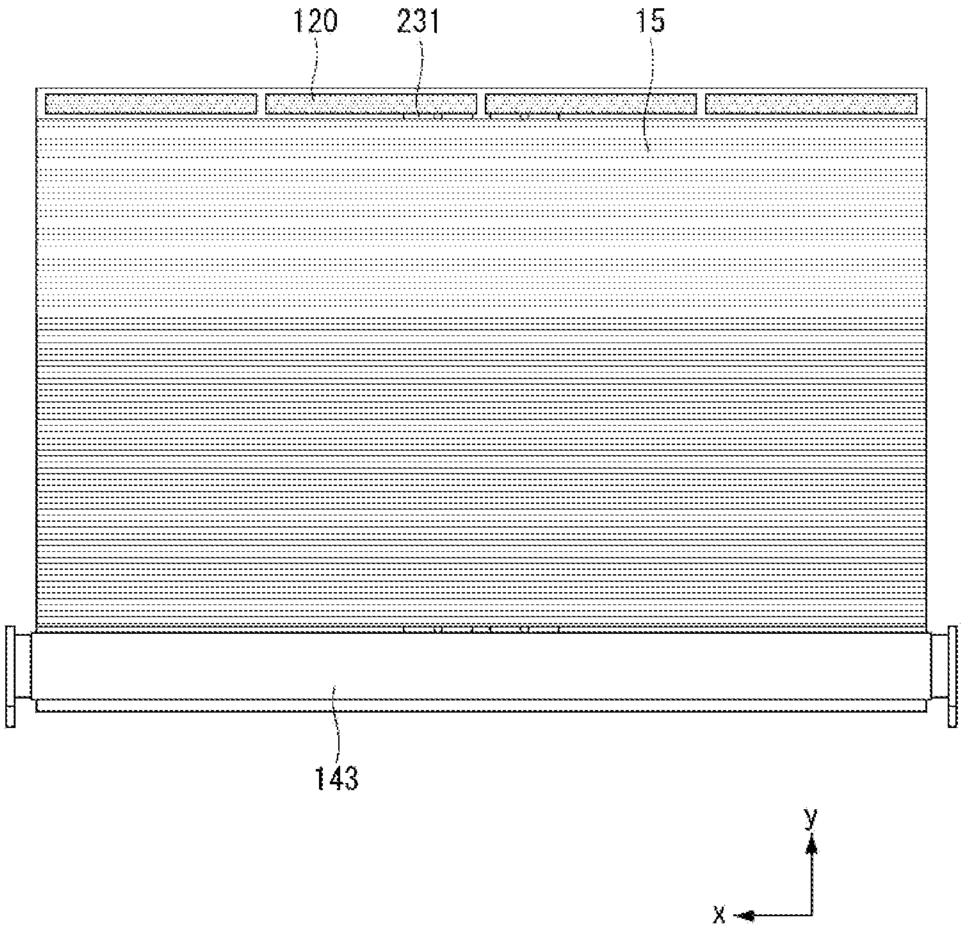

Referring to FIG. 11, a source PCB 120 may be located in the upper side of the module cover 15. When the source PCB 120 is rolled down or rolled up, its position may change with the movement of the module cover 15. A FFC cable 231 may be located in the center of the module cover 15 based on a first direction. The FFC cable 231 may be located in opposite ends of the module cover 15 based on the first direction.

Figure 12:
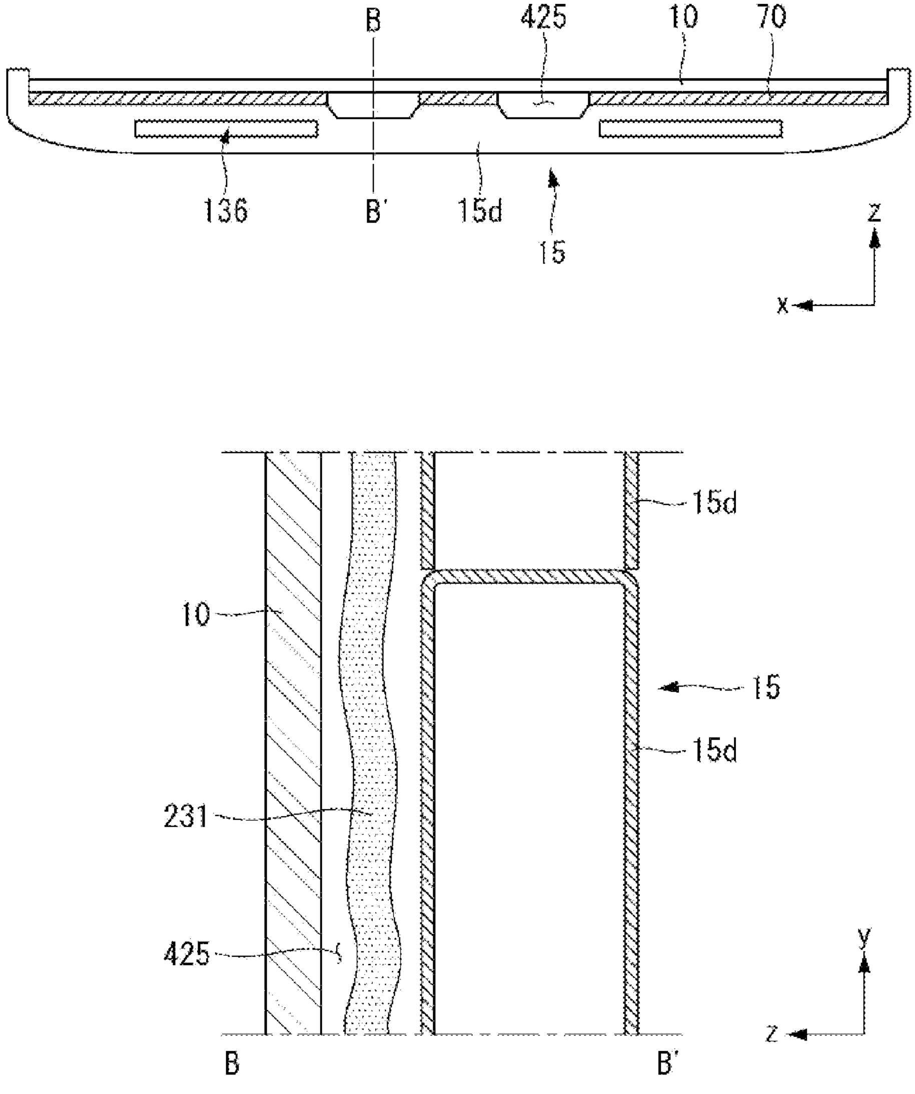

Referring to FIG. 12, the segment 15*d* may include a recessed portion 425 recessed in the −z-axis direction. The recessed portion 425 may form a space between the display panel 10 and the module cover 15. The FFC cable 231 may be accommodated in a space formed by the recessed portion 425. In addition, the recessed portion 425 may improve the rigidity of the segment 15*d*.

The bead 136 may be located on the segment 15*d* excluding a part where the recessed portion 425 is located. Since the thickness of the segment 15*d* in the third direction becomes thin at the part where the recessed portion 425 is located, the bead 136 may not be located.

Figure 13:
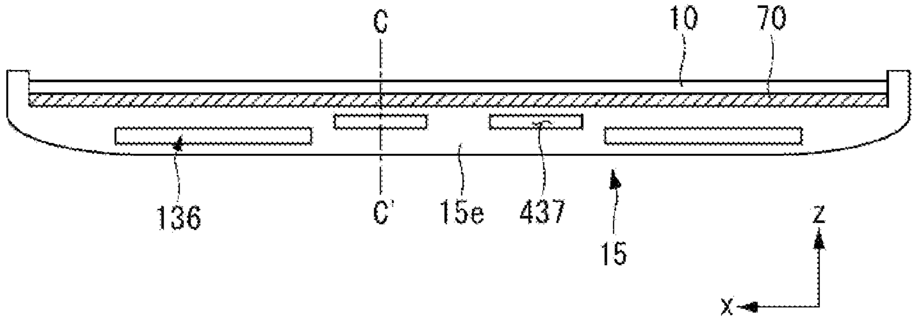
Figure 13:
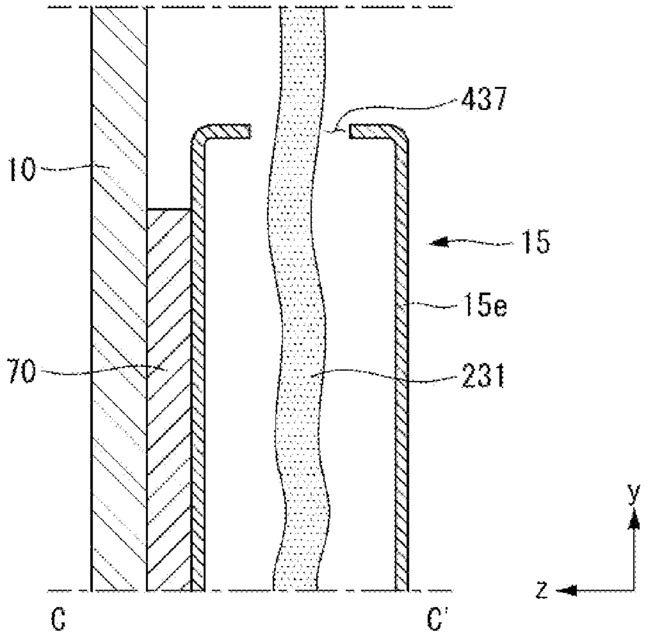

Referring to FIG. 13, in the segment 15*e*, a penetrating portion 437 may be located in a central portion of the segment 15*e* based on the first direction. The penetrating portion 437 may penetrate the central portion of the segment 15*e* in the second direction. That is, the penetrating portion 437 may be a hole located in the segment 15*e*. The penetrating portion 437 may be a portion in which the FFC cable 231 is located. Since the penetrating portion 437 is formed in the segment 15*e*, the thickness of the segment 15*e* can be reduced in comparison with a case where the FFC cable 231 is located in the recess portion 425. The bead 136 may be located in the segment 15*e* excluding a portion where the penetrating portion 437 is located. Since the thickness of the segment 15*e* in the third direction is thin at the part where the through portion 437 is located, the bead 136 may not be located.

Figure 14:
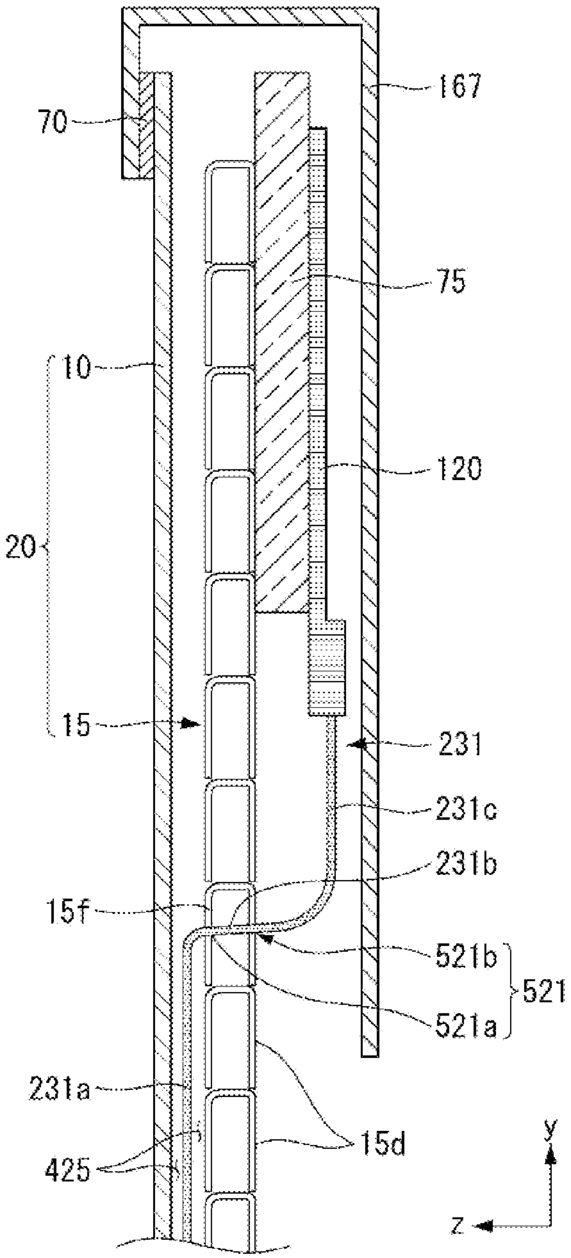

Referring to FIG. 14, a top case 167 may cover the display panel 10 and the module cover 15 as well as the source PCB 120 and an upper bar 75. One surface of the upper bar 75 may be coupled to the rear surface of the module cover 15, and the other surface may be coupled to the source PCB 120. The upper bar 75 may be fixed to the module cover 15 to support the source PCB 120.

Figure 15:
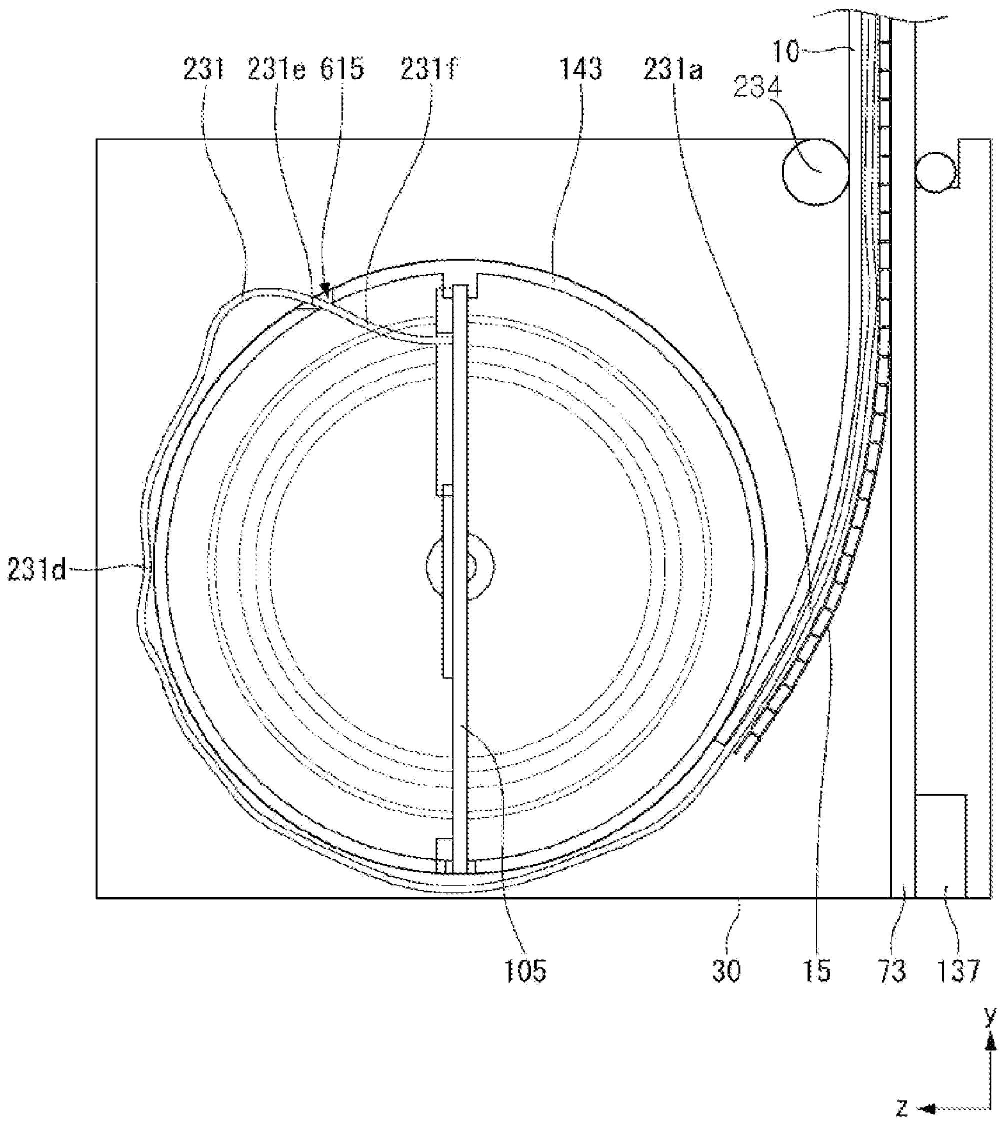

The lower end of the FFC cable 231 may be connected to a timing controller board 105 (see FIG. 15) inside a panel roller 143 (see FIG. 15). The FFC cable 231 may be wound around or unwound from the panel roller 143 together with the display unit 20.

A part of the FFC cable 231 may be located between the display panel 10 and the module cover 15. The part of the FFC cable 231 located between the display panel 10 and the module cover 15 may be referred to as a first portion 231*a*. The first portion 231*a* may be located in the recess portion 425 formed by the plurality of segments 15*d*. Alternatively, the first portion 231*a* may be received in the recess portion 425 formed by the plurality of segments 15*d*.

The part of the FFC cable 231 may penetrate the segment 15*f*. The part of the FFC cable 231 that penetrates the segment 15*f* may be referred to as a second portion 231*b*. The segment 15*f* may include a first hole 15*fh*1 formed on the front surface and a second hole 15*fh*2 formed on the rear surface. The first hole 15*fh*1 and the second hole 15*fh*2 may be interconnected to form one hole 15*fh*. The hole 15*fh* may penetrate the segment 15*f* in a third direction. The second portion 231*b* may penetrate the hole 15*fh*. The hole 15*fh* may be referred to as a connection hole 15*fh*.

An upper end of the FFC cable 231 may be electrically connected to the source PCB 120. The part of the FFC cable 231 may be located on the rear surface of the module cover 15. The part of the FFC cable 231 located on the rear surface of the module cover 15 may be referred to as a third portion 231*c*. The third portion 231*c* may be electrically connected to the source PCB 120.

The third portion 231*c* may be covered by the top case 167. Accordingly, the third portion 231*c* may not be exposed to the outside.

Referring to FIG. 15, the FFC cable 231 may be connected to the timing controller board 105 mounted on the panel roller 143. A through hole 615 may be formed in the panel roller 143, and the FFC cable 231 may be connected to the timing controller board 105 through the through hole 615.

The through hole 615 may be located in one side of the panel roller 143 and may penetrate the outer circumferential portion of the panel roller 143. The FFC cable 231 may be connected to one side of the timing controller board 105 through the through hole 615.

Even if the FFC cable 231 is located on the outer perimeter of the panel roller 143, the connection to the timing controller board 105 may be maintained due to the through hole 615. Accordingly, the FFC cable 231 may not be twisted by rotating together with the panel roller 143.

The part of the FFC cable 231 may be wound around the panel roller 143. The part of the FFC cable 231 wound around the panel roller 143 may be referred to as a fourth portion 231*d*. The fourth portion 231*d* may be in contact with the circumferential surface of the panel roller 143.

The part of the FFC cable 231 may pass through the through hole 615. The part of the FFC cable 231 passing through the through hole 615 may be referred to as a fifth portion 231*e*.

A lower end of the FFC cable 231 may be electrically connected to the timing controller board 105. The part of the FFC cable 231 may be located inside the panel roller 143. The part of the FFC cable 231 located inside the panel roller 143 may be referred to as a sixth portion 231*f*. The sixth portion 231*f* may be electrically connected to the timing controller board 105.

Figure 16:
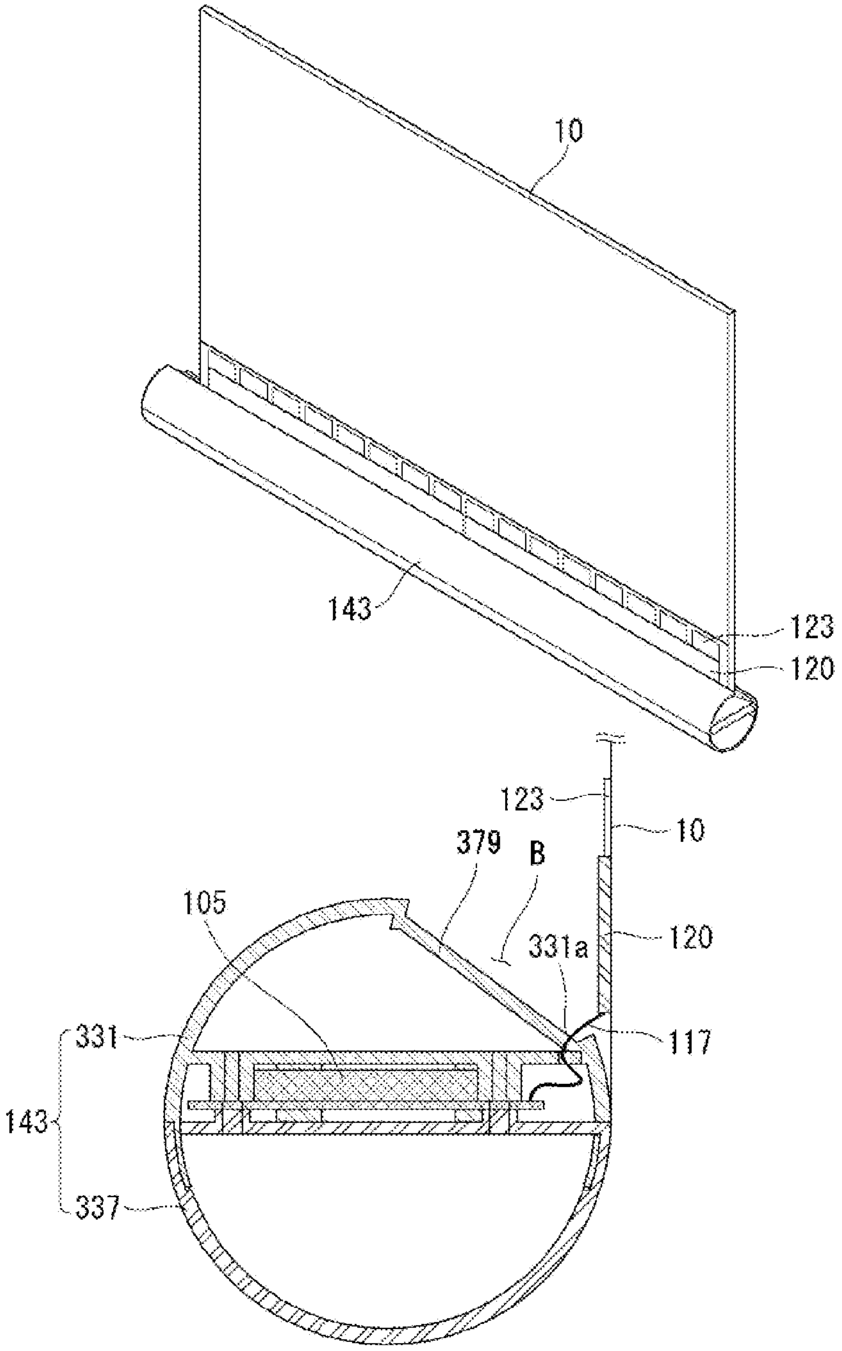

Referring to FIG. 16, the lower end of the display panel 10 may be connected to the roller 143. The display panel 10 may be wound around or unwound from the roller 143. The front surface of the display panel 10 may be electrically connected to the plurality of source PCBs 120. The plurality of source PCBs 120 may be spaced apart from each other.

A source chip on film (COF) 123 may connect the display panel 10 and the source PCB 120. The source COF 123 may be located in the front surface of the display panel 10. The roller 143 may include a first part 331 and a second part 337. The first part 331 and the second part 337 may be fastened by a screw. The timing controller board 105 may be mounted inside the roller 143.

The source PCB 120 may be electrically connected to the timing controller board 105. The timing controller board 105 may transmit digital video data and a timing control signal to the source PCB 120.

A cable 117 may electrically connect the source PCB 120 and the timing controller board 105. For example, the cable

117 may be a flexible flat cable (FFC). The cable 117 may pass through the hole 331*a*. The hole 331*a* may be formed in a seating portion 379 or in the first part 331. The cable 117 may be located between the display panel 10 and the second part 337.

The seating portion 379 may be formed in the outer perimeter of the first part 331. The seating portion 379 may be formed by stepping a portion of the outer perimeter of the first part 331. The seating portion 379 may form a space B. When the display unit 20 is wound around the roller 143, the source PCB 120 may be received in the seating portion 379. Since the source PCB 120 is received in the seating portion 379, it may not be bent or crooked, and durability may be improved.

The cable 117 may electrically connect the timing controller board 105 and the source PCB 120.

Figure 17:
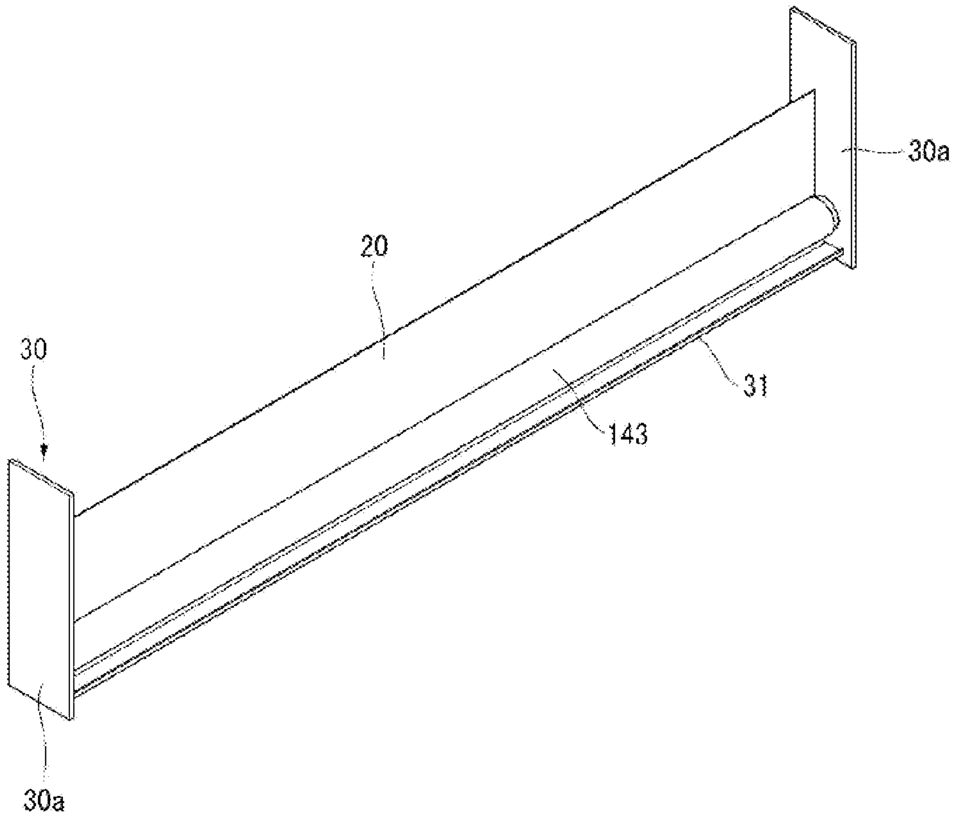

Referring to FIG. 17, the roller 143 around which the display unit 20 is wound may be installed in a first base 31. The first base 31 may be a lower surface of the housing 30. The roller 143 may extend long along the longitudinal direction of the housing 30. The first base 31 may be connected to the side surface 30*a* of the housing 30.

Figure 18:
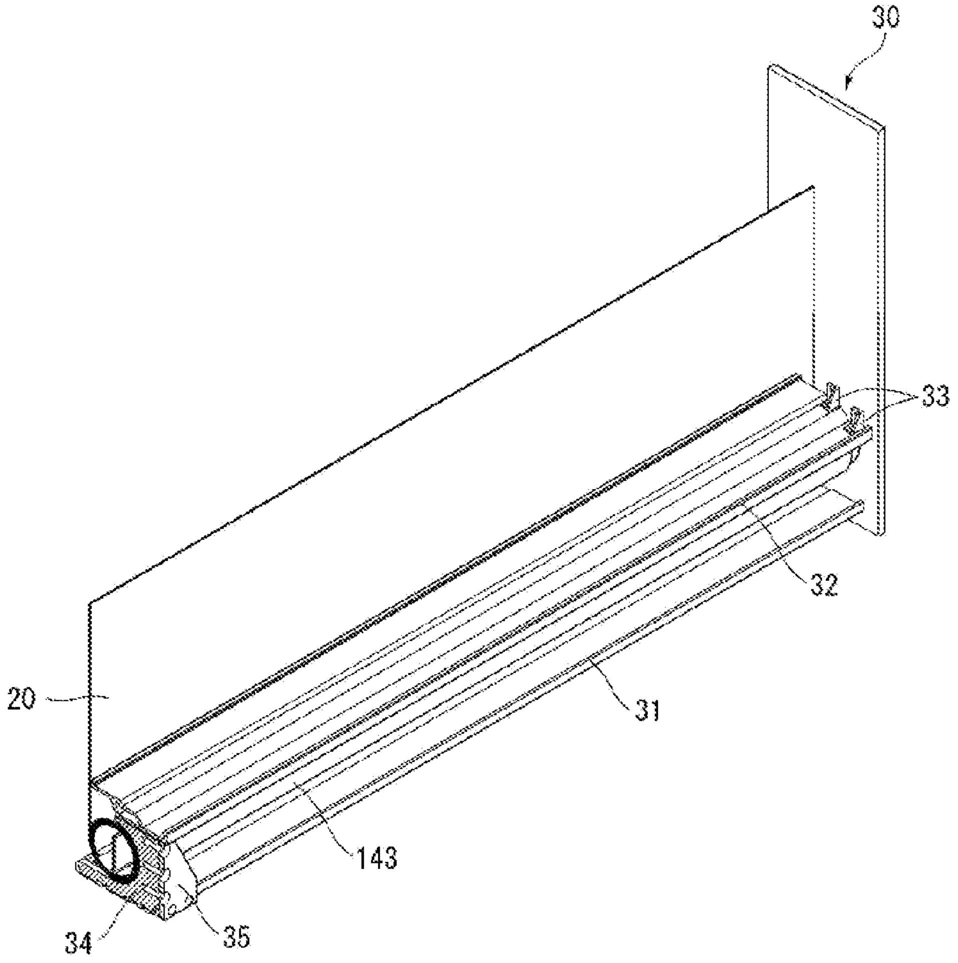
Figure 19:
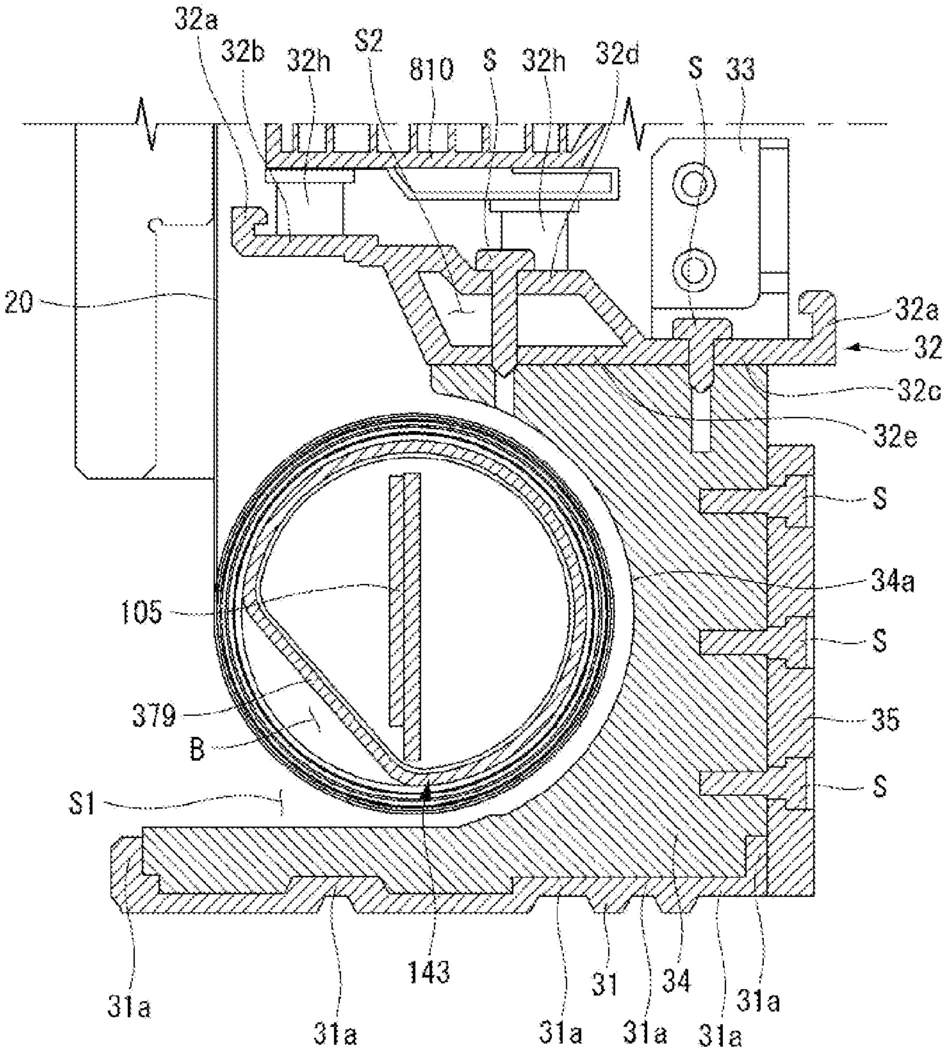

Referring to FIGS. 18 and 19, a beam 31*a* may be formed on the first base 31. The beam 31*a* may improve bending or torsional rigidity of the first base 31. Many parts can be installed in the first base 31, and the first base 31 may receive a large load. As rigidity of the first base 31 is improved, sagging due to a load may be prevented. For example, the beam 31*a* may be formed by a press process.

A second base 32 may be spaced apart toward the upper side of the first base 31. A space S1 may be formed between the first base 31 and the second base 32. The roller 143 around which the display unit 20 is wound may be accommodated in the space S1. The roller 143 may be located between the first base 31 and the second base 32.

The second base 32 may be connected to the side surface 30*a* of the housing 30. A bracket 33 may be fastened to the upper surface of the first base 31. The bracket 33 may be fastened to the side surface 30*a* of the housing 30.

The beam 32*a* may be formed in second base 32. The beam 32*a* may improve the bending or torsional rigidity of the second base 32. For example, the beam 32*a* may be formed by a press process.

A third part 32*d* may be connected to a first part 32*b* and a second part 32*c*. A fourth part 32*e* may be connected to the first part 32*b* and the second part 32*c*. A space S2 may be formed between the third part 32*d* and the fourth part 32*e*. Accordingly, the bending or torsional rigidity of the second base 32 may be improved. The third part 32*d* may be referred to as a reinforcing rib 32*d* or a rib 32*d*. The fourth part 32*e* may be referred to as a reinforcing rib 32*e* or a rib 32*e*.

Many parts can be installed in the second base 32, and the second base 32 may receive a large load. As rigidity of the second base 32 is improved, sagging due to a load may be prevented.

A first reinforcing plate 34 may be located between the first base 31 and the second base 32. The first reinforcing plate 34 and the second base 32 may be fastened by a screw. The first reinforcing plate 34 may support the second base 32. The first reinforcing plate 34 may prevent the second base 32 from sagging. The first reinforcing plate 34 may be located in the central portion of the first base 31 or the central portion of the second base 32. The first reinforcing plate 34 may include a curved portion 34*a*. A curved portion 34*a* may be formed along the roller 143. The curved portion 34*a* may not contact the roller 143 or the display unit 20 wound around the roller 143. The curved portion 34*a* may maintain a certain distance from the roller 143 so as not to interfere with the rotation of the roller 143.

A second reinforcing plate 35 may be fastened to the first base 31 and the first reinforcing plate 34. The second reinforcing plate 35 may support the first reinforcing plate 34. The second reinforcing plate 35 may be located in a rearward direction of the first reinforcing plate 34. The second reinforcing plate 35 may be located in a rearward direction of the first base 31. The second reinforcing plate 35 may be located perpendicular to the first base 31. The second reinforcing plate 35 may be fastened to the beam 31*a* of the first base 31. The second base 32 may face the front or rear surface of the housing 30.

Figure 20:
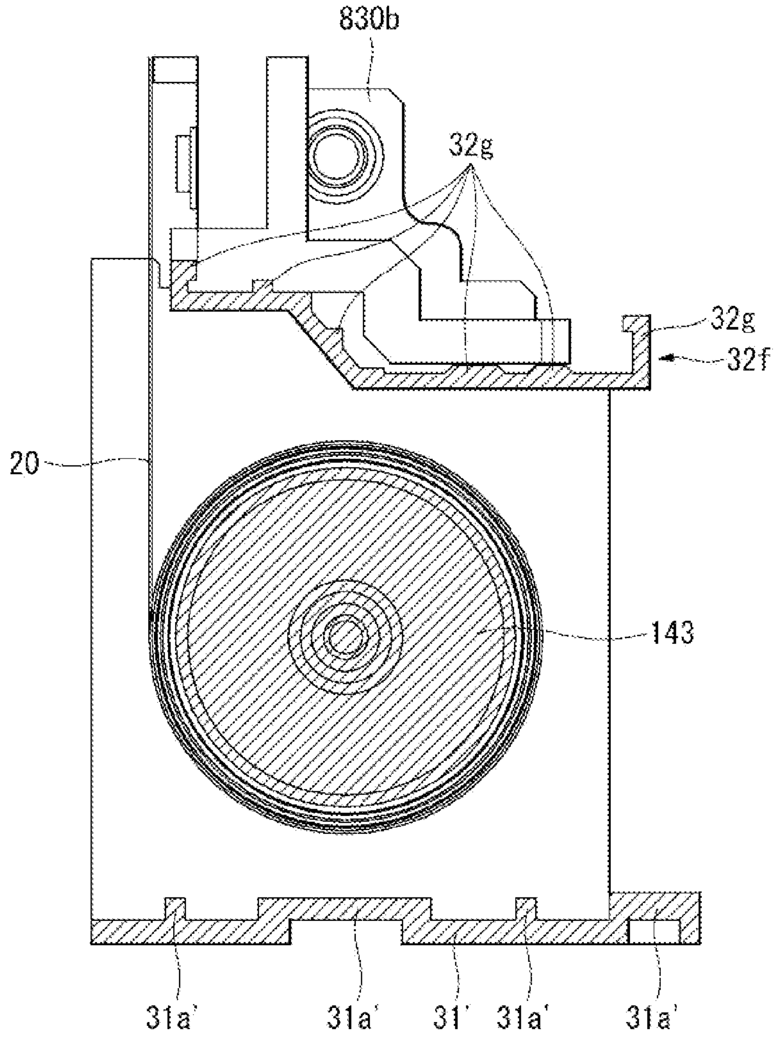

Referring to FIG. 20, the second base 32*f* may not form a space. When the load applied to the second base 32*f* is not large, the second base 32*f* may have sufficient rigidity by including the beam 32*g*. A first base 31' may include a beam 31*a'*.

Figure 21:
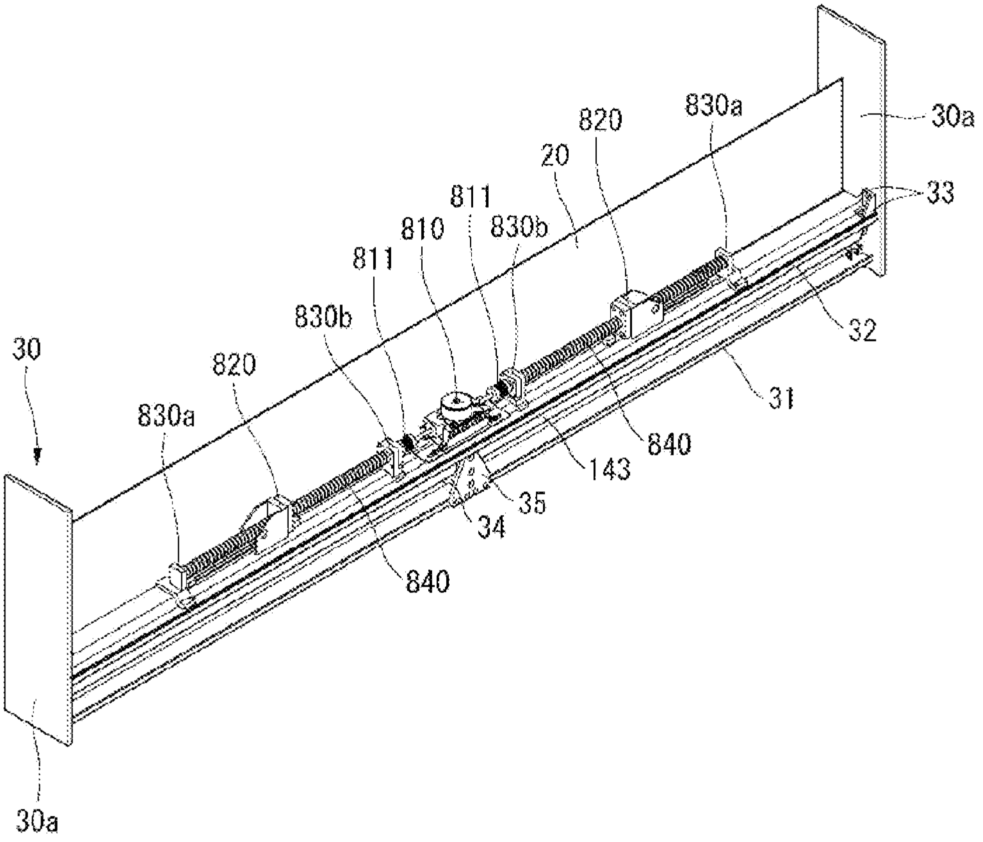
Figure 22:
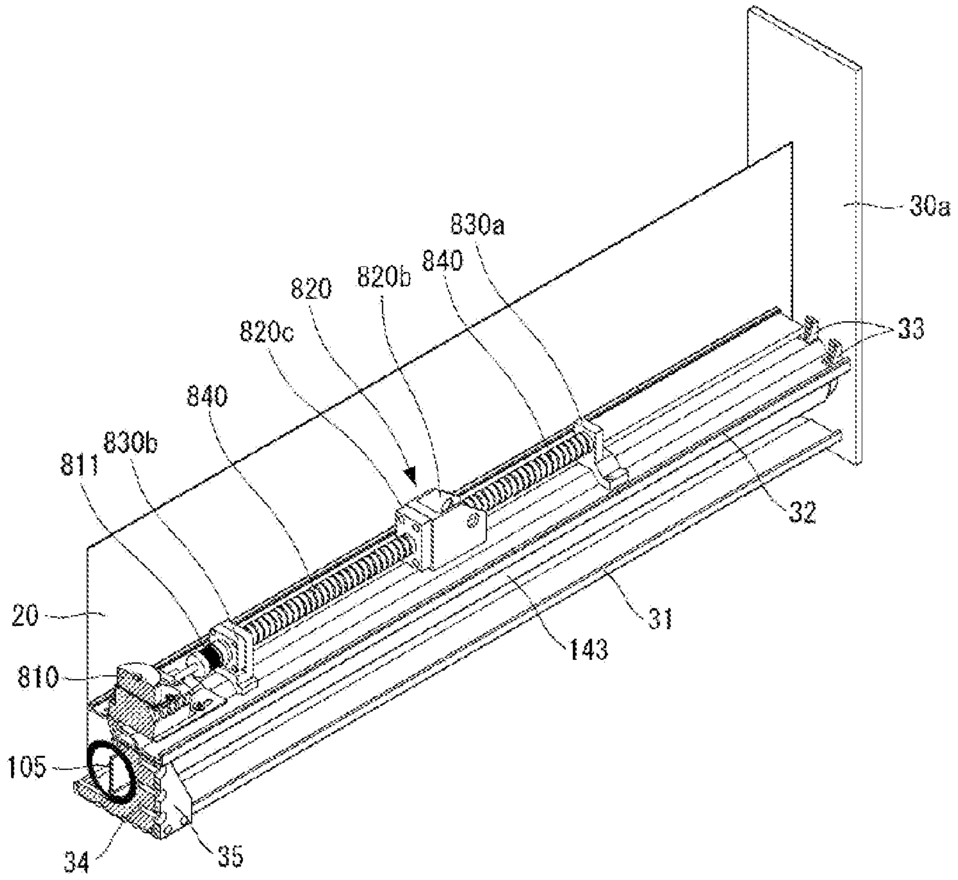

Referring to FIGS. 21 and 22, a motor assembly 810 may be installed in the second base 32. Driving shafts of the motor assembly 810 may be formed in both sides. A right driving shaft and a left driving shaft of the motor assembly 810 may rotate in the same direction. Alternatively, the right driving shaft and the left driving shaft of the motor assembly 810 may rotate in opposite directions.

The motor assembly 810 may include a plurality of motors. A plurality of motors may be connected in series with each other. The motor assembly 810 may output high torque by connecting a plurality of motors in series.

A lead screw 840 may be located in the left and right sides of the motor assembly 810, respectively. The motor assembly 810 may be connected to a lead screw 840. A coupling 811 may connect the lead screw 840 and the driving shaft of the motor assembly 810.

The lead screw 840 may have a screw thread formed along the longitudinal direction. The direction of the screw thread formed in a right lead screw 840 and the direction of the screw thread formed in a left lead screw 840 may be opposite to each other. The direction of the screw thread formed in the right lead screw 840 and the direction of the screw thread formed in the left lead screw 840 may be the same. Pitches of the left lead screw 840 and the right lead screw 840 may be the same.

A bearing 830*a*, 830*b* may be installed in the second base 32. The bearing 830*a*, 830*b* may support both sides of lead screw 840. The bearing 830*a*, 830*b* may include an inner bearing 830*b* located close to the motor assembly 810 and an outer bearing 830*a* located farther from the motor assembly 810. The lead screw 840 may stably rotate by the bearing 830*a*, 830*b*.

A slide 820 may be engaged with the lead screw 840. The slide 820 may move forward and rearward in the longitudinal direction of the lead screw 840 according to the rotation of the lead screw 840. The slide 820 may move between an outer bearing 830*a* and an inner bearing 830*b*. The slide 820 may be located in the left lead screw 840 and the right lead screw 840 respectively. The left slide 820 may be engaged with the left lead screw 840. The right slide 820 may be engaged with the right lead screw 840.

The left slide 820 and the right slide 820 may be located symmetrically with respect to the motor assembly 810. Due to the driving of the motor assembly 810, the left slide 820 and the right slide 820 may move apart or close to each other by the same distance.

Figure 23:
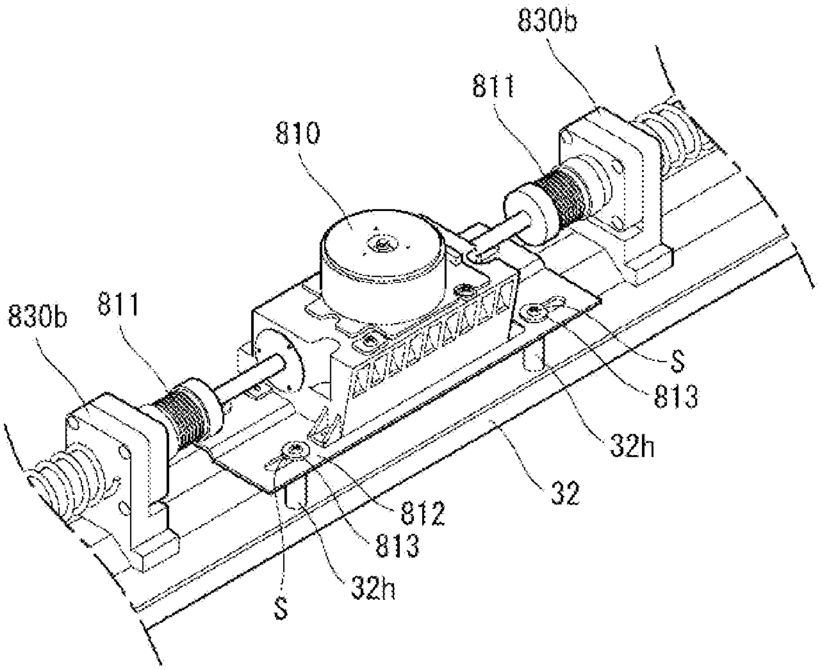

Referring to FIG. 23, the motor assembly 810 may include a plate 813. The plate 813 may be referred to as a mount plate 813 or a motor mount plate 813. A coupling portion 32h may be formed on the upper surface of the second base 32. The plate 813 may be fastened to the coupling portion 32h through a screw S. The motor assembly 810 may be spaced apart from the upper surface of the second base 32. The washer 813 may be located between the upper surface of the plate 813 and the screw S. The washer 813 may include a rubber material. The washer 813 may reduce vibration generated from the motor assembly 810. The washer 813 may improve driving stability of the display device 100.

Figure 24:
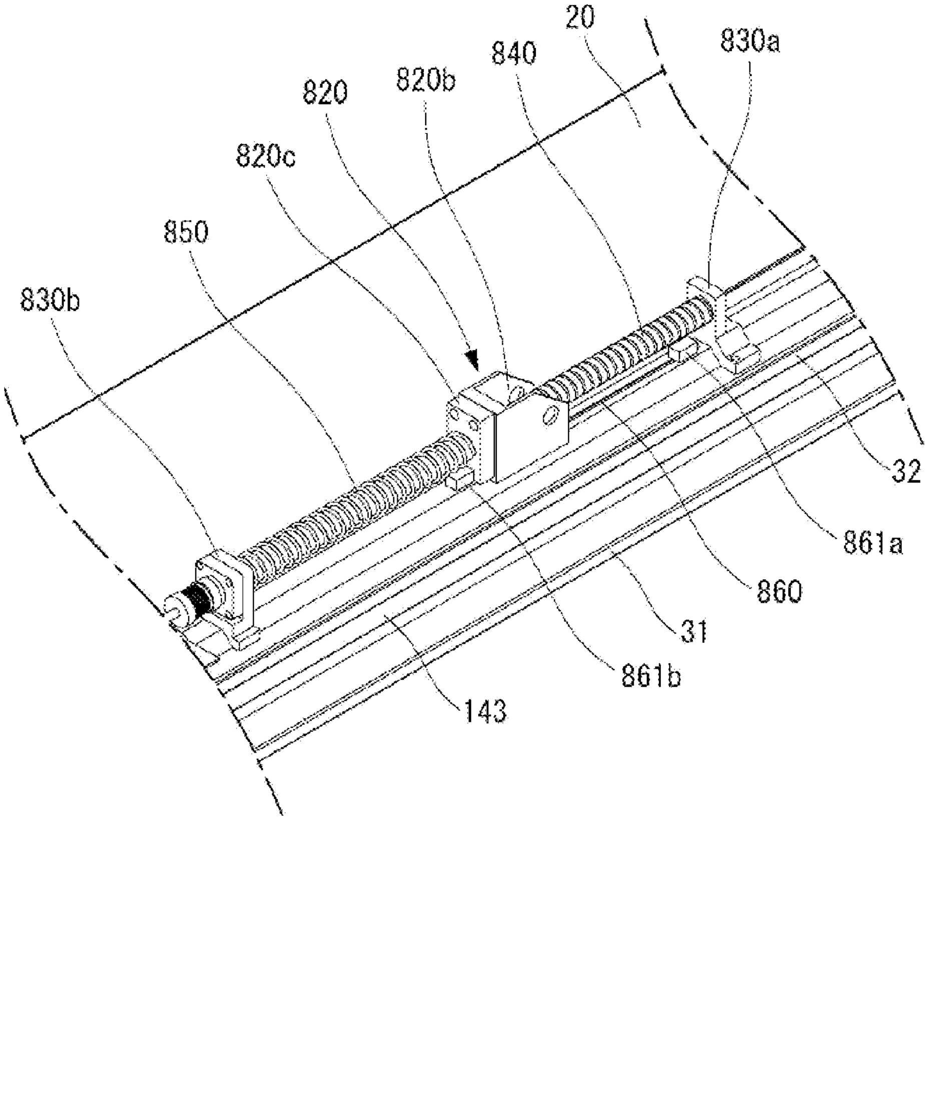

Referring to FIG. 24, a guide rail 860 may be installed in the second base 32. The guide rail 860 may be located parallel to the lead screw 840. The slide 820 may be engaged with the guide rail 860. A first stopper 861b may be located in one side of the guide rail 860, and a second stopper 861a may be located in the other side of the guide rail 860. The range in which the slide 820 can move may be limited between the first stopper 861b and the second stopper 861a.

A spring 850 may surround the lead screw 840. The lead screw 840 may penetrate the spring 850. The spring 850 may be located between inner bearing 830b and the slide 820. One side of the spring 850 may contact the inner bearing 830b, and the other side of the spring 850 may contact the slide 820. The spring 850 may provide an elastic force to the slide 820.

When the slide 820 is caught on the first stopper 861b, the spring 850 may be maximally compressed. When the slide 820 is caught on the first stopper 861b, the length of the spring 850 may be minimal. When the slide 820 is caught on the first stopper 861b, the distance between the slide 820 and the inner bearing 830b may be minimal.

Figure 25:
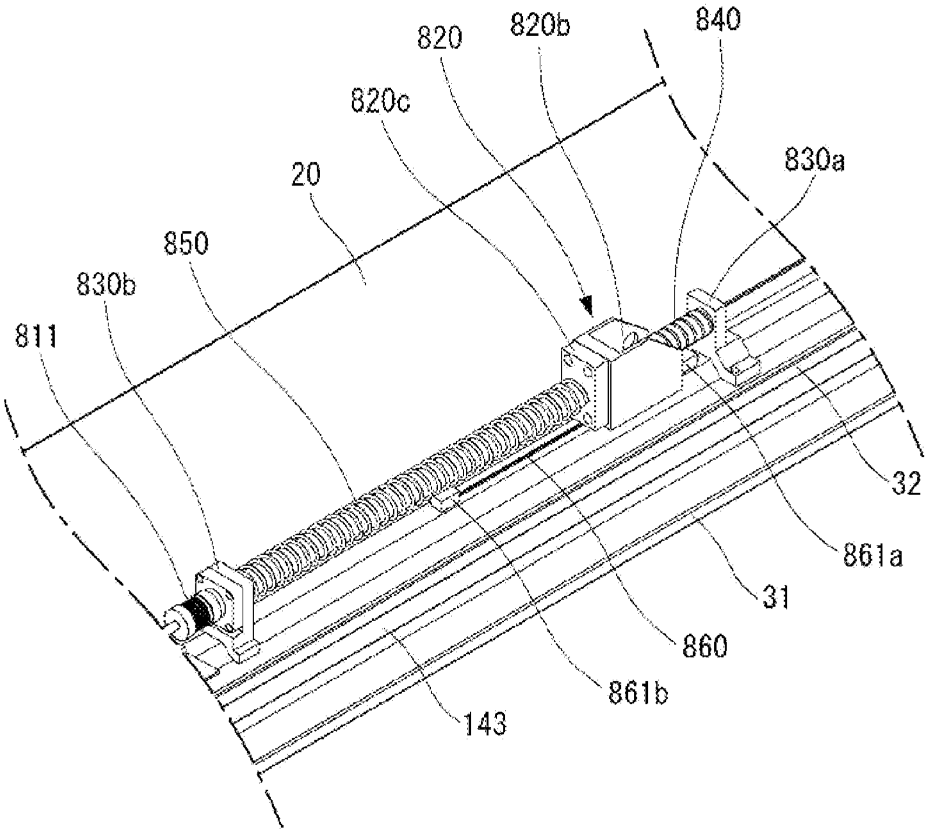

Referring to FIG. 25, when the slide 820 is caught on the second stopper 861a, the spring 850 may be maximally tensioned. When the slide 820 is caught on the second stopper 861b, the length of the spring 850 may be maximum. When the slide 820 is caught on the second stopper 861a, the distance between the slide 820 and the inner bearing 830b may be maximum.

Figure 26:
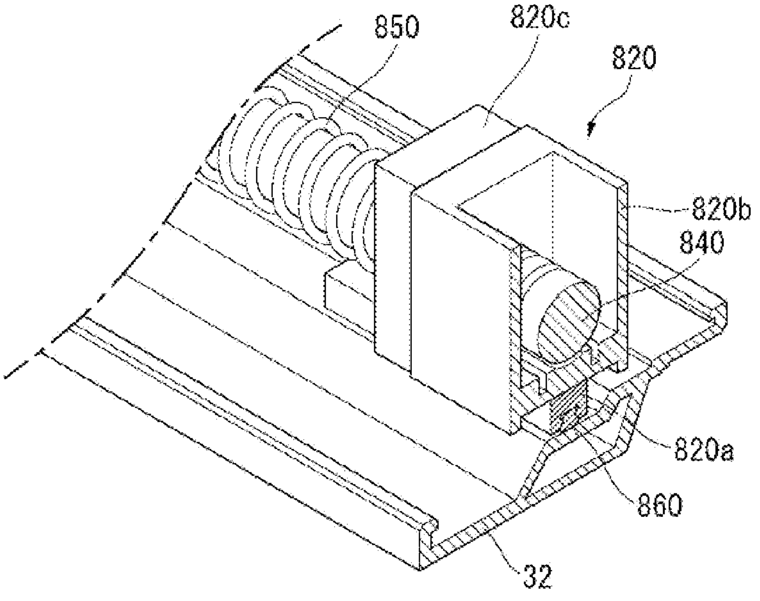

Referring to FIG. 26, a first part 820a may be engaged with the guide rail 860. The first part 820a may move along the guide rail 860. The movement of the first part 820a in the longitudinal direction of the guide rail 860 may be restricted. A second part 820b may be located in the upper side of the first part 820a. The first part 820a and the second part 820b may be fastened through a screw. The second part 820b may be spaced apart from the guide rail 860. The lead screw 840 may penetrate the second part 820b. For example, the second part 820b may include a male screw thread engaged with a female screw thread of the lead screw 840. Accordingly, even if the lead screw 840 rotates, the slide 820 may stably move forward and rearward along the guide rail 860 without rotating. A third part 820c may be coupled to one side of the second part 820b. The third part 820c may contact the spring 850. The third part 820c may receive elastic force from the spring 850.

Figure 27:
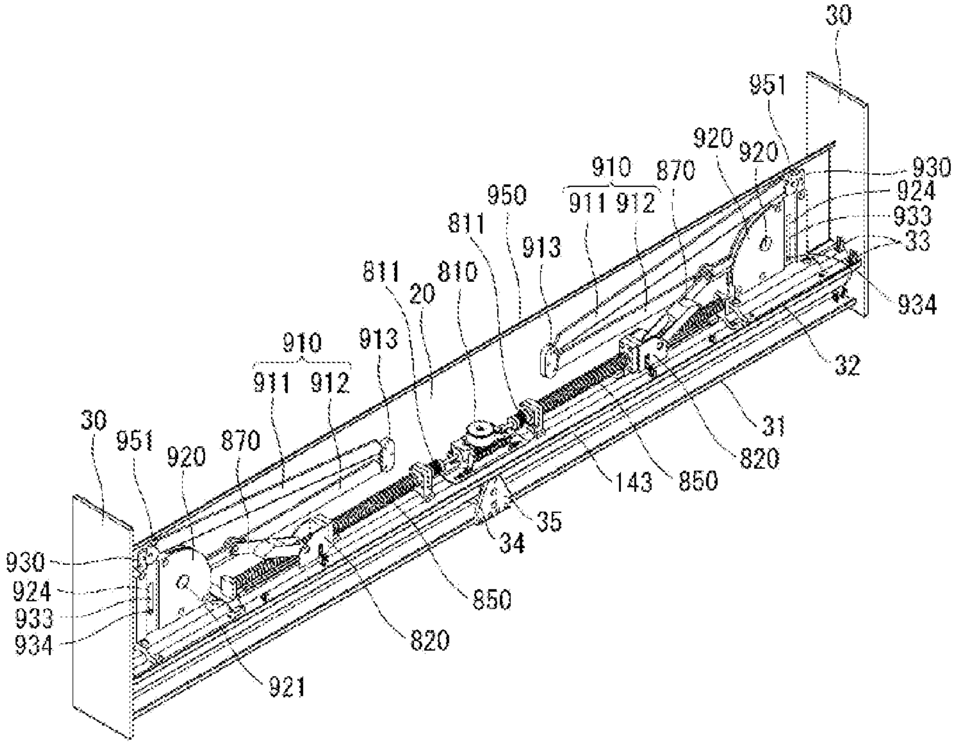
Figure 28:
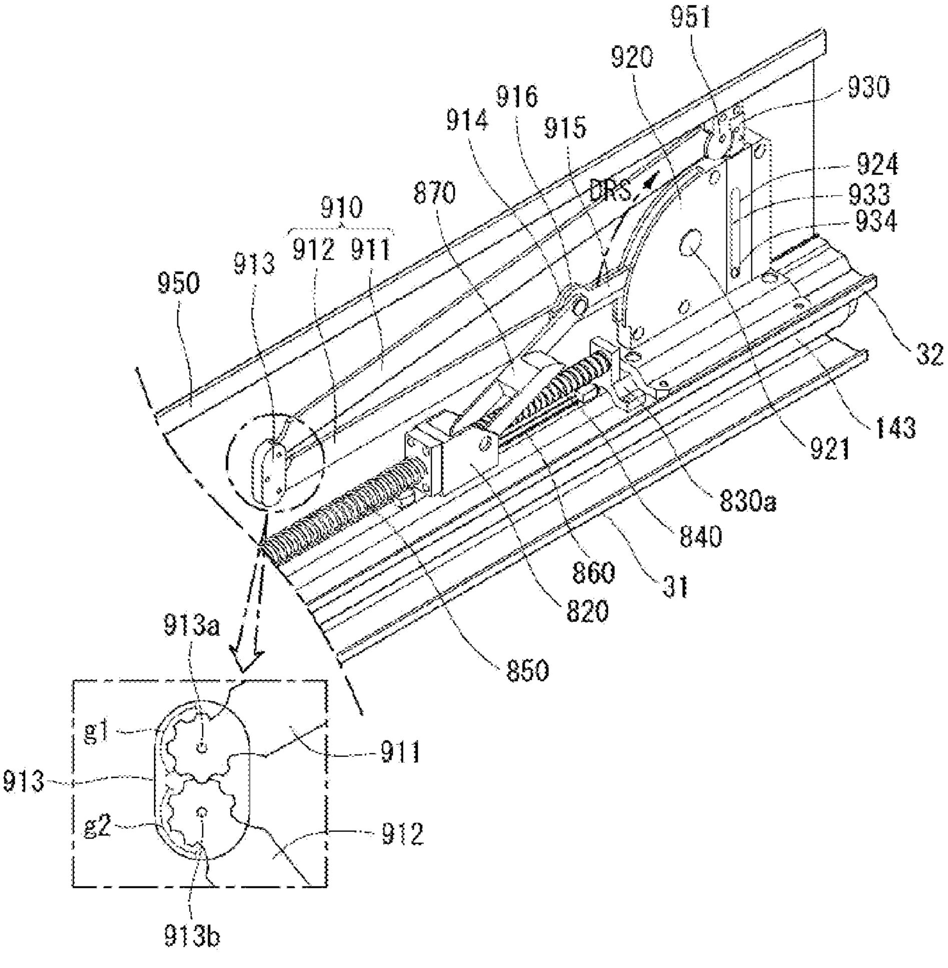

Referring to FIGS. 27 and 28, a link mount 920 may be installed in the second base 32. One side of a second arm 912 may be pivotably connected to the link mount 920. The other side of the second arm 912 may be pivotally connected to a joint 913. The other side of the second arm 912 may be pivotably connected to a second shaft 913b. One side of a rod 870 may be pivotally connected to the slide 820. The other side of the rod 870 may be pivotally connected to the second arm 912 or a third arm 915. One side of the third arm 915 may be pivotably connected to the link mount 920. The other side of the third arm 915 may be pivotably connected to the other side of the rod 870. The link mount 920 may include a shaft 921. The second arm 912 or the third arm 911 may be pivotally connected to the shaft 921.

A link bracket 951 may be referred to as a link cap 951. The link bracket 951 may be coupled to a top case 950. The top case 950 may be referred to as a case top 950, an upper bar 950, a top 950, or a bar 950. The top case 950 may be located in an upper end of the display unit 20. The display unit 20 may be fixed to the top case 950.

One side of the first arm 911 may be pivotally connected to the joint 913. One side of the first arm 911 may be pivotally connected to a first shaft 913a. The other side of the first arm 911 may be pivotably connected to the link bracket 951 or the top case 950.

A gear g1 may be formed in one side of the first arm 911. A gear g2 may be formed in the other side of the second arm 912. The gear g1 of the first arm 911 and the gear g2 of the second arm 912 may be engaged with each other.

When the slide 820 moves closer to the outer bearing 830a, the second arm 912 or the third arm 915 may stand up. At this time, the direction in which the second arm 912 or the third arm 915 stands up may be referred to as a standing direction DRS.

The second arm 912 may include a protrusion 914 protruding in the standing direction DRS. The protrusion 914 may be referred to as a connecting portion 914. The third arm 915 may include a protrusion 916 protruding in the standing direction DRS. The protrusion 916 may be referred to as a connecting portion 916. The protrusion 914 of the second arm 912 and the protrusion 916 of the third arm 915 may face or contact each other. The other side of the rod 870 may be fastened to the protrusion 914 of the second arm 912 or the protrusion 916 of the third arm 915.

The link 910 may include the first arm 911, the second arm 912, the third arm 915, and/or the joint 913.

Figure 29:
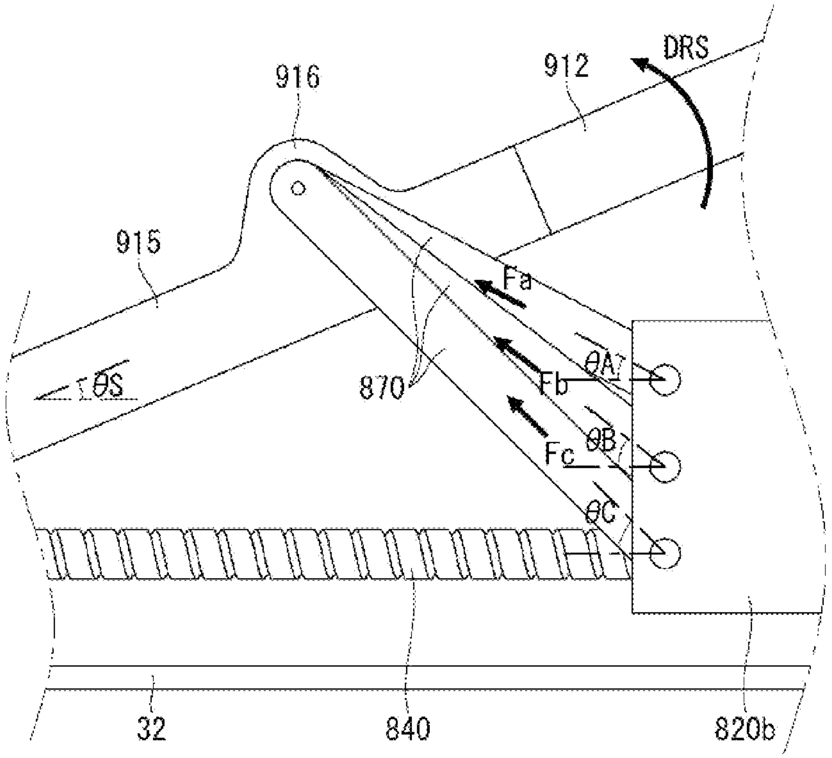
Figure 30:
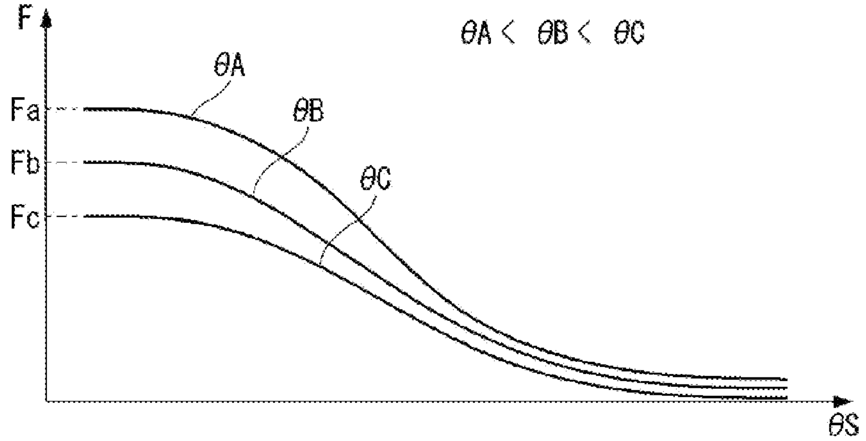

Referring to FIGS. 29 and 30, an angle formed between the second arm 912 or the third arm 915 and the second base 32 may be referred to as theta S. When the rod 870 is connected to the upper side of the second part 820b, an angle formed by the rod 870 with the second base 32 may be referred to as theta A, and a minimum force for the rod 870 to stand the second arm 912 or the third arm 915 may be referred to as Fa. When the rod 870 is connected to the middle of the second part 820b, an angle formed by the rod 870 with the second base 32 may be referred to as theta B, and a minimum force for the rod 870 to stand the second arm 912 or the third arm 915 may be referred to as Fb. When the rod 870 is connected to the lower side of the second part 820b, an angle formed by the rod 870 with the second base 32 may be referred to as theta C, and a minimum force for the rod 870 to stand the second arm 912 or the third arm 915 may be referred to as Fc.

A relationship of theta A<theta B<theta C may be established for the same theta S. In addition, for the same theta S, a relationship of Fc<Fb<Fa may be established. If an angle between the second arm 912 or the third arm 915 and the second base 32 is the same, as the angle between the rod 870 and the second base 32 increases, the force required to stand the second arm 912 or the third arm 915 may decrease. Since the rod 870 is connected to the lower side of the second part 820b, a load applied to the motor assembly 810 may be reduced.

Figure 31:
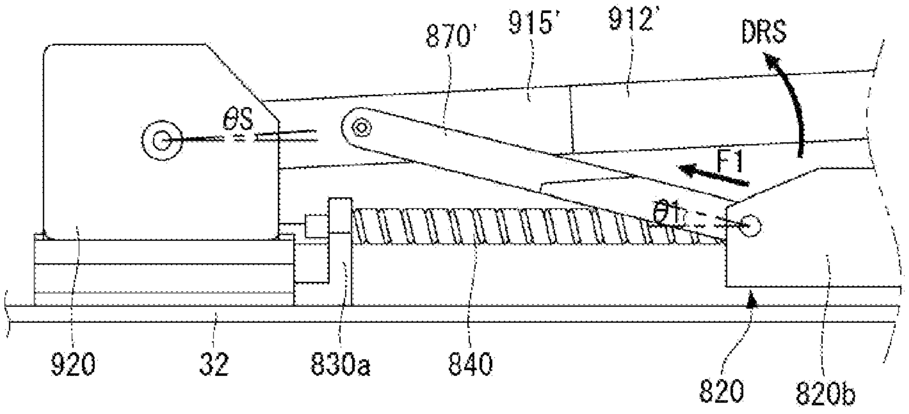

Referring to FIG. 31, a rod 870' may not be connected to the protrusion of a second arm 912' or the protrusion of a third arm 915'. When the angle formed between the second arm 912' or the third arm 915' and the second base 32 is theta S, the angle between the rod 870' and the second base 32 may be referred to as theta 1, and the minimum force for the rod 870' to stand the second arm 912' or the third arm 915' may be referred to as F1.

Figure 32:
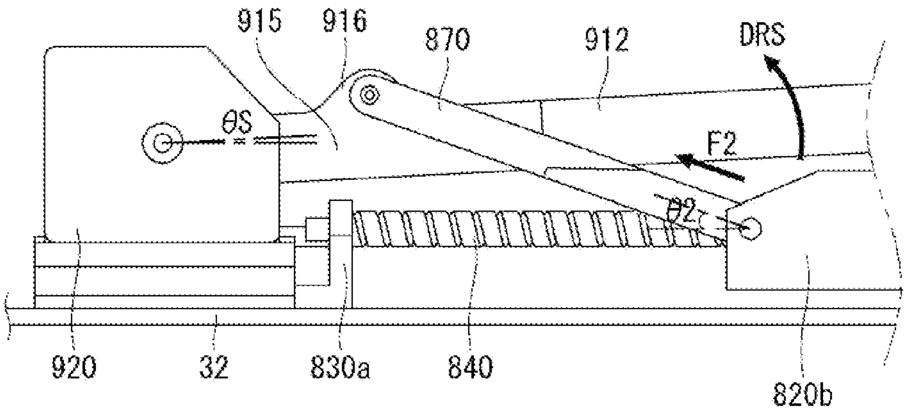

Referring to FIG. 32, the rod 870 may be connected to the protrusion 914 of the second arm 912 or the protrusion 916 of the third arm 915. When the angle formed by the second arm 912 or the third arm 915 and the second base 32 is theta S, the angle formed by the rod 870 and the second base 32 may be referred to as theta 2, and the minimum force for the rod 870 to stand the second arm 912 or the third arm 915 may be referred to as F2.

Figure 33:
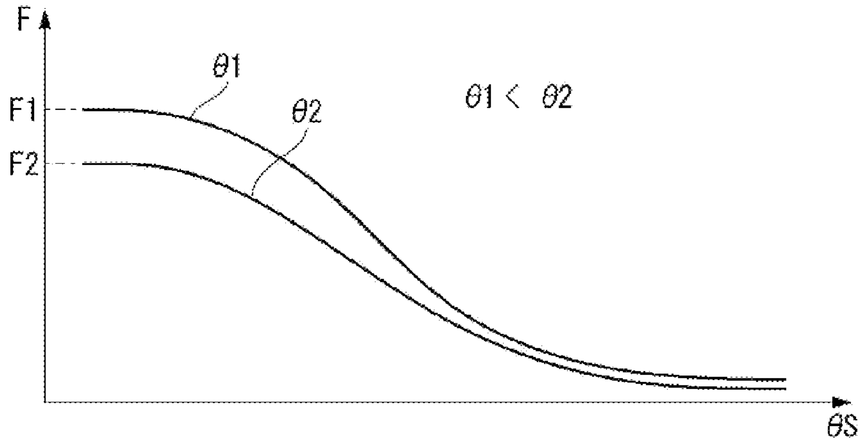

Referring to FIG. 33, when theta S is the same, theta 2 may be greater than theta 1. When theta S is the same, F1 may be greater than F2. If the angle formed by the second arms 912, 912' and the second base 32 is the same, as the angle formed between the rod 870, 870' and the second base 32 increases, the force required to stand the second arm 912, 912' may decrease. Since the rod 870 is connected to the protrusion 914, 916, the second arm 912 may be stood up with a smaller force in comparison with a case where the rod 870' is not connected to the protrusion. Since the rod 870 is connected to the protrusion 914, and 916, a load applied to the motor assembly 810 may be reduced.

Figure 34:
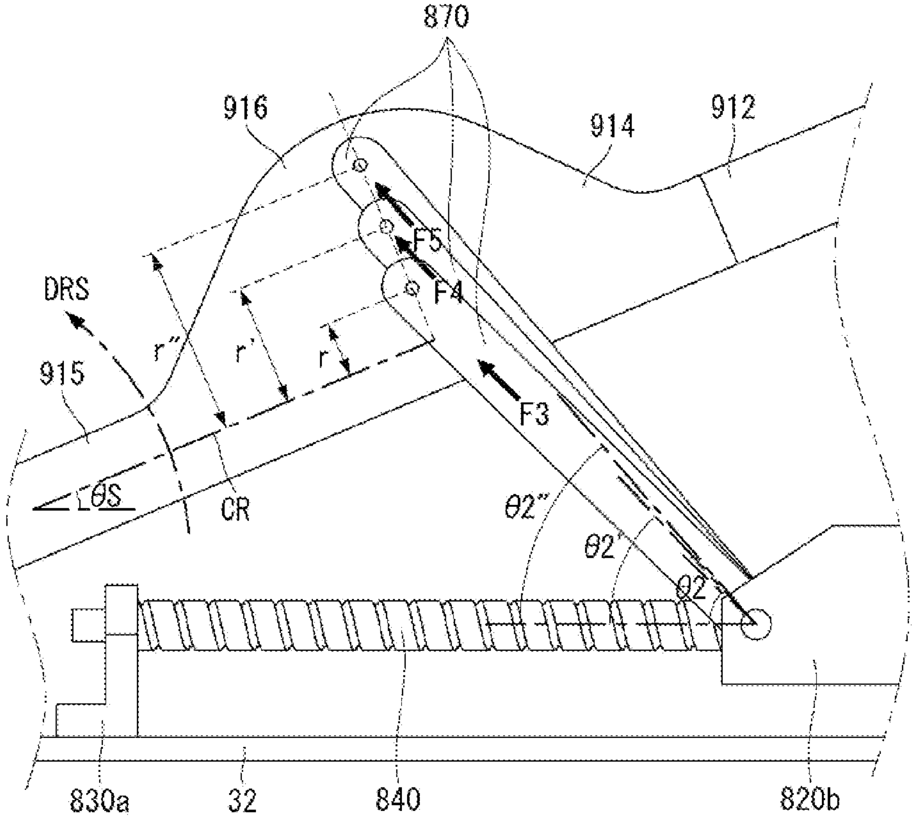

Referring to FIG. 34, the second arm 912 or the third arm 915 may have a central axis CR. When the rod 870 is fastened to the second arm 912 at a distance r from the central axis CR, an angle between the rod 870 and the second base 32 may be referred to as theta 2, and the minimum force for the rod 870 to stand the second arm 912 or the third arm 915 may be referred to as F3. When the rod 870 is fastened to the second arm 912 at a distance r' from the central axis CR, the angle formed by the rod 870 and the second base 32 may be referred to as theta 2', and the minimum force for the rod 870 to stand the second arm 912 or the third arm 915 may be referred to as F4. When the rod 870 is fastened to the second arm 912 at a distance r" from the central axis CR, the angle formed by the rod 870 and the second base 32 may be referred to as theta 2", and the minimum force for the rod 870 to stand the second arm 912 or the third arm 915 may be referred to as F5.

Figure 35:
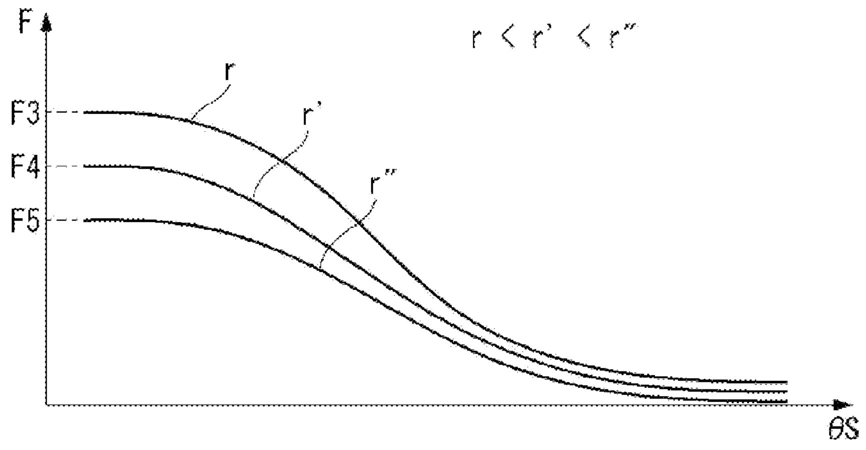

Referring to FIG. 35, when theta S is the same, theta 2" may be greater than theta 2', and theta 2' may be greater than theta 2. When theta S is the same, F3 may be greater than F4, and F4 may be greater than F5. As the rod 870 is fastened farther away from the central axis CR, the force required to stand the second arm 912 may decrease. Since the rod 870 is fastened farther away from the central axis CR, a load applied to the motor assembly 810 may be reduced.

Figure 36:
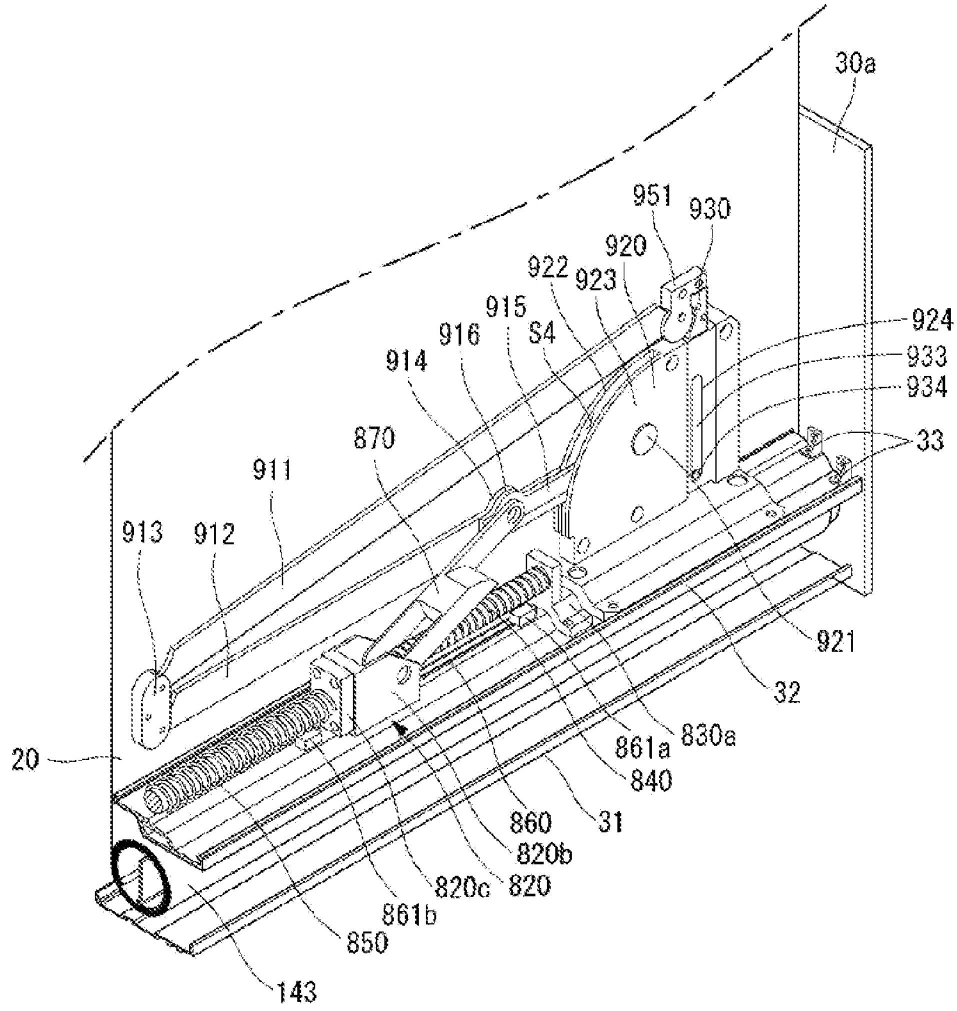

Referring to FIG. 36, the first arm 911 and the second arm 912 may be in contact with or located close to the rear surface of the display unit 20. As the first arm 911 and the second arm 912 are in contact with or located close to the rear surface of the display unit 20, the display unit 20 may be stably wound around or unwound from the roller. The link mount 920 may include a first part 922 and a second part 923. The first part 922 and the second part 923 may face each other. A space S4 may be formed between the first part 922 and the second part 923. The first part 922 may face the display unit 20. The first part 922 may be located closer to the display unit 20 than the second part 923. The second arm 912 may be pivotably connected to the front surface of the first part 922. A part of the third arm 915 may be accommodated in the space S4, and pivotally connected to the first part 922 or the second part 923.

Figure 37:
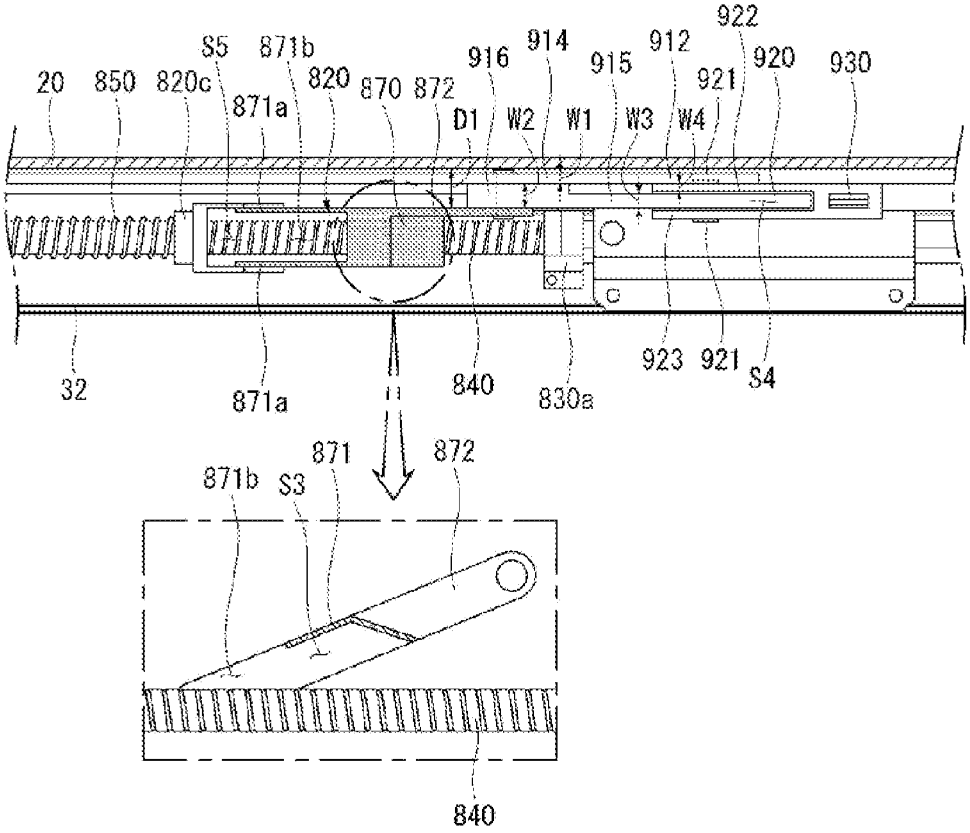

Referring to FIG. 37, the rod 870 may include a first part 871 and a second part 872. The first part 871 may include a connecting portion 871*a* at one side. The second part 872 of the slide 820 may form a space S5 therein. The connecting portion 871*a* may be inserted into the space S5. The connecting portion 871*a* may be pivotally connected to the second part 820*b* (see FIG. 36) of the slide 820. The other side of the first part 871 may be connected to one side of the second part 872. The other side of the second part 872 may be pivotably connected to the second arm 912 or the third arm 915. The first part 871 may form a space S3 therein. The first part 871 may include a hole 871*b*. The lead screw 840 may be accommodated in the hole 871*b* or the space S3.

A distance between the second part 872 and the display unit 20 may be D1. The second arm 912 may have a thickness W1. A portion of the third arm 915 accommodated in the space S4 may have a thickness W3. The thickness W3 may be equal to the distance between the first part 922 and the second part 923. A portion of the third arm 915 not accommodated in the space S4 may have a thickness W2. The first part 922 may have a thickness W4. The thickness W2 may be greater than the thickness W3. The thickness W2 may be equal to the sum of the thickness W3 and the thickness W4. D1 may be the sum of the thickness W1 and the thickness W2.

The second arm 912 may come into contact with or be located close to the rear surface of the display unit 20, and the third arm 915 may be located between the second arm 912 and the second part 872. The second part 872 may stably transmit power for standing the second arm 912 due to the third arm 915. The second part 872 may move forward with respect to the axis of rotation of the lead screw 840 and be connected to the first part 871 in order to stably stand the second arm 912 or the third arm 915. Accordingly, a gap between the second arm 912 and the second part 872 may be minimized.

Figure 38:
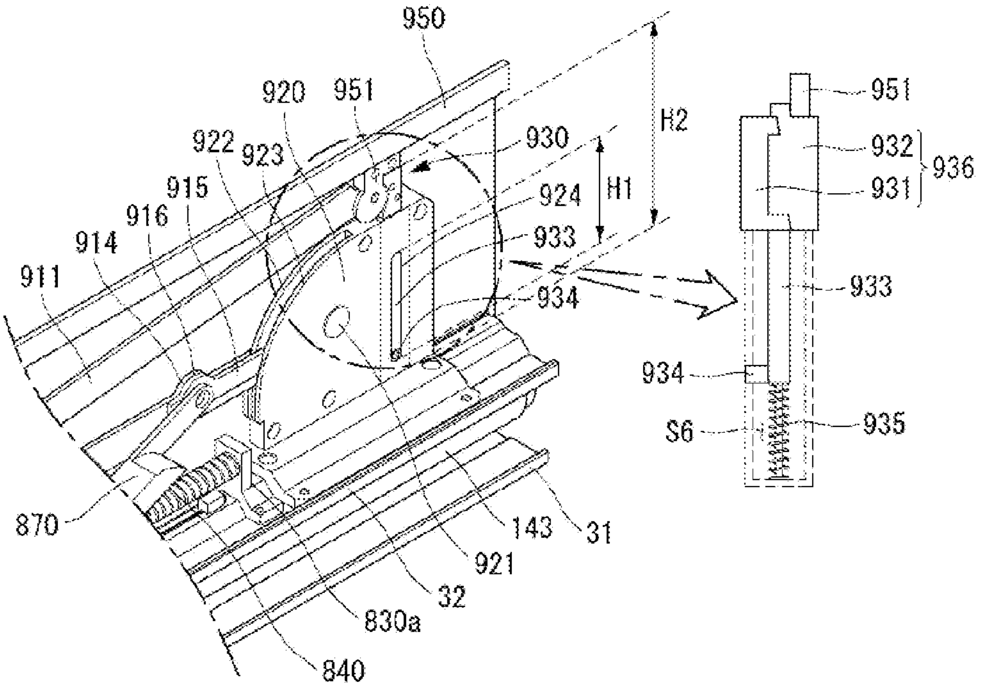

Referring to FIG. 38, a pusher 930 may be mounted in the link mount 920. The pusher 930 may be referred to as a lifter 930. The second part 932 may be fastened to the first part 931. The second part 932 may be in contact with or separated from the link bracket 951. The second part 932 may be made of a highly elastic material. The first part 931 may be made of a material having lower elasticity than the second part 932. The first part 931 may be made of a material having higher rigidity than the second part 932. The first part 931 and the second part 932 may be collectively referred to as a head 936. The head 936 may be located in the upper side of the link mount 920.

The third part 933 may be connected to the first part 931. Alternatively, the third part 933 may extend downward from the first part 931. The third part 933 may be referred to as a tail 933. The fourth part 934 may protrude from the third part 933. The link mount 920 may form a space S6, and the third part 933 may be accommodated in the space S6. The space S6 may be opened upward. The space S6 accommodating the third part 933 may be adjacent to the space S4 accommodating the third arm 915 (see FIG. 37). The second part 932 of the link mount 920 may include a hole 924. The hole 924 may be a long hole formed long in the vertical direction. The length of the hole 924 may be H1. The fourth part 934 may be inserted into the hole 924. The spring 935 may be accommodated in the space S6. The spring 935 may be located in the lower side of the third part 933. The spring 935 may provide elastic force to the third part 933 in the vertical direction.

The head 936 may be larger than the diameter of the space S6. When the head 936 is caught on the upper end of the space S6, the height of the head 936 from the second base 32 may be minimal. The minimum height of the head 936 may be referred to as H2. When the height of the head 936 is the minimum, the fourth part 934 may be caught on the lower end of the space S6. When the height of the head 936 is minimal, the spring 935 may be maximally compressed. When the height of the head 936 is minimum, the elastic force provided by the spring 935 may be maximum. When the head 936 has a minimum height, the top case 950 may have a minimum height.

The pusher 930 may provide elastic force to the link bracket 951 while being in contact with the link bracket 951. Thus, the load applied to the motor assembly 810 to stand the link 910 may be reduced.

Figure 39:
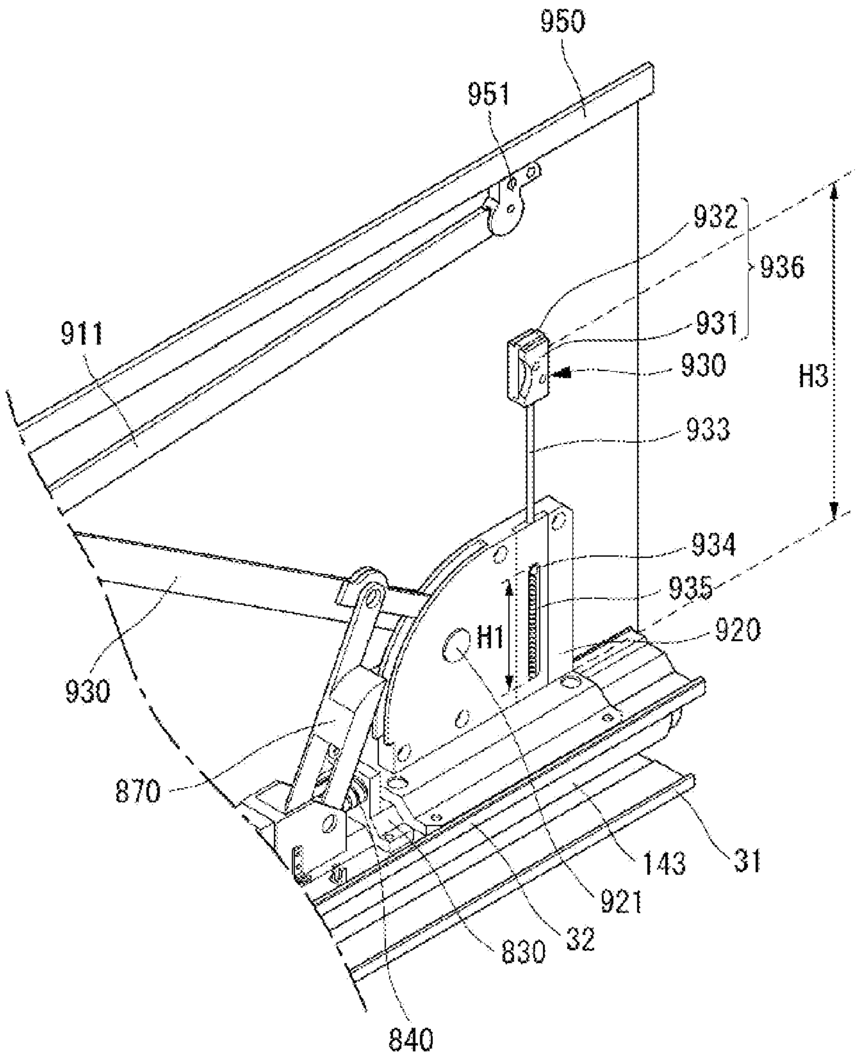

Referring to FIG. 39, when the link 910 stands up sufficiently, the pusher 930 may be separated from the link bracket 951. When the pusher 930 is separated from the link bracket 951, the height of the head 936 from the second base 32 may be maximum. The maximum height of the head 936 may be referred to as H3. When the height of the head 936 is maximum, the fourth part 934 may be caught on the upper end of the hole 924 (see FIG. 38). When the height of the head 936 is maximum, the spring 935 may be maximally tensioned. When the height of the head 936 is maximum, the elastic force provided by the spring 935 may be minimal. The maximum height H3 of the head 936 may be substantially equal to the sum of the minimum height H2 of the head 936 and the length H1 of the hole.

Figure 40:
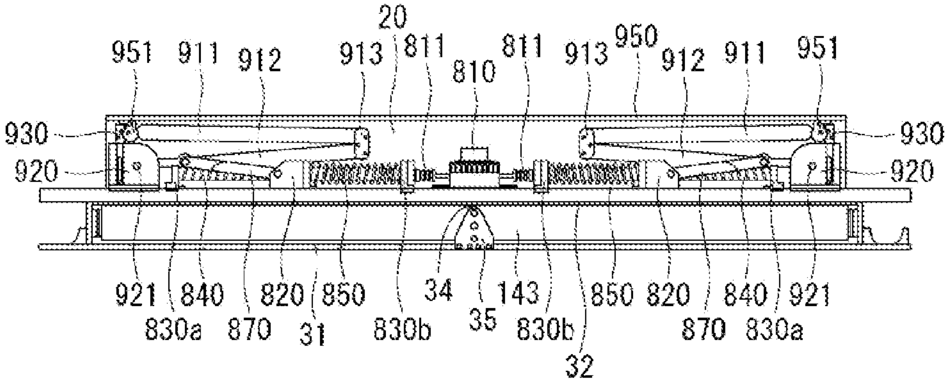

Referring to FIG. 40, the display unit 20 may be in a state of being maximally wound around the roller 143. The display device 100 may be left-right symmetric with respect to the motor assembly 810. The height of the top case 950 may be minimal. The slide 820 may be at a position closest to the inner bearing 830*b*. The slide 820 may be caught in the first stopper 861*b*. The spring 850 may be in a maximum compressed state. The pusher 930 may contact the link bracket 951. The height of the pusher 930 may be minimal.

Figure 41:
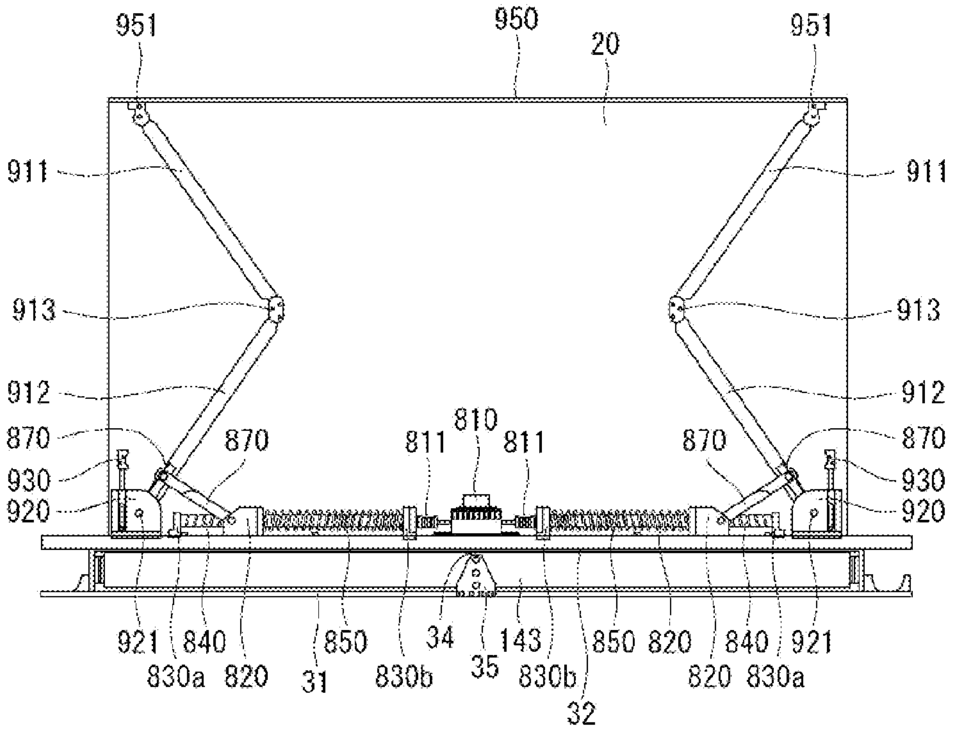

Referring to FIG. 41, about half of the display unit 20 may be wound around the roller 143. The display device 100 may be left-right symmetric with respect to the motor assembly 810. About half of the display unit 20 may be unwound from the roller 143. The slide 820 may be located between the first stopper 861*b* and the second stopper 861*a*. The pusher 930 may be separated from the link bracket 951. The height of the pusher 930 may be maximum.

Figure 42:
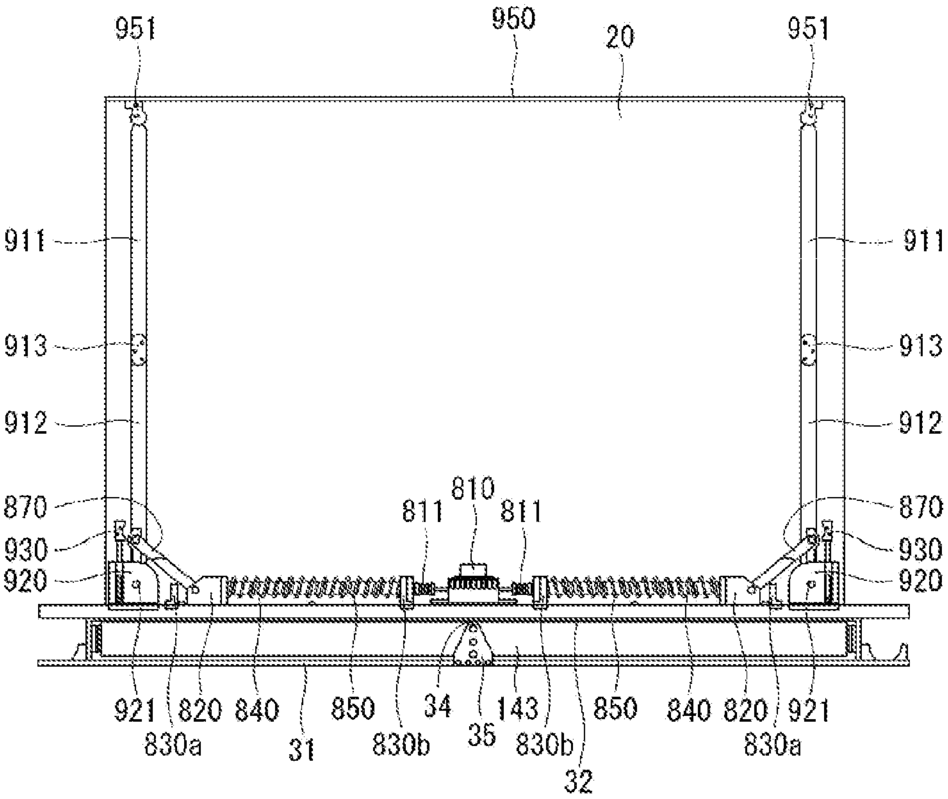
Figure 43:
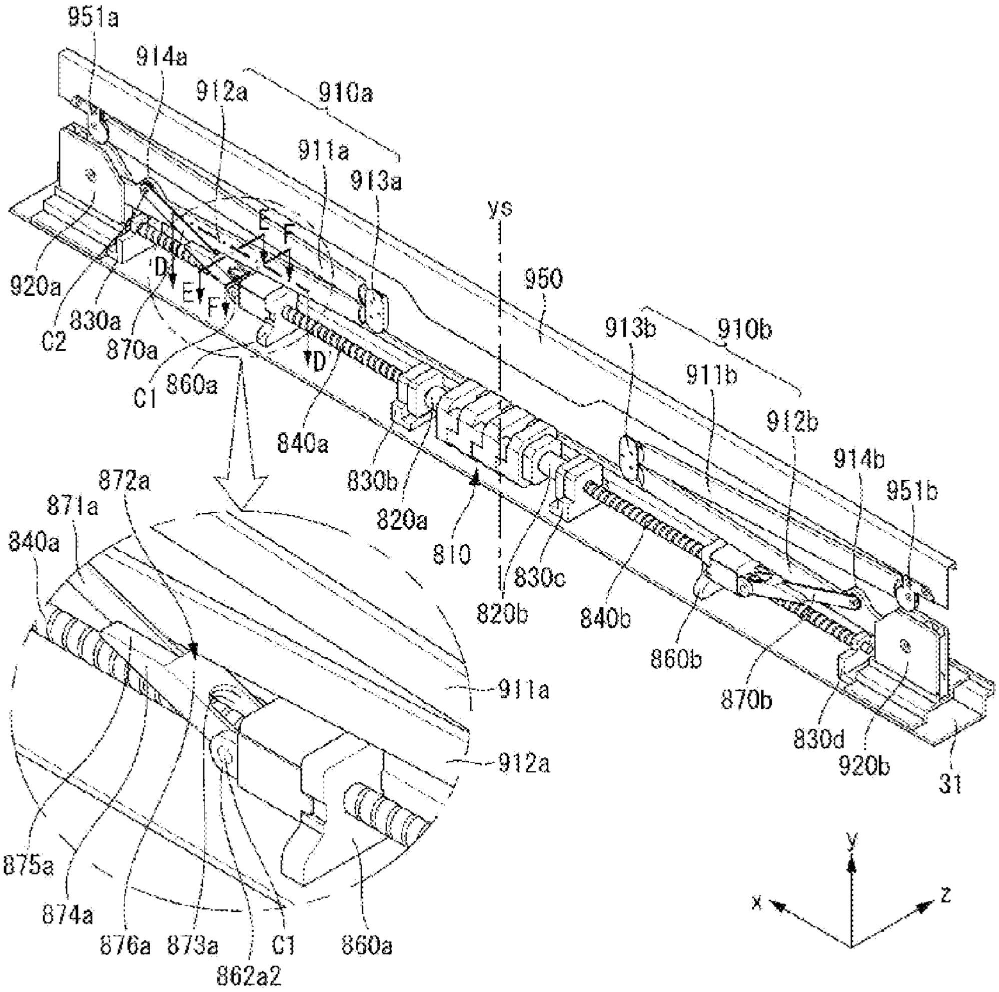
Figure 44:
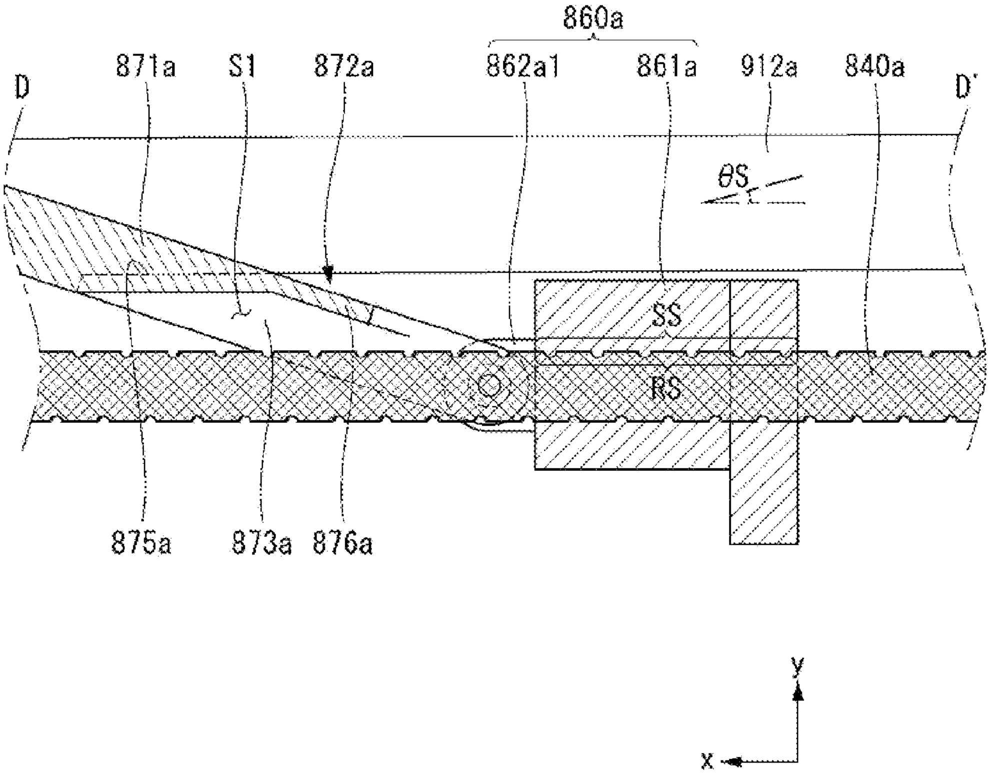
Figure 45:
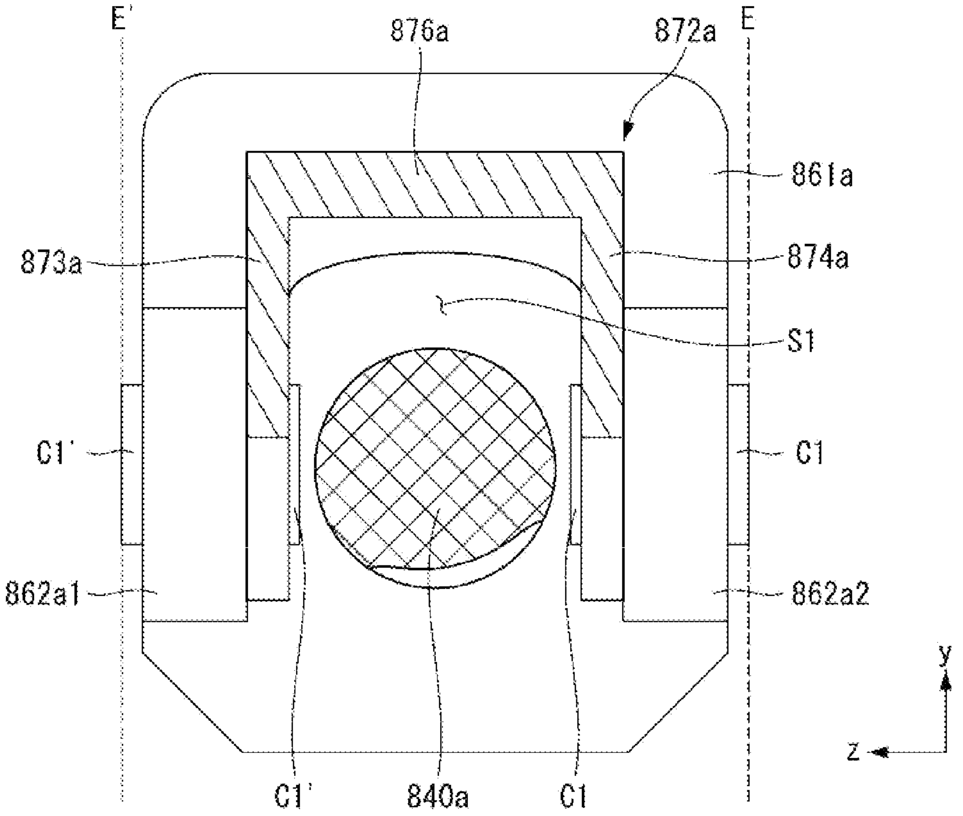
Figure 46:
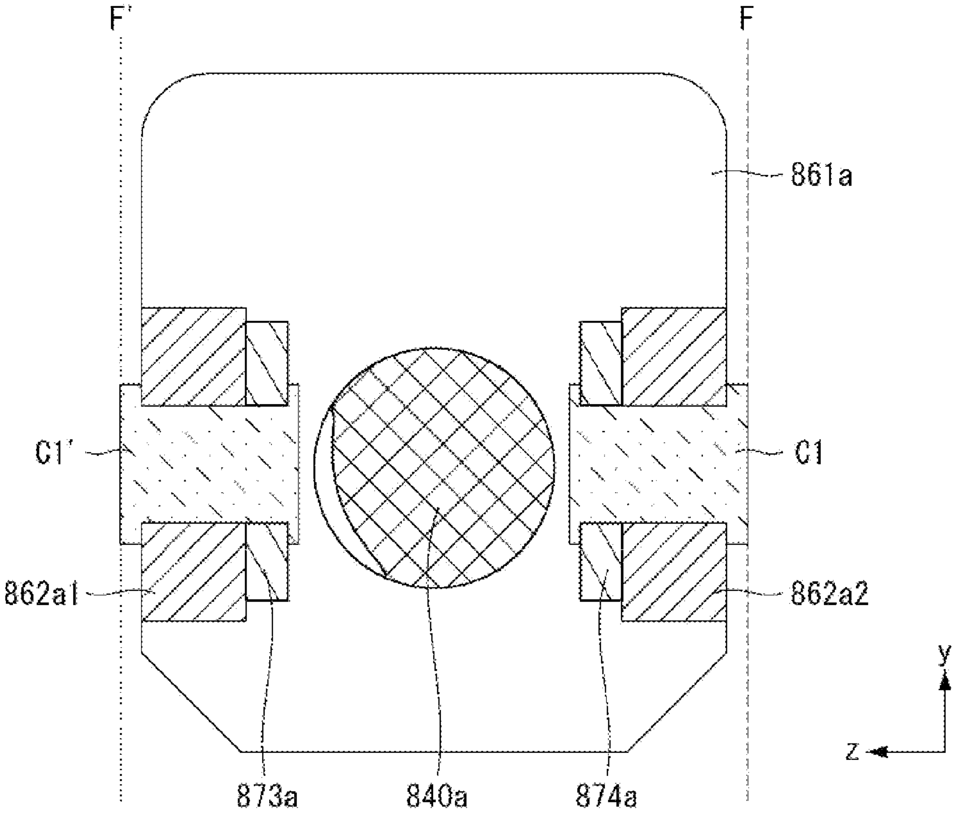

Referring to FIG. 42, the display unit 20 may be in a state of being maximally unwound from the roller 143. The display device 100 may be left-right symmetric with respect to the motor assembly 810. The height of the top case 950 may be maximum. The slide 820 may be at a position closest to the outer bearing 830*a*. The slide 820 may be caught in the second stopper 861*a*. The spring 850 may be in a maximum tensioned state. The pusher 930 may be separated from the link bracket 951. The height of the pusher 930 may be maximum.

Referring to FIGS. 43 to 46, a link mount 920*a*, 920*b* may be installed in the base 31. The link mount 920*a*, 920*b* may include a right link mount 920*a* spaced right from a first right bearing 830*a* and a left link mount 920*b* spaced left from a second left bearing 830*d*.

A link 910*a*, 910*b* may be connected to the link mount 920*a*, 920*b*. The link 910*a*, 910*b* may include a right link 910*a* connected to the right link mount 920*a* and a left link 910*b* connected to the left link mount 920*b*.

The right link 910*a* may also be referred to as a first link. The left link 910*b* may also be referred to as a second link. The right link mount 920*a* may also be referred to as a first link mount 920*a*. The left link mount 920*b* may also be referred to as a second link mount 920*b*.

The link 910*a*, 910*b* may include a first arm 911*a*, 911*b*, a second arm 912*a*, 912*b*, and an arm joint 913*a*, 913*b*. One side of the second arm 912*a*, 912*b* may be rotatably connected to the link mount 920*a*, 920*b*. The other side of the second arm 912*a*, 912*b* may be rotatably connected to the arm joint 913*a*, 913*b*. One side of the first arm 911*a*, 911*b* may be rotatably connected to the arm joint 913*a*, 913*b*. The other side of the first arm 911*a*, 911*b* may be rotatably connected to the link bracket 951*a*, 951*b*.

The link bracket 951*a*, 951*b* may include a right link bracket 951*a* connected to the first arm 911*a* of the right link 910*a* and a left link bracket 951*b* connected to the first arm 911*b* of the left link 910*b*. The link bracket 951*a*, 951*b* may be connected to the upper bar 950.

The upper bar 950 may connect the right link bracket 951*a* and the left link bracket 951*b*.

A rod 870*a*, 870*b* may connect the slider 860*a*, 860*b* and the link 910*a*, 910*b*. One side of the rod 870*a*, 870*b* may be rotatably connected to the slider 860*a*, 860*b*. The other side of the rod 870*a*, 870*b* may be rotatably connected to the second arm 912*a*, 912*b*. The rod 870*a*, 870*b* may include a right rod 870*a* connecting a right slider 860*a* and the second arm 912*a* of the right link 910*a* and a left rod 870*b* connecting a left slider 860*b* and the second arm 912*b* of the left link 910*b*. The right rod 870*a* may also be referred to as a first rod 870*a*. The left rod 870*b* may also be referred to as a second rod 870*b*.

Specifically, a structure formed by the right lead screw 840*a*, the right slider 860*a*, the right rod 870*a*, and the right link 910*a* will be described. The right slider 860*a* may include a body 861*a* and a rod mount 862*a*. A screw thread SS may be formed on an inner circumferential surface of the body 861*a*. A screw thread formed in the body 861*a* may engage with a screw thread RS of the right lead screw 840*a*. The right lead screw 840*a* may penetrate the body 861*a*.

The rod mount 862*a* may be formed in the right side of the body 861*a*. The rod mount 862*a* may be rotatably connected to one side of the right rod 870*a*. The rod mount 862*a* may include a first rod mount 862*a*1 and a second rod mount 862*a*2. The first rod mount 862*a*1 may be disposed in a forward direction of the right lead screw 840*a*. The second rod mount 862*a*2 may be disposed in a rearward direction of the right lead screw 840*a*. The first rod mount 862*a*1 and the second rod mount 862*a*2 may be spaced apart from each other. The second rod mount 862*a*2 may be spaced apart from the first rod mount 862*a*1 in the −z-axis direction. The right lead screw 840*a* may be located between the first rod mount 862*a*1 and the second rod mount 862*a*2.

The rod mount 862*a* may be rotatably connected to one side of the rod 870*a* through a connecting member C1. The connecting member C1 may penetrate the rod mount 862*a* and the right rod 870*a*.

The right rod 870*a* may be rotatably connected to the second arm 912*a* through the connecting member C2. The connection member C2 may penetrate the second arm 912*a* and the right rod 870*a*.

The right rod 870*a* may include a transmission portion 871*a* connected to the second arm 912*a* of the right link 910*a* and a cover 872*a* connected to the rod mount 862*a* of the right slider 860*a*. The transmission portion 871*a* may transmit a force generated when the right slider 860*a* moves forward and backward along the right lead screw 840*a* to the right link 910*a*.

The cover 872*a* may include a first plate 873*a* disposed in a forward direction of the right lead screw 840*a*. The first plate 873*a* may be disposed perpendicular to the base 31. Alternatively, the first plate 873*a* may face the right lead screw 840*a*.

The cover 872*a* may include a second plate 874*a* disposed in a rearward direction of the right lead screw 840*a*. The second plate 874*a* may be disposed perpendicular to the base 31. Alternatively, the second plate 874*a* may face the right lead screw 840*a*. Alternatively, the second plate 874*a* may be spaced apart from the first plate 873*a*. The right lead screw 840*a* may be located between the first plate 873*a* and the second plate 874*a*. The cover 872*a* may include a third plate 875*a* connecting the first plate 873*a* and the second plate 874*a*. The third plate 875*a* may be connected to the transmission portion. The third plate 875*a* may be located in the upper side of the right lead screw 840*a*.

The cover 872*a* may include a fourth plate 876*a* connecting the first plate 873*a* and the second plate 874*a*. The fourth plate 876*a* may be connected to the third plate 875*a*. The fourth plate 876*a* may be located in the upper side of the right lead screw 840*a*.

One side of the first plate 873*a* may be connected to the first rod mount 862*a*1. The first plate 873*a* and the first rod mount 862*a*1 may be connected through a connecting member C1'. The other side of the first plate 873*a* may be connected to the third plate 875*a*.

One side of the second plate 874*a* may be connected to the second rod mount 862*a*2. The second plate 874*a* and the second rod mount 862*a*2 may be connected through a connecting member C1. The other side of the second plate 874*a* may be connected to the third plate 875*a*.

When the right slider 860*a* moves closer to the motor assembly 810, the right lead screw 840*a* and the right rod 870*a* may come into contact with each other. When the right lead screw 840*a* and the right rod 870*a* contact each other, mutual interference may occur and the movement of the right slider 860*a* may be restricted.

The cover 872*a* may provide a space S1 therein. The first plate 873*a*, the second plate 874*a*, the third plate 875*a*, and the fourth plate 876*a* may form a space S1. When the right slider 860*a* moves closer to the motor assembly 810, the right lead screw 840*a* can be accommodated into the space S1 provided by the cover 872*a* or escaped. The right slider 860*a* may move closer to the motor assembly 810 than in a case where the cover 872*a* does not exist, due to the space S1 provided by the cover 872*a*. That is, the cover 872*a* may widen the movable range of the right slider 860*a* by providing a space S1 therein. In addition, since the right lead screw 840*a* is accommodated in the cover 872*a*, the size of the housing 30 (see FIG. 2) can be reduced.

In addition, the cover 872*a* may restrict the minimum value of the angle theta S formed between the second arm 912*a* and the base 31. The third plate 875*a* of the cover 872*a* may be in contact with the second arm 912*a* and support the second arm 912*a*, when theta S becomes sufficiently small. The third plate 875*a* supports the second arm 912*a*, thereby restricting the minimum value of theta S and preventing the second arm 912*a* from sagging. That is, the cover 872*a* may serve as a stopper to prevent sagging of the second arm 912*a*. In addition, the third plate 875*a* may reduce an initial load for standing the second arm 912*a* by restricting the minimum value of theta S.

The lead screw 840*a*, 840*b* may be driven by a single motor assembly 810. The lead screw 840*a*, 840*b* is driven by a single motor assembly 810, so that the second arm 912*a*, 912*b* can stand symmetrically. However, when the lead screw 840*a*, 840*b* is driven by a single motor assembly 810, a load applied to the motor assembly 810 may be excessively increased in order to stand the second arm 912*a*, 912*b*. At this time, the third plate 875*a* may reduce the load applied to the motor assembly 810 to stand the second arm 912*a*, 912*b* by restricting the minimum value of theta S.

A structure formed by the left lead screw 840*b*, the left slider 860*b*, the left rod 870*b*, and the left link 910*b* may be symmetrical with a structure formed by the above-described right lead screw 840*a*, right slider 860*a*, right rod 870*a*, and right link 910*a*. In this case, the axis of symmetry may be the axis of symmetry ys of the motor assembly 810.

Figure 47:
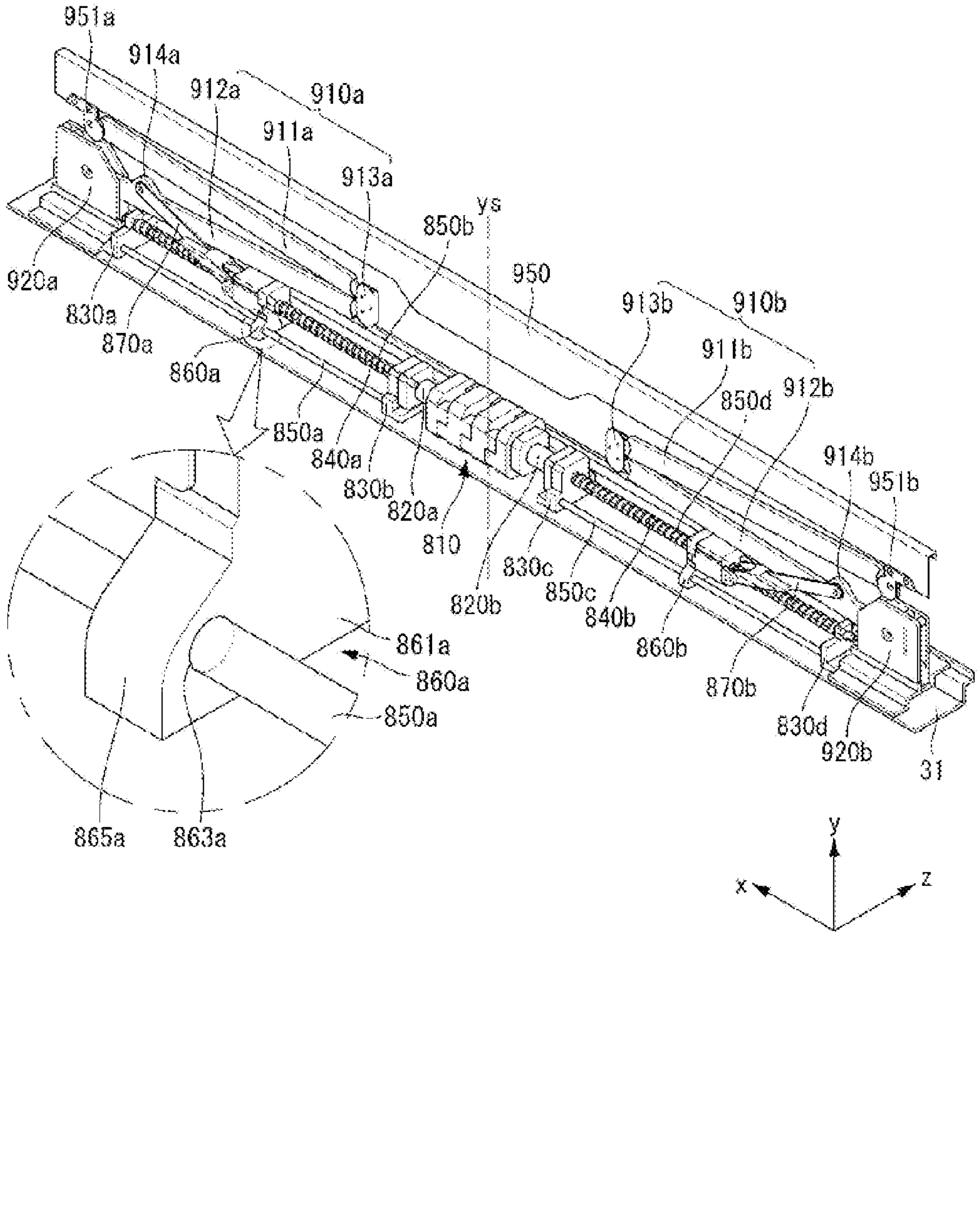

Referring to FIG. 47, a guide 850*a*, 850*b*, 850*c*, and 850*d* may be connected to a bearing 830*a*, 830*b*, 830*c*, and 830*d*. The guide 850*a*, 850*b*, 850*c*, and 850*d* may include a right guide 850*a*, 850*b* disposed in the right side of the motor assembly 810 and a left guide 850*c*, 850*d* disposed in the left side of the motor assembly 810.

One side of the right guide 850*a*, 850*b* may be connected to the first right bearing 830*a* and the other side may be connected to the second right bearing 830*b*. The right guide 850*a*, 850*b* may be located parallel to the right lead screw 840*a*. Alternatively, the right guide 850*a*, 850*b* may be spaced apart from the right lead screw 840*a*.

The right guide 850*a*, 850*b* may include a first right guide 850*a* and a second right guide 850*b*. The first right guide 850*a* and the second right guide 850*b* may be spaced apart from each other. The right lead screw 840*a* may be located between the first right guide 850*a* and the second right guide 850*b*.

The right slider 860*a* may include a protrusion. Alternatively, the display device may include a protrusion formed in the right slider 860*a*. The protrusion may be formed in the body of the slider. The protrusion may include a forward protrusion (not shown) protruding in the +z-axis direction from the body 861*a* of the right slider 860*a* and a rearward protrusion 865*a* protruding in the −z-axis direction from the body of the slider.

The first right guide 850*a* may penetrate the rearward protrusion 865*a*. Alternatively, a first hole 863*a* formed in the rearward protrusion may be included, and the first right guide 850*a* may penetrate the first hole 863*a*. The first hole 863*a* may be formed in the x-axis direction. The first hole 863*a* may also be referred to as a hole 863*a*.

The second right guide (not shown) may penetrate the front protrusion (not shown). Alternatively, a second hole (not shown) formed in the front protrusion may be included, and the second right guide may penetrate the second hole. The second hole may be formed in the x-axis direction.

The right guide 850*a*, 850*b* may guide the right slider 860*a* to move more stably when the right slider 860*a* moves forward and backward along the right lead screw 840*a*. Since the right guide 850*a*, 850*b* stably guides the right slider 860*a*, the right slider 860*a* may move forward and backward along the right lead screw 840*a* without rotating with respect to the right lead screw 840*a*.

A structure formed by the left guide 850*c*, 850*d*, the left bearing 830*a*, 830*b*, 830*c* and 830*d*, the left slider 860*b*, and the left lead screw 840*b* may be symmetrical with a structures formed by the above-described right guide 850*a*, 850*b*, right bearing 830*a*, 830*b*, 830*c* and 830*d*, right slider 860*a*, and right lead screw 840*a*. In this case, the axis of symmetry may be the axis of symmetry ys of the motor assembly 810.

Figure 48:
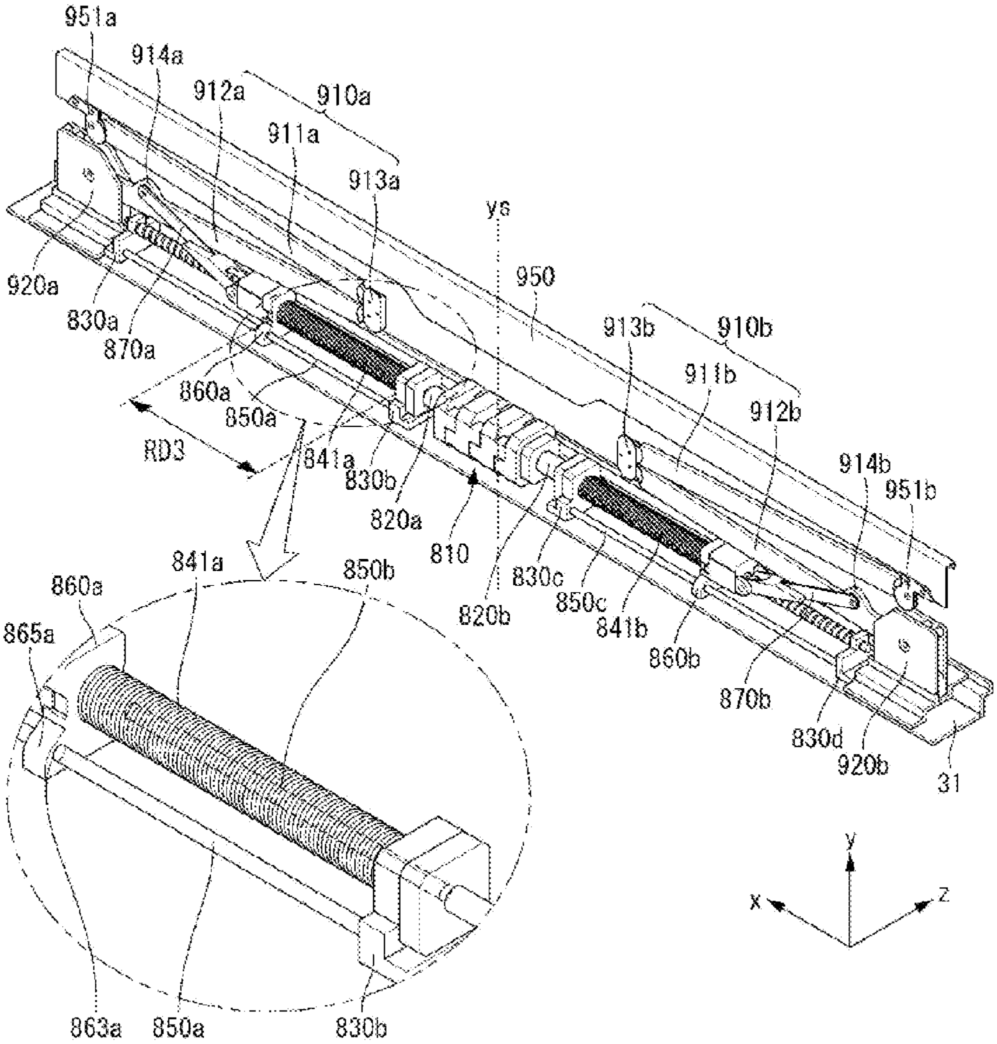

Referring to FIG. 48, the first spring 841*a*, 841*b* may be inserted into the lead screw 840*a*, 840*b*. Alternatively, the lead screw 840*a*, 840*b* may penetrate the first spring 841*a*, 841*b*. The first spring 841*a*, 841*b* may include a first right spring 841*a* disposed in the right side of the motor assembly 810 and a first left spring 841*b* disposed in the left side of the motor assembly 810.

The first right spring 841*a* may be disposed between the right slider 860*a* and the second right bearing 830*b*. One end of the first right spring 841*a* may be in contact with or separated from the right slider 860*a*. The other end of the first right spring 841*a* may be in contact with or separated from the second right bearing 830*b*.

When the second arm 912*a* lies completely against the base 31, the distance between the right slider 860*a* and the second right bearing 830*b* may be a distance RD3. The first right spring 841*a* may have a length greater than the distance RD3 in a state of not being compressed or tensioned. Thus, when the second arm 912*a* lies completely against the base 31, the first right spring 841*a* may be compressed between the right slider 860*a* and the second right bearing 830*b*. In addition, the first right spring 841*a* may provide restoring force to the right slider 860*a* in the +x-axis direction.

When the second arm 912*a* changes from a completely lying state to a standing state with respect to the base 31, the restoring force provided by the first right spring 841*a* may assist the second arm 912*a* to stand up. As the first right spring 841*a* assists the second arm 912*a* to stand up, the load of the motor assembly 810 may be reduced.

The lead screw 840*a*, 840*b* may be driven by a single motor assembly 810. As the lead screw 840*a*, 840*b* is driven by a single motor assembly 810, the second arm 912*a*, 912*b* may stand symmetrically. However, when the lead screw 840*a*, 840*b* is driven by a single motor assembly 810, a load applied to the motor assembly 810 in order to stand the second arm 912*a*, 912*b* may be excessively increased. At this time, as the first right spring 841*a* assists the second arm 912*a* to stand up, the load of the motor assembly 810 may be decreased, and the load applied to the motor assembly 810 to stand the second arm 912*a* may be reduced.

Alternatively, when the second arm 912*a* changes from a standing state to a completely lying state with respect to the base 31, the restoring force provided by the first right spring 841*a* may alleviate an impact generated when the second arm 912*a* lies on the base 31. That is, the first right spring 841*a* may serve as a damper when the second arm 912*a* lies on the base 31. As the first right spring 841*a* serves as a damper, the load of the motor assembly 810 may be reduced.

A structure formed by the first left spring 841*b*, the left bearing 830*a*, 830*b*, 830*c*, and 830*d*, the left slider 860*b*, the left lead screw 840*b*, and the second arm 912*a* may be symmetrical with a structure formed by the above-described first right spring 841*a*, right bearing 830*a*, 830*b*, 830*c*, and 830*d*, right slider 860*a*, right lead screw 840*a*, and second arm 912*a*. In this case, the axis of symmetry may be the axis of symmetry ys of the motor assembly 810.

Figure 49:
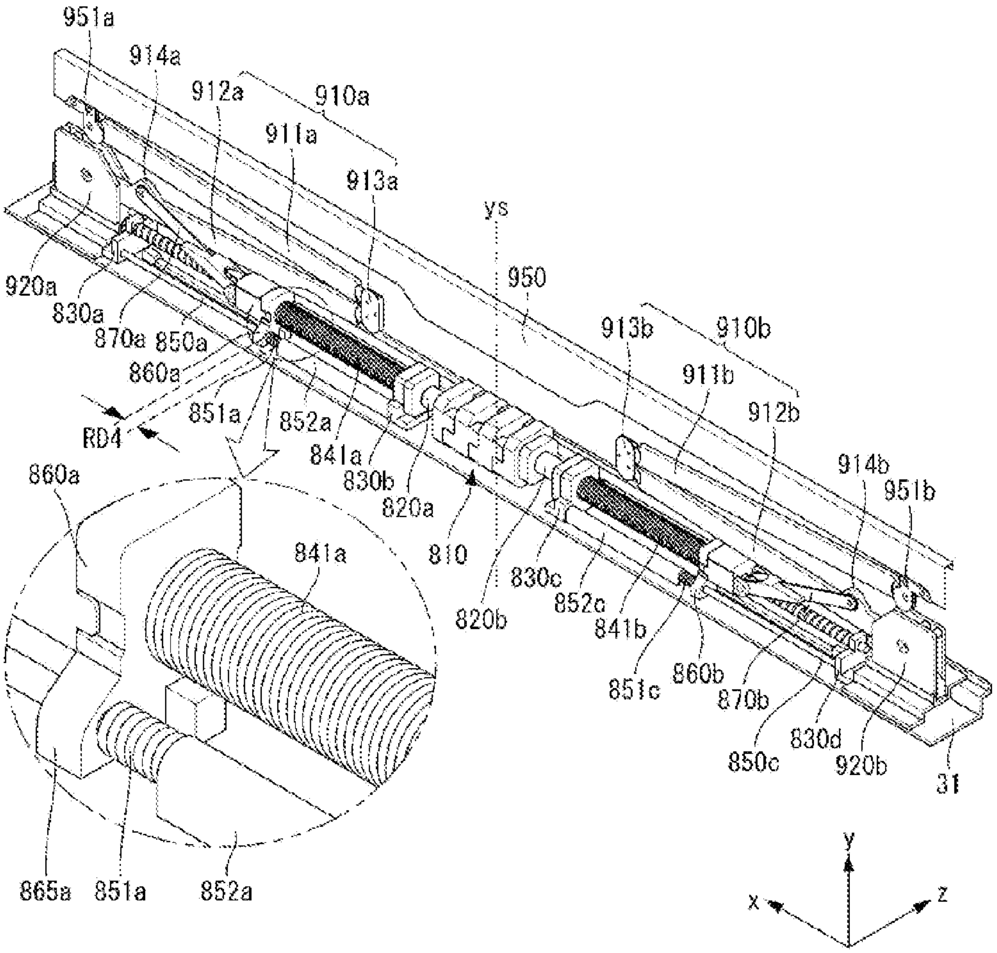

Referring to FIG. 49, the second spring 851*a*, 851*b* may be inserted into the guide 850*a*, 850*b*, 850*c*, 850*d*. Alternatively, the guide 850*a*, 850*b*, 850*c*, 850*d* may penetrate the second spring 851*a*, 851*b*. The second spring 851*a*, 851*b* may include a second right spring 851*a* disposed in the right side of the motor assembly 810 and a second left spring 851*b* disposed in the left side of the motor assembly 810.

There may be a plurality of second right springs 851*a*. The second right spring 851*a* may include a spring 940*a*, 940*b* inserted into the first right guide 850*a* and a spring 940*a*, 940*b* inserted into the second right guide 850*b*. Alternatively, the second right spring 851*a* may include a spring 940*a*, 940*b* through which the first right guide 850*a* passes and a spring 940*a*, 940*b* through which the second right guide 850*b* passes.

The guide 850*a*, 850*b*, 850*c*, 850*d* may include a locking jaw 852*a*, 852*b*. The locking jaw 852*a*, 852*b* may include a right locking jaw 852*a* disposed in the right side of the motor assembly 810 and a left locking jaw 852*b* disposed in the left side of the motor assembly 810.

The right locking jaw 852*a* may be disposed between the right slider 860*a* and the second right bearing 830*b*. In addition, the second right spring 851*a* may be disposed between the right slider 860*a* and the second right bearing 830*b*. One end of the second right spring 851*a* may be in contact with or separated from the right slider 860*a*. The other end of the second right spring 851*a* may be in contact with or separated from the right locking jaw 852*a*.

When the second arm 912*a* lies completely against the base 31, the distance between the right slider 860*a* and the right locking jaw 852*a* may be a distance RD4. The second right spring 851*a* may have a length greater than the distance RD4 in a state of not being compressed or tensioned. Accordingly, when the second arm 912*a* lies completely against the base 31, the second right spring 851*a* may be compressed between the right slider 860*a* and the right locking jaw 852*a*. In addition, the second right spring 851*a* may provide restoring force to the right slider 860*a* in the +x-axis direction.

When the second arm 912*a* changes from a completely lying state to a standing state with respect to the base 31, the restoring force provided by the second right spring 851*a* may assist the second arm 912*a* to stand up. As the second right spring 851*a* assists the second arm 912*a* to stand up, the load of the motor assembly 810 may be reduced.

The lead screw 840*a*, 840*b* may be driven by a single motor assembly 810. As the lead screw 840*a*, 840*b* is driven by a single motor assembly 810, the second arm 912*a*, 912*b* may stand symmetrically. However, when the lead screw 840*a*, 840*b* is driven by a single motor assembly 810, a load applied to the motor assembly 810 in order to stand up the second arm 912*a*, 912*b* may be excessively increased. At this time, as the second right spring 851*a* assists the second arm 912*a* to stand up, the load of the motor assembly 810 can be reduced, and a load applied to the motor assembly 810 to stand up the second arm 912*a* may be reduced.

Alternatively, when the second arm 912*a* changes from a standing state to a completely lying state with respect to the base 31, the restoring force provided by the second right spring 851*a* may relieve an impact generated when the second arm 912*a* lies on the base 31. That is, the second right spring 851*a* may serve as a damper, when the second arm 912*a* lies on the base 31. As the second right spring 851*a* serves as a damper, the load of the motor assembly 810 may be reduced.

A structure formed by the second left spring 851*b*, the left locking jaw 852*b*, the left slider 860*b*, the left guide 850*c*, 850*d*, and the second arm 912*a* may be symmetrical with a structure formed by the above-described second right spring 851*a*, right locking jaw 852*a*, right slider 860*a*, right guide 850*a*, 850*b*, and second arm 912*a*. In this case, the axis of symmetry may be the axis of symmetry ys of the motor assembly 810.

Figure 50:
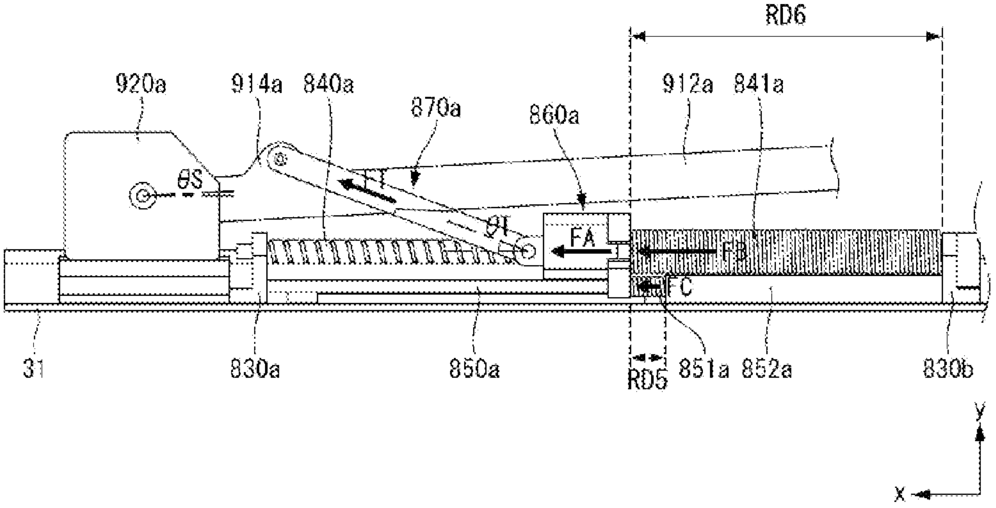
Figure 51:
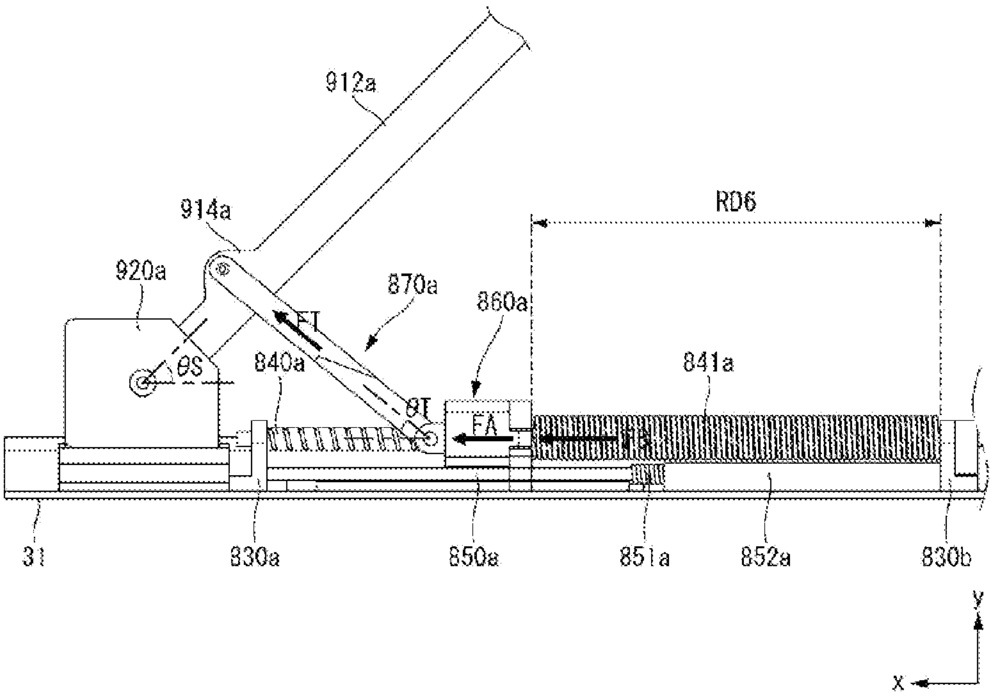
Figure 52:
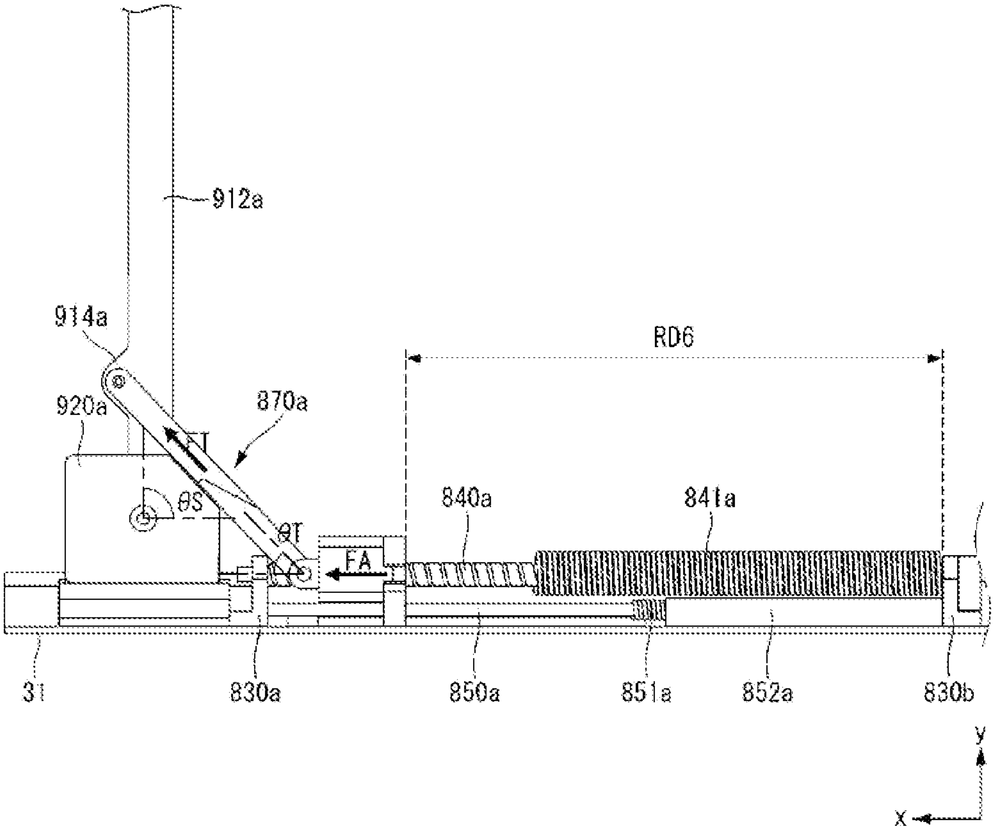

Referring to FIGS. 50 to 52, the second arm 912*a* may stand up by receiving restoring force from the first right spring 841*a* and the second right spring 851*a*.

An angle between the second arm 912*a* and the base 31 may be referred to as an angle theta S. An angle between the right rod 870*a* and the base 31 may be referred to as an angle theta T. A force by which the motor assembly 810 moves the right slider 860*a* in the +x-axis direction may be referred to as FA. A force applied by the first right spring 841*a* to the right slider 860*a* may be referred to as FB. A force applied by the second right spring 851*a* to the right slider 860*a* may be referred to as FC. A force transmitted by the right rod 870*a* to the second arm 912*a* may be referred to as FT.

When the second arm 912*a* lies completely with respect to the base 31, the angle theta S and the angle theta T may have a minimum value. When the second arm 912*a* changes from a completely lying state to a standing state with respect to the second base 31, the angle theta S and the angle theta T may gradually increase.

When the second arm 912*a* lies completely against the base 31, the first right spring 841*a* may be compressed. The compressed first right spring 841*a* may provide restoring force FB to the right slider 860*a*. The restoring force FB may act in the +x direction. When the second arm 912*a* lies completely with respect to the base 31, the amount of compression displacement of the first right spring 841*a* may be maximum, and the magnitude of the restoring force FB may have a maximum value. When the second arm 912*a* changes from a completely lying state to a standing state with respect to the base 31, the amount of compression displacement of the first right spring 841*a* may gradually decrease, and the magnitude of the restoring force FB may gradually decrease.

When the second arm 912*a* lies completely against the base 31, the second right spring 851*a* may be compressed. The compressed second right spring 851*a* may provide restoring force FC to the right slider 860*a*. The restoring force FC may act in the +x direction. When the second arm 912*a* lies completely with respect to the base 31, the amount of compression displacement of the second right spring 851*a* may be maximum, and the magnitude of the restoring force FC may have the maximum value. When the second arm 912*a* changes from a completely lying state to a standing state with respect to the base 31, the amount of compression displacement of the second right spring 851*a* may gradually decrease, and the magnitude of the restoring force FC may gradually decrease.

The force FT transmitted by the right rod 870*a* to the second arm 912*a* may be the resultant force of a force FA by which the motor assembly 810 moves the right slider 860*a* in the +x axis, a restoring force FB of the first right spring 841*a*, and a restoring force FC of the second right spring 851*a*

When the second arm 912*a* starts to stand up in a state where the second arm 912*a* lies completely against the base 31, the load of the motor assembly 810 may be maximum. At this time, the magnitude of the restoring force FB provided by the first right spring 841*a* may be maximum. In addition, the magnitude of the restoring force FC provided by the second spring 851*a*, 851*b* may be maximum.

When the second arm 912*a* changes from a completely lying state to a standing state with respect to the base 31, the restoring force provided by the first right spring 841*a* and the second right spring 851*a* may assist the second arm 912*a* to stand up. As the first right spring 841*a* and the second right spring 851*a* assist the second arm 912*a* to stand up, the load of the motor assembly 810 may be reduced.

The first right spring 841*a* and the second right spring 851*a* may simultaneously provide a restoring force (the resultant force of the restoring force FB and the restoring force FC) to the right slider 860*a*. The restoring force (the resultant force of the restoring force FB and the restoring force FC) may be provided to the right slider 860*a* until the distance RD5 between the right slider 860*a* and the right locking jaw 852*a* becomes equal to the length of the second right spring 851*a*. When the distance RD5 between the right slider 860*a* and the right locking jaw 852*a* is equal to the length of the second right spring 851*a*, the amount of compression displacement of the second right spring 851*a* may become zero. When the amount of compression displacement of the second right spring 851*a* becomes zero, the restoring force FC provided to the right slider 860*a* by the second right spring 851*a* may become zero.

When the distance RD5 between the right slider 860*a* and the right locking jaw 852*a* is greater than the length of the second right spring 851*a*, only the first right spring 841*a* may provide the restoring force FB to the right slider 860*a*. The restoring force FB may be applied to the right slider 860*a* until the distance RD6 between the right slider 860*a* and the second right bearing 830*b* becomes equal to the length of the first right spring 841*a*.

When the distance RD6 between the right slider 860*a* and the second right bearing 830*b* is equal to the length of the first right spring 841*a*, the amount of compression displacement of the first right spring 841*a* may be zero. When the amount of compression displacement of the first right spring 841*a* becomes zero, the restoring force FB provided to the right slider 860*a* by the first right spring 841*a* may become zero.

When the distance RD6 between the right slider 860*a* and the second right bearing 830*b* is greater than the length of the first right spring 841*a*, the motor assembly 810 may stand up the second arm 912*a* without receiving a restoring force from the first right spring 841*a* or the second right spring 851*a*.

A structure formed by the first left spring 841*b*, the second left spring 851*b*, the left locking jaw 852*b*, the left slider 860*b*, the left guide 850*c*, 850*d*, the left lead screw 840*b*, the left rod 870*b*, and the second arm 912*a* may be symmetrical with a structure formed by the above-described first right spring 841*a*, second right spring 851*a*, right locking jaw 852*a*, right slider 860*a*, right guide 850*a*, 850*b*, right lead screw 840*a*, right rod 870*a*, and second arm 912*a*. In this case, the axis of symmetry may be the axis of symmetry ys of the motor assembly 810.

Figure 53:
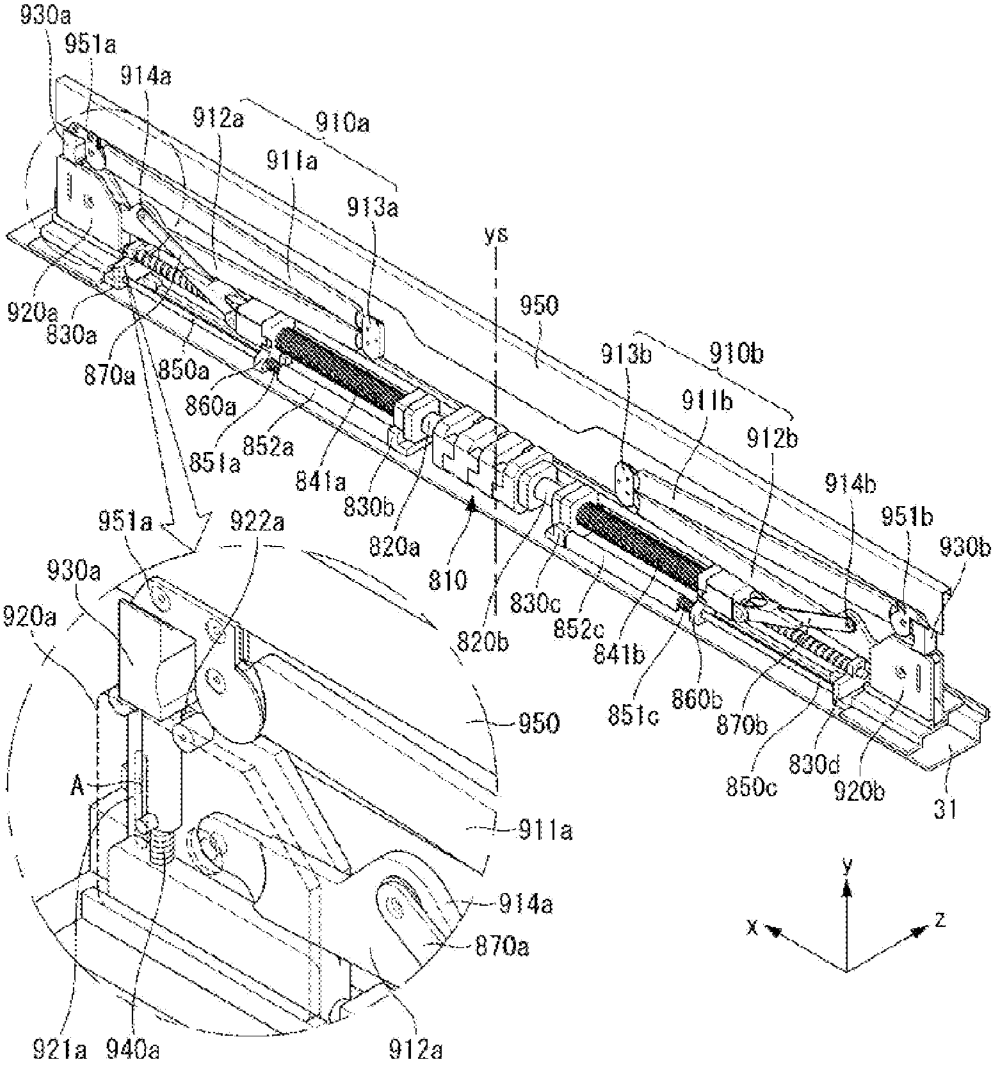

Referring to FIG. 53, a pusher 930*a*, 930*b* may be connected to link mount 920*a*, 920*b*. The pusher 930*a*, 930*b* may include a right pusher 930*a* disposed in the right side of the motor assembly 810 and a left pusher 930*b* disposed in the left side of the motor assembly 810.

The link mount 920*a*, 920*b* may form an accommodation space A. The accommodation space A may accommodate the spring 940*a*, 940*b* and the pusher 930*a*, 930*b*. The spring 940*a*, 940*b* may include a right spring 940*a* disposed in the right side of the motor assembly 810 and a left spring 940*b* disposed in the left side of the motor assembly 810. The accommodation space A may also be referred to as an inner space A.

The link mount 920*a*, 920*b* may include a first hole 922*a* connecting the accommodation space A and the outside space (a first hole corresponding to 920*b* is not shown). The first hole 922*a* may be formed in the upper surface of the link mount 920*a*, 920*b*. The first hole 922*a* may also be referred to as a hole 922*a*.

The pusher 930*a*, 930*b* may be located perpendicular to the base 31. Alternatively, the pusher 930*a*, 930*b* may be disposed parallel to the y-axis. The spring 940*a*, 940*b* may be located perpendicular to the base 31. Alternatively, the spring 940*a*, 940*b* may be disposed parallel to the y-axis.

The pusher 930*a*, 930*b* may include a first part 931*a*, 931*b* and a second part 932*a*, 932*b*. The second part 932*a*, 932*b* may be connected to the lower side of the first part 931*a*, 931*b*. The lower end of the second part 932*a*, 932*b* may be connected to the spring 940*a*, 940*b*. All or part of the second part 932*a*, 932*b* may be accommodated in the accommodation space A formed by the link mount 920*a*, 920*b*. The second part 932*a*, 932*b* may have the same diameter as the first hole 922*a* or a smaller diameter than the first hole 922*a*. The second part 932*a*, 932*b* may penetrate the first hole 922*a*.

The first part 931*a*, 931*b* may be located outside the link mount 920*a*, 920*b*. Alternatively, the first part 931*a*, 931*b* may be located outside the accommodation space A of the link mount 920*a*, 920*b*. The first part 931*a*, 931*b* may have a larger diameter than the diameter of the first hole 922*a*.

The first part 931*a*, 931*b* may be in contact with or be separated from the link bracket 951*a*, 951*b*. For example, when the second arm 912*a*, 912*b* lies completely on the base 31, the first part 931*a*, 931*b* may come into contact with the link bracket 951*a*, 951*b*. Alternatively, when the second arm 912*a*, 912*b* completely stands up against the base 31, the first part 931*a*, 931*b* may be spaced apart from the link bracket 951*a*, 951*b*.

When the first part 931*a*, 931*b* comes into contact with the link bracket 951*a*, 951*b*, the pusher 930*a*, 930*b* may receive force from the link bracket 951*a*, 951*b*. The force received by the pusher 930*a*, 930*b* may be in a downward direction. Alternatively, the force received by the pusher 930*a*, 930*b* may be in the −y axis direction. Alternatively, the link bracket 951*a*, 951*b* may press the pusher 930*a*, 930*b*. A direction in which the link bracket 951*a*, 951*b* presses the pusher 930*a*, 930*b* may be in a downward direction. Alternatively, the direction in which the link bracket 951*a*, 951*b* presses the pusher 930*a*, 930*b* may be in the −y axis direction.

When the first part 931*a*, 931*b* receive force, the spring 940*a*, 940*b* may be compressed. The compressed spring 940*a*, 940*b* may provide restoring force to the pusher 930*a*, 930*b*. The direction of the restoring force may be opposite to the direction of the force applied to the first part 931*a*, 931*b*. Alternatively, the restoring force may act in the +y-axis direction.

The link mount 920*a*, 920*b* may include a second hole 921*a* (a second hole corresponding to 920*b* is not shown). The second hole 921*a* may connect the accommodation space A and an external space. All or part of the spring 940*a*, 940*b* may be exposed to the outside through the second hole 921*a*. All or part of the pusher 930*a*, 930*b* may be exposed to the outside through the second hole 921*a*. During maintenance or repair of the display device, a service provider may check the operating state of the pusher 930*a*, 930*b* through the second hole 921*a*. The second hole 921*a* may provide a service provider with a convenience in maintenance or repair.

Figure 54:
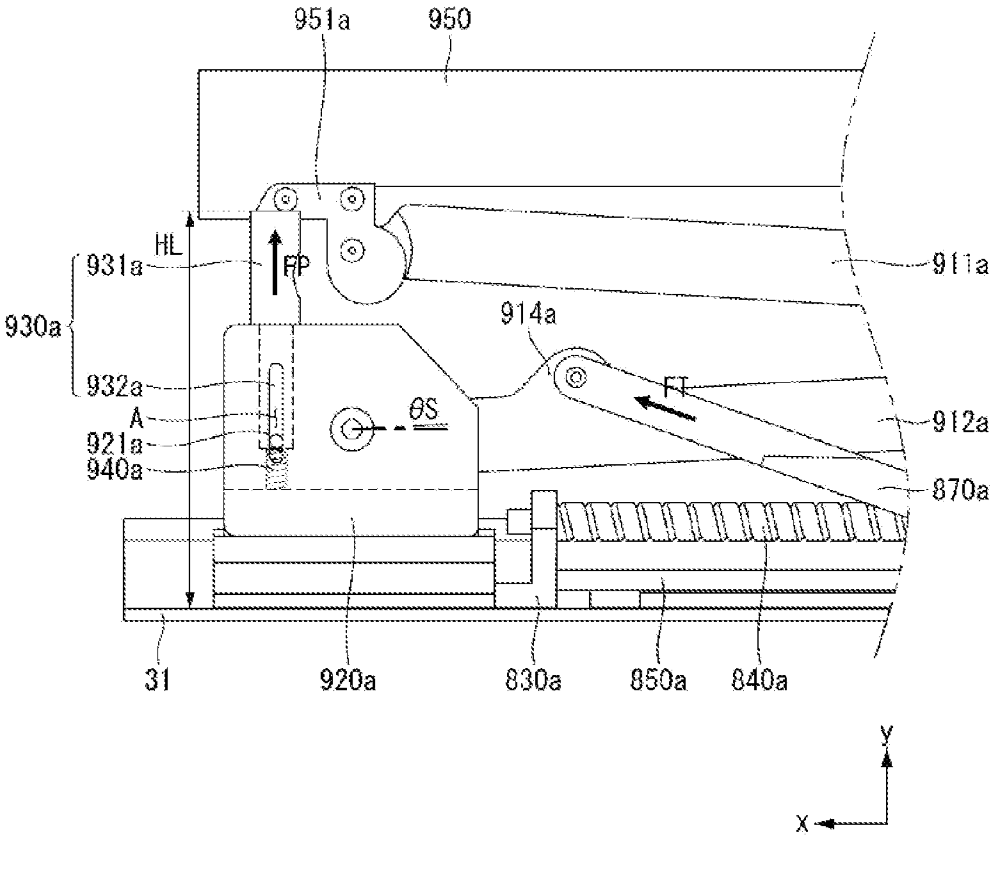
Figure 55:
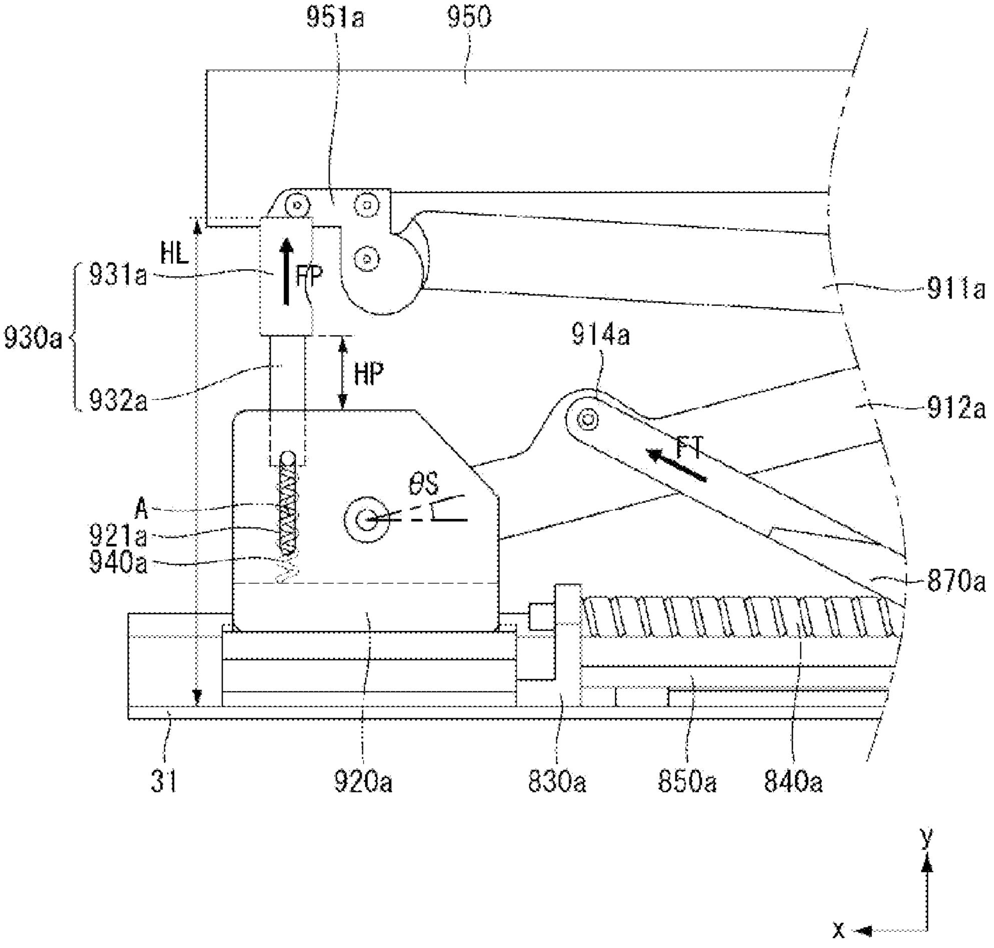
Figure 56:
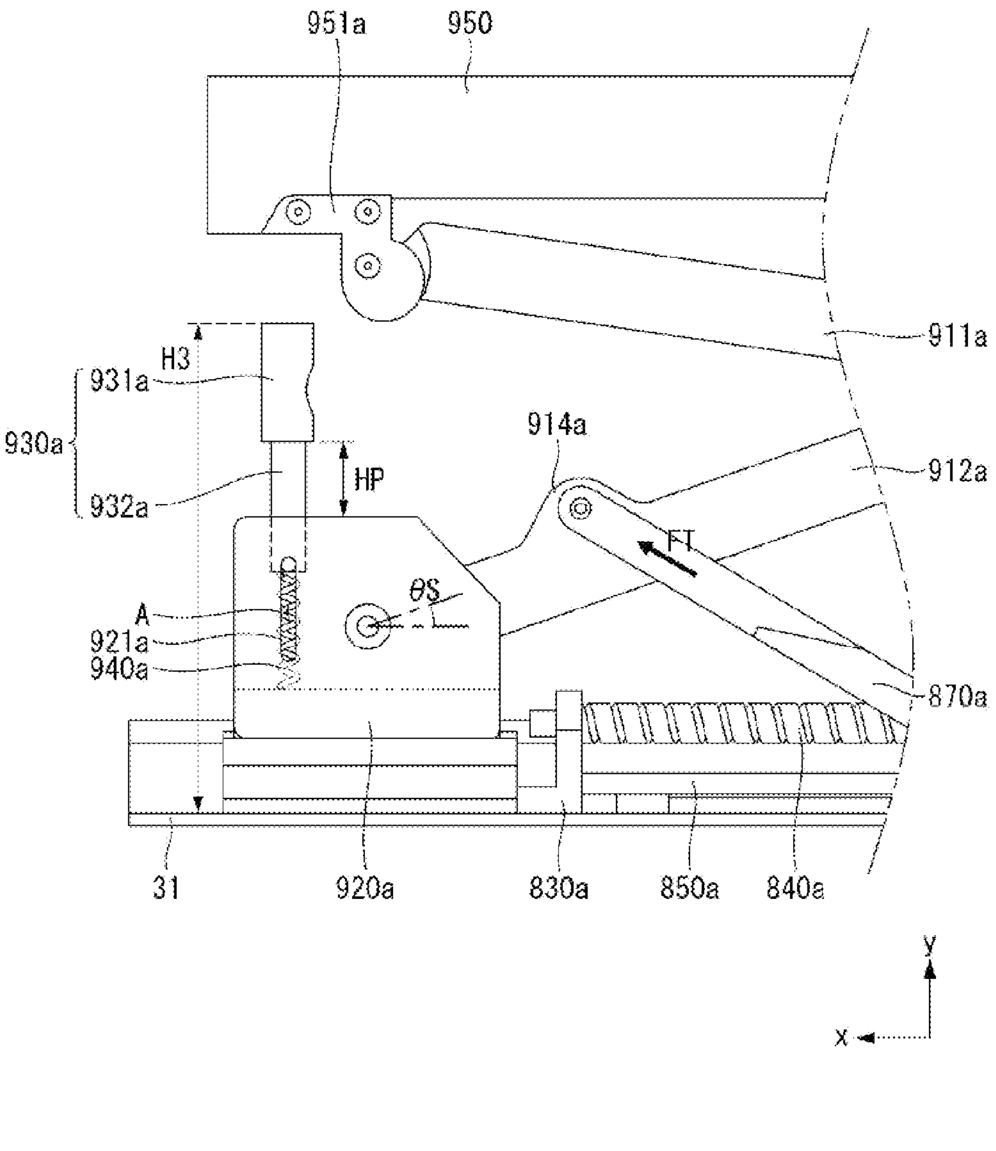

Referring to FIGS. 54 to 56, the right link 910*a* may stand up by receiving the restoring force from the right pusher 930*a*. A description will be made based on the right link 910*a*.

An angle between the second arm 912*a* and the base 31 may be referred to as an angle theta S. A force transmitted by the right rod 870*a* to the second arm 912*a* may be referred to as FT. A force transmitted by the right pusher 930*a* to the right link bracket 951*a* may be referred to as FP.

Referring to FIG. 54, when the second arm 912*a* lies completely on the base 31, the angle theta S may have a minimum value. The right spring 940*a* connected to the right pusher 930*a* may be maximally compressed, and the magnitude of the restoring force FP may have a maximum value. The compressed right spring 940*a* may provide restoring force FP to the right pusher 930*a*. The right pusher 930*a* may transmit the restoring force FP to the right link bracket 951*a*. The restoring force FP may act in the +y-axis direction.

When the second arm 912*a* lies completely with respect to the base 31, the distance HL from the base 31 to the upper end of the right pusher 930*a* may have a minimum value. The first part 931*a* of the right pusher 930*a* may protrude to the outside of the right link mount 920*a*, and the second part 932*a* of the right pusher 930*a* may be entirely accommodated in the accommodation space 923*a* of the right link mount 920*a*.

Referring to FIG. 55, when the second arm 912*a* changes from a completely lying state to a standing state with respect to the base 31, the angle theta S may gradually increase. The amount of compression displacement of the right spring 940*a* may gradually decrease, and the magnitude of the restoring force FP may gradually decrease.

As the angle theta S gradually increases, at least a part of the second part 932*a* of the right pusher 930*a* may protrude to the outside of the right link mount 920*a*. The protruding length of the second part 932*a* of the right pusher 930*a* to the outside of the right link mount 920*a* may be referred to as a length HP. The distance HL from the base 31 to the upper end of the right pusher 930*a* may increase by HP in comparison with a case where the second arm 912*a* lies completely on the base 31.

Referring to FIG. 56, when the second arm 912*a* stands up with respect to the base 31, the right pusher 930*a* and the right link bracket 951*a* may be separated from each other. The amount of compression displacement of the right spring 940*a* may become zero. When the amount of compression displacement of the right spring 940*a* becomes zero, the restoring force FP provided by the right pusher 930*a* to the right link bracket 951*a* may become zero.

In addition, the protruding length HP of the second part 932*a* of the right pusher 930*a* to the outside of the right link mount 920*a* may have a maximum value. Further, the distance HL from the base 31 to the upper end of the right pusher 930*a* may have a maximum value.

That is, the right pusher 930*a* applies a restoring force to the right link bracket 951*a* while the right pusher 930*a* is in contact with the right link bracket 951*a*, thereby assisting the second arm 912*a* to stand up and reducing a load of the motor assembly 810.

The lead screw 840*a*, 840*b* may be driven by a single motor assembly 810. As the lead screw 840*a*, 840*b* is driven by a single motor assembly 810, the second arm 912*a*, 912*b* may stand symmetrically. However, when the lead screw 840*a*, 840*b* is driven by a single motor assembly 810, a load applied to the motor assembly 810 in order to stand the second arm 912*a*, 912*b* may be excessively increased. At this time, the right pusher 930*a* may assist the second arm 912*a* to stand up and reduce the load of the motor assembly 810 by applying restoring force to the right link bracket 951*a*.

Alternatively, when the second arm 912*a* changes from a standing state to a completely lying state with respect to the base 31, the restoring force provided by the right pusher 930*a* to the right link bracket 951*a* may alleviate the impact generated when the link 910*a* lies on the base 31. That is, when the link 910*a* lies on the base 31, the restoring force provided to the right link bracket 951*a* by the right pusher 930*a* may serve as a damper. As the right pusher 930*a* serves as a damper, the load of the motor assembly 810 may be reduced.

A structure formed by the left pusher 930*b*, the left spring 940*b*, the left link bracket 951*b*, the left link mount 920*b*, and the left rod 870*b* may be symmetrical with a structure formed by the above described right pusher 930*a*, right spring 940*a*, right link bracket 951*a*, right link 910*a* mount, and right rod 870*a*. In this case, the axis of symmetry may be the axis of symmetry of the motor assembly 810.

Figure 57:
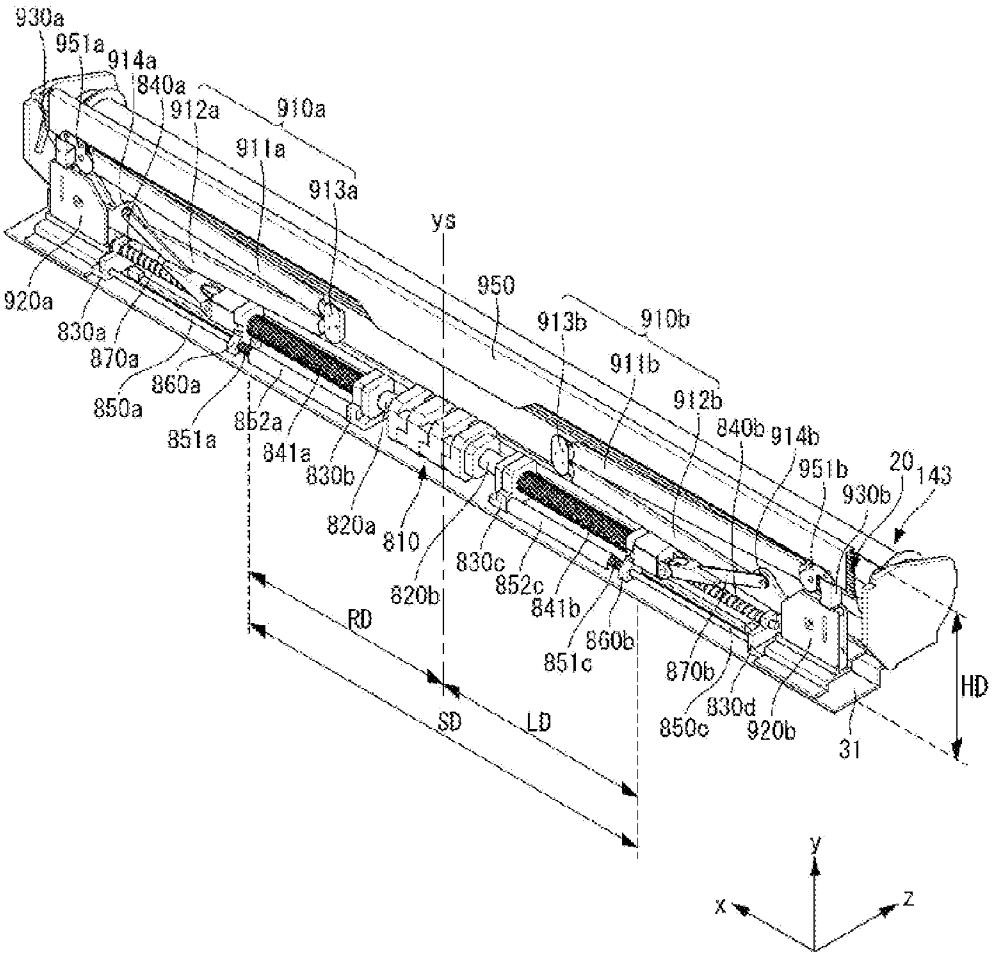
Figure 58:
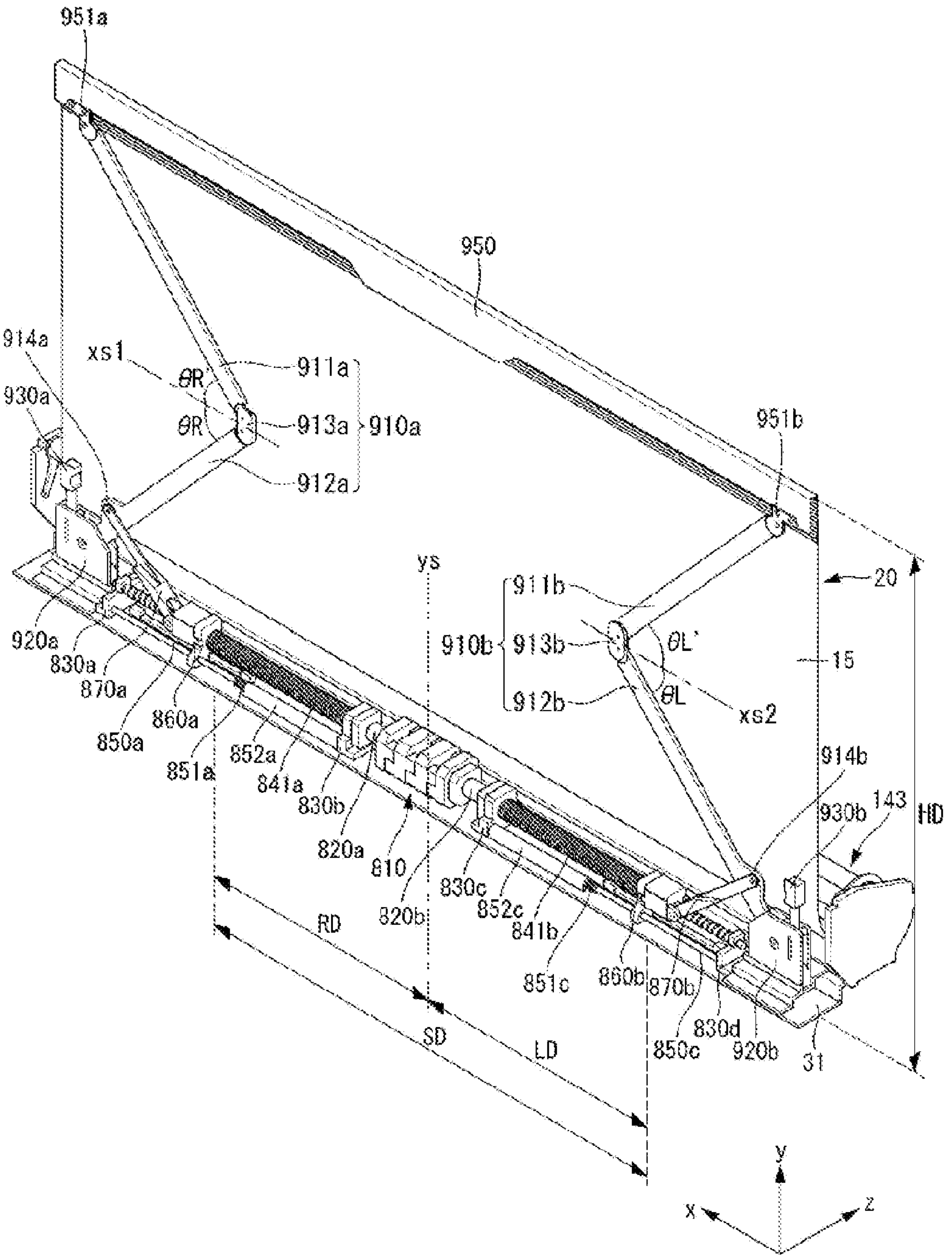
Figure 59:
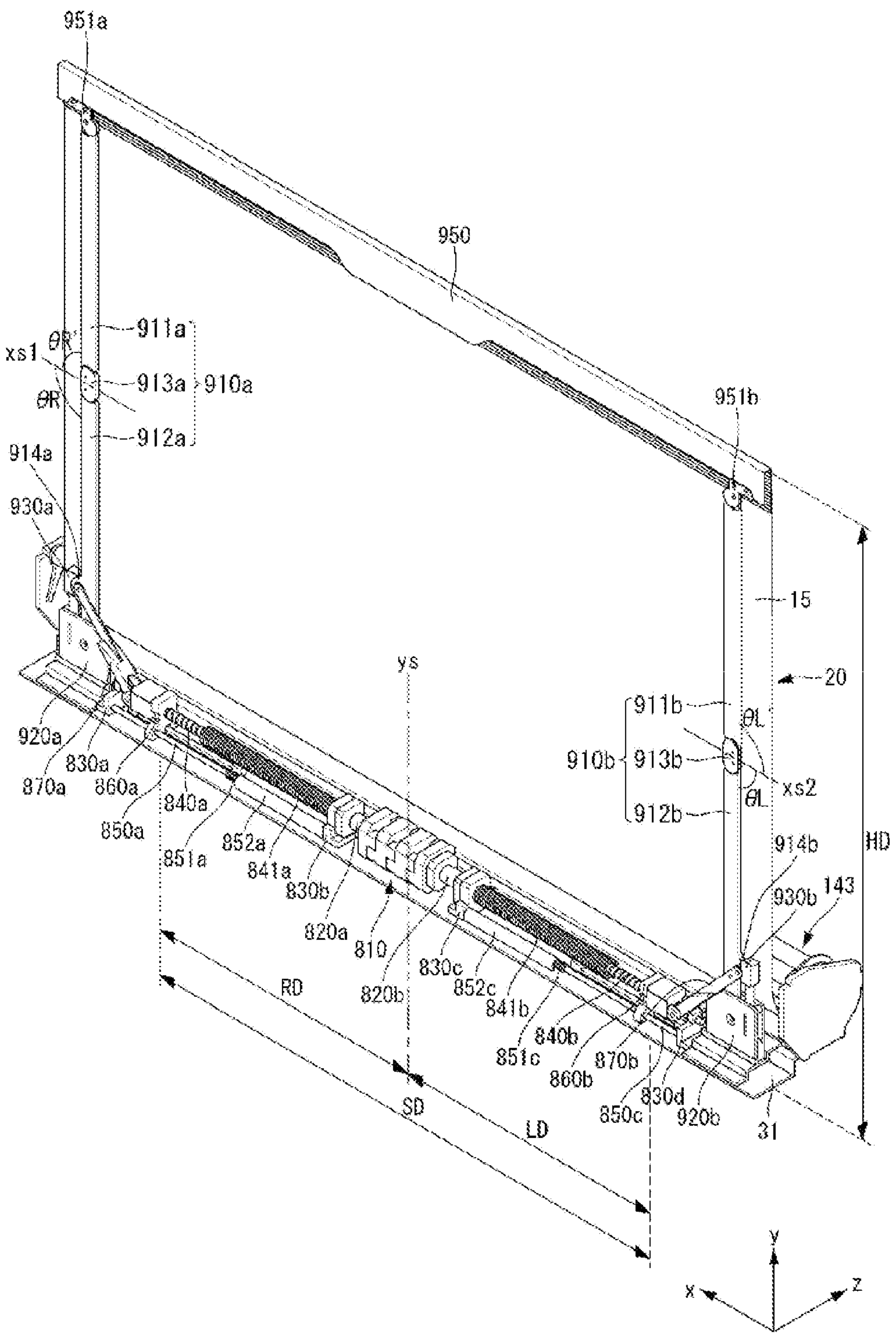

Referring to FIGS. 57 to 59, the panel roller 143 may be installed in the base 31. The panel roller 143 may be installed in front of the lead screw 840*a*, 840*b*. Alternatively, the panel roller 143 may be disposed parallel to the longitudinal direction of the lead screw 840*a*, 840*b*. Alternatively, the panel roller 143 may be spaced apart from the lead screw 840*a*, 840*b*.

The display unit 20 may include a display panel 10 and a module cover 15. The lower side of the display unit 20 may be connected to the panel roller 143 and the upper side of the display unit 20 may be connected to the upper bar 75. The display unit 20 may be wound around or unwound from the panel roller 143.

A distance from the symmetry axis ys of the motor assembly 810 to the right slider 860*a* may be referred to as a distance RD. A distance from the symmetry axis ys of the motor assembly 810 to the left slider 860*b* may be referred to as a distance LD. A distance between the right slider 860*a* and the left slider 860*b* may be referred to as a distance SD. A distance SD may be the sum of the distance RD and the distance LD. A distance from the base 31 to the upper end of the display unit 20 may be referred to as a distance HD.

Referring to FIG. 57, when the second arm 912*a*, 912*b* lie completely on the base 31, the distance SD between the right slider 860*a* and the left slider 860*b* may have a minimum value. The distance RD from the axis of symmetry ys of the motor assembly 810 to the right slider 860*a* may be equal to the distance LD from the axis of symmetry ys of the motor assembly 810 to the left slider 860*b*. When the second arm 912*a*, 912*b* is completely lying on the base 31, the distance HD from the base 31 to the upper end of the display unit 20 may have a minimum value.

When the second arm 912*a*, 912*b* lies completely against the base 31, the first spring 841*a*, 841*b* may be in contact with the slider 860*a*, 860*b*. In addition, the second spring 851*a*, 851*b* may be in contact with the slider 860*a*, 860*b*. In addition, the pusher 930*a*, 930*b* may be in contact with the link bracket 951*a*, 951*b*.

When the second arm 912*a*, 912*b* lies completely against the base 31, the compression amount of the first spring 841*a*, 841*b* may have a maximum value, and the magnitude of restoring force provided to the slider 860*a*, 860*b* by the first spring 841*a*, 841*b* may have a maximum value.

When the second arm 912*a*, 912*b* lies completely against the base 31, the compression amount of the second spring 851*a*, 851*b* may have a maximum value, and the magnitude of restoring force provided by the second spring 851*a*, 851*b* to the slider 860*a*, 860*b* may have a maximum value.

When the second arm 912*a*, 912*b* lies completely against the base 31, the compression amount of the second spring 851*a*, 851*b* may have a maximum value, and the magnitude of restoring force provided by the spring 940*a*, 940*b* to the pusher 930*a*, 930*b* may have a maximum value.

When the second arm 912*a*, 912*b* starts to stand up with respect to the base 31, the second arm 912*a*, 912*b* may stand up by receiving restoring force from the first spring 841*a*, 841*b*, the second spring 851*a*, 851*b*, and the spring 940*a*, 940*b*. Thus, a load applied to the motor assembly 810 may be reduced.

Referring to FIG. 58, as the standing of the second arm 912*a*, 912*b* with respect to the base 31 progresses, the distance SD between the right slider 860*a* and the left slider 860*b* may gradually increase.

Even if the distance SD increases, the distance LD and the distance RD may be equal to each other. That is, the right slider 860*a* and the left slider 860*b* may be located symmetrically based on the symmetry axis ys of the motor assembly 810. In addition, the degree to which the second arm 912*a*, 912*b* of the right link 910*a* stands with respect to the base 31 and the degree to which the second arm 912*a*, 912*b* of the left link 910*b* stands with respect to the base 31 may be mutually equal.

As the standing of the second arm 912*a*, 912*b* with respect to the base 31 progresses, the distance HD from the base 31 to the upper end of the display unit 20 may gradually increase. The display unit 20 may be unwound from the panel roller 143. Alternatively, the display unit 20 may be unfolded from the panel roller 143.

When the second arm 912*a*, 912*b* sufficiently stands up with respect to the base 31, the first spring 841*a*, 841*b* may be separated from the slider 860*a*, 860*b*. In addition, when the second arm 912*a*, 912*b* sufficiently stands up with respect to the base 31, the second spring 851*a*, 851*b* may be separated from the slider 860*a*, 860*b*. In addition, when the second arm 912*a*, 912*b* sufficiently stands up with respect to the base 31, the pusher 930*a*, 930*b* may be separated from the link bracket 951*a*, 951*b*.

The separation of the first spring 841*a*, 841*b* from the slider 860*a*, 860*b*, the separation of the second spring 851*a*, 851*b* from the slider 860*a*, 860*b*, and the separation of the pusher 930*a*, 930*b* from the link bracket 951*a*, 951*b* may progress independently of each other. That is, the order of the separation of the first spring 841*a*, 841*b* from the slider 860*a*, 860*b*, the separation of the second spring 851*a*, 851*b* from the slider 860*a*, 860*b*, and the separation of the pusher 930*a*, 930*b* from the link bracket 951*a*, 951*b* may be mutually variable.

An angle formed between an axis xs1 parallel to the base 31 and the second arm 912*a* may be referred to as theta R. In addition, an angle formed between an axis xs1 parallel to the base 31 and the first arm 911*a* may be referred to as theta R'. The axis xs1 and x-axis may be parallel. When the second arm 912*a* is completely lying on the base 31, or while the second arm 912*a* is standing up against the base 31, or when the standing of the second arm 912*a* with respect to the base 31 is completed, theta R and theta R' may be maintained to be the same.

An angle formed by an axis xs2 parallel to the base 31 and the second arm 912*b* may be referred to as theta L. In addition, an angle formed between the axis xs2 parallel to the base 31 and the first arm 911*b* may be referred to as theta L'. The axis xs2 and x-axis may be parallel.

When the second arm 912*b* is completely lying on the base 31, or while the second arm 912*b* is standing up against the base 31, or when the standing of the second arm 912*b* with respect to the base 31 is completed, theta L and theta L' may be maintained to be the same.

The axis xs1 and the axis xs2 may be mutually the same axis.

Referring to FIG. 59, when the second arm 912*a*, 912*b* completely stands up with respect to the base 31, the distance SD between the right slider 860*a* and the left slider 860*b* may have a maximum value. Even when the distance SD is maximum, the distance LD and the distance RD may be equal to each other. When the second arm 912*a*, 912*b* completely stand up with respect to the base 31, the distance HD from the base 31 to the upper end of the display unit 20 may have a maximum value.

Figure 60:
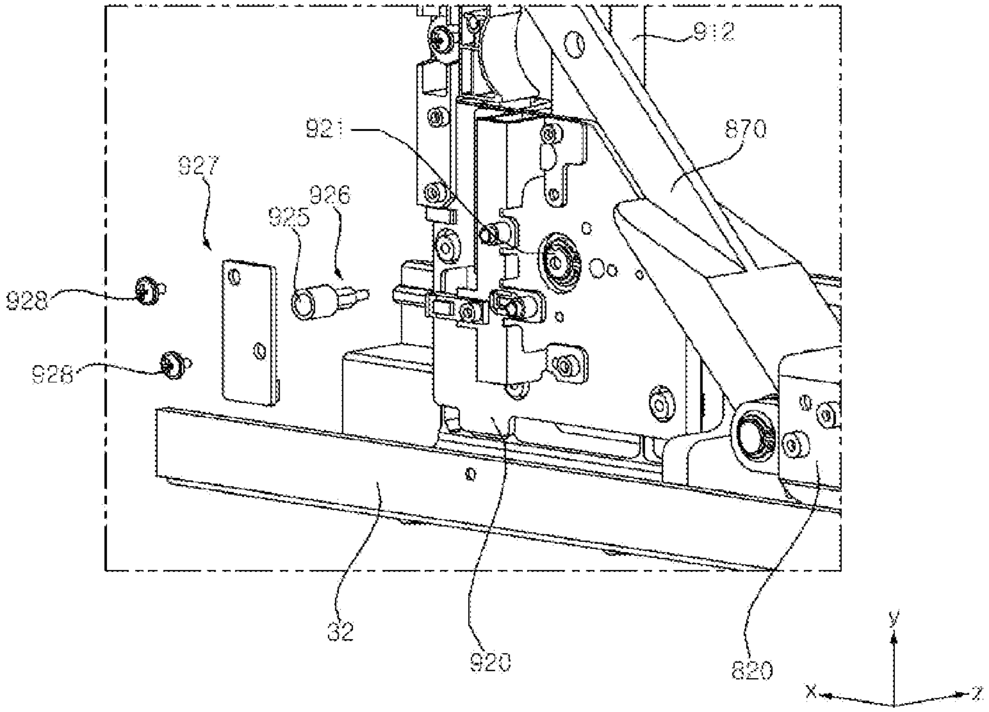

Referring to FIG. 60, the second arm 912 may be pivotably connected to the link mount 920. The second arm 912 of the link 910 (see FIG. 42) may be pivotably connected to the shaft 921 formed in the link mount 920. Here, the shaft 921 may be referred to as a pivot center of the link 910 or a pivot center of the second arm 912.

The second arm 912 may pivot based on the shaft 921 to stand the link 910. That is, the link 910 may be pivotally connected to the link mount 920 to lift the display panel 10.

A pivot magnet 925 may be fixed to a pivot center of the link 910. The pivot center magnet 925 may coincide with a pivot center of the second arm 912. The pivot magnet 925 may pivot together when the second arm 912 pivots. For example, when the second arm 912 pivots clockwise or counterclockwise, the pivot magnet 925 may also pivot clockwise or counterclockwise.

The pivot magnet 925 may be connected to the shaft 921 via a coupling shaft 926. One side of the pivot magnet 925 may be coupled to the coupling shaft 926 based on the pivot center, and the coupling shaft may be coupled to the pivot center of the second arm 912. The pivot center of the second arm 912 may include an angular groove. A part of the coupling shaft 926 may be angulated to correspond to a shape of a groove formed at the pivot center of the second arm 912.

An encoder device 927 may be coupled to a rear side of the link mount 920. The encoder device 927 may be disposed rearwardly spaced from the pivot magnet 925. The encoder device 927 may be fastened to the link mount 920 through a screw 928.

Figure 70:
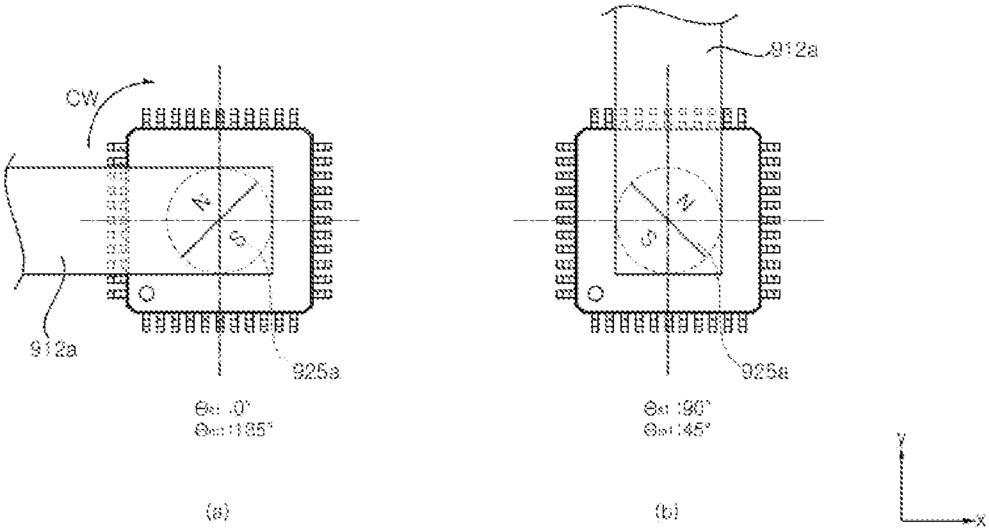

Meanwhile, the pivot magnet 925 may include a first pivot magnet 925*a* coupled to the pivot center of the second arm 912*a* of the right link 910*a* (see FIG. 70). In addition, the pivot magnet 925 may include a second pivot magnet 925*b* coupled to the pivot center of the second arm 912*b* of the left link 910*b* (see FIG. 68).

Figure 61:
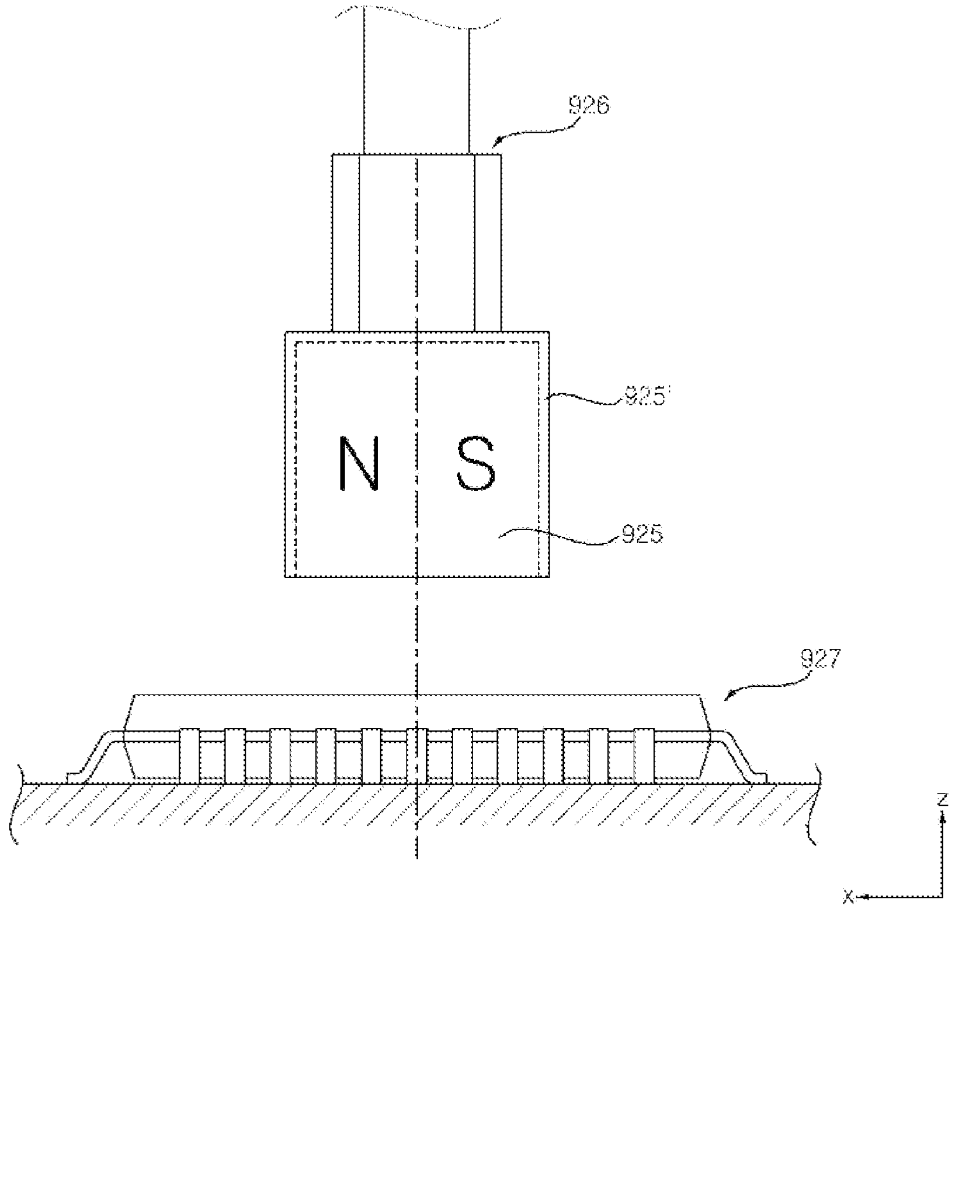
Figure 62:
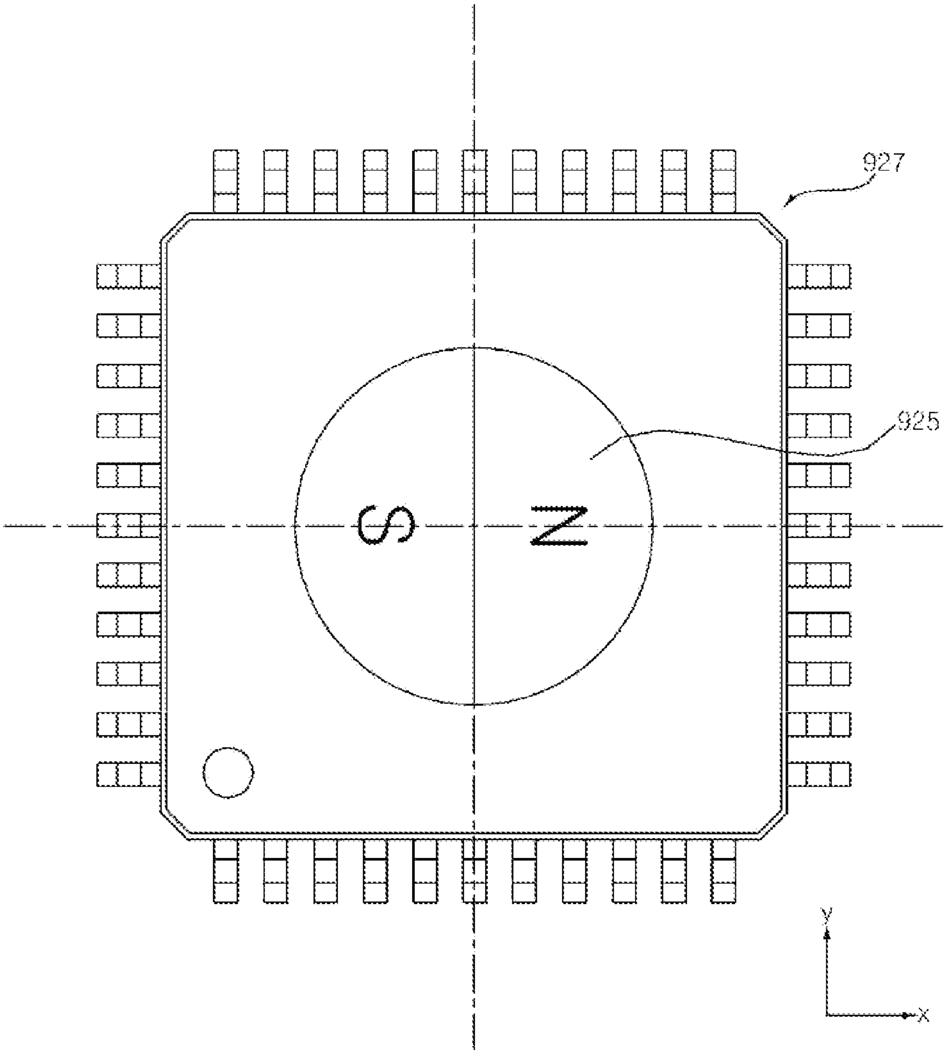

Referring to FIGS. 61 and 62, the pivot magnet 925 may be a permanent magnet. The pivot magnet 925 may have a cylindrical shape. The pivot magnet 925 may be composed of a plurality of magnetic poles along a rotation direction based on a pivot center. For example, the pivot magnet 925 may be composed of two poles along the rotation direction. That is, the pivot magnet 925 may have a magnetic pattern with a bottom surface composed of two poles based on a pivot center.

The pivot magnet 925 may be accommodated in a magnet cover 925' (see FIG. 61) fixed to one end of the coupling shaft 926*a*, 926*b*. The magnet cover 925' (see FIG. 61) may surround a circumferential surface of the pivot magnet 925.

The encoder device 927 may be spaced apart in parallel from a bottom surface formed in one side of the pivot magnet 925. The encoder device 927 may detect a position according to rotation of the pivot magnet 925. The encoder device 927 may output a signal for the absolute position of the pivot magnet 925 by detecting a magnetic field that changes according to the pivot of the pivot magnet 925. That is, the encoder device 927 may be a magnetic absolute encoder. The encoder device 927 may be mounted on a PCB that processes signals of the encoder device. The encoder device 927 may be a concept including the PCB.

Figure 63:
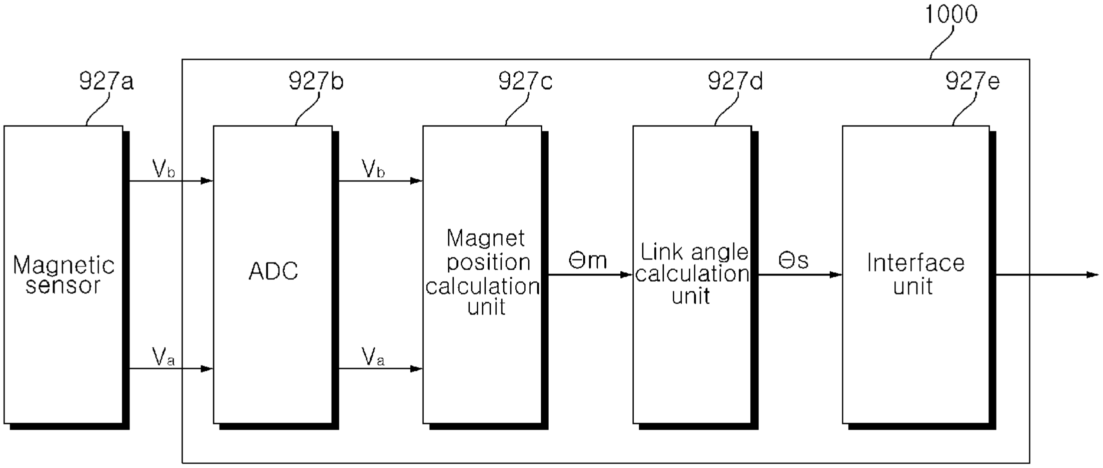
Figure 64:
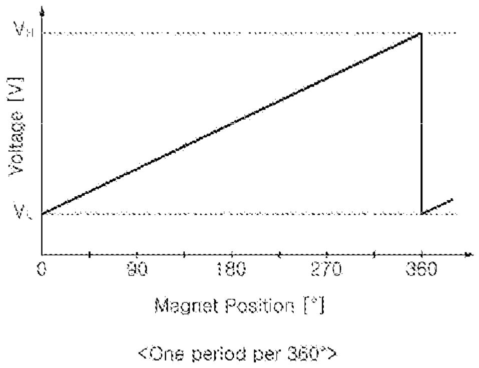
Figure 64:
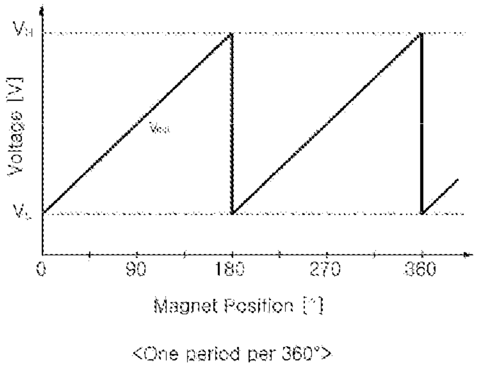

Referring to FIGS. 63 and 64, the encoder device 927 (see FIG. 61) may include a magnetic sensor 927*a* and a controller 1000. The controller 1000 may include a signal processing circuit such as an analog-to-digital conversion circuit (hereinafter, ADC) 927*b*, a magnet position calculation unit 927*c*, and a link angle calculation unit 927*d*, and an interface unit 927*e*.

The magnetic sensor 927*a* may be disposed to face the pivot magnet 925 (see FIG. 61). The magnetic sensor 927*a* may detect a magnetic field from the pivot magnet 925. The magnetic sensor 927*a* may detect a direction of an external magnetic field that changes according to rotation of the pivot magnet 925, and output an electric signal. For example, a known SV-GMR type magnetic sensor, an AMR type magnetic sensor, or a Hall sensor using a magnetic pole position detection element (Hall element) may be used as the magnetic sensor 927*a*. Hereinafter, the magnetic sensor 927*a* will be described using a hall sensor as an example.

The magnetic sensor 927*a* may detect the position of the magnetic pole of the pivot magnet 925. The magnetic sensor 927*a* may detect a magnetic field formed by a magnetic pole pattern of the pivot magnet 925, and transmit an analog electric signal. For example, the electrical signal may be a voltage signal.

A plurality of magnetic sensors 927*a* may be arranged. A plurality of magnetic sensors 927*a* may be arranged in a circumferential direction of the pivot magnet 925. A plurality of magnetic sensors 927*a* may be arranged to have a specific phase difference from each other. The plurality of magnetic sensors 927*a* may output different analog electrical signals corresponding to a specific position of the pivot magnet 925. For example, the magnetic sensor 927*a* may output a cos-waveform voltage signal Vb and a sine-waveform voltage signal Va that have a phase difference of 90 degrees from each other.

The ADC 927*b* may receive an analog electrical signal output from the magnetic sensor 927*a*, convert it into a digital signal, and output the converted digital signal. For example, the ADC 927*b* may convert the two voltage signals Va and Vb into a digital signal and send to the magnet position calculation unit 927*c*.

The magnet position calculation unit 927*c* may process the digital signal output from the ADC 927*b* to calculate absolute position information of the pivot magnet 925. For example, the magnet position calculation unit 927*c* may process two digital voltage signals Va and Vb transmitted by the ADC 927*b* through an arctan method, and output a voltage signal Vout corresponding to the position value θm of the pivot magnet 925 in a 1:1 ratio (see FIG. 64). That is, the absolute position θm of the pivot magnet 925 corresponding to the processed voltage signal value may be detected through the magnet position calculation unit 927*c*.

The magnet position calculation unit 927*c* may transmit the calculated position information of the pivot magnet 925 to the link angle calculation unit 927*d*. The link angle calculation unit 927*d* may process the position information of the pivot magnet 925, and calculate an angle θs (hereinafter, a link angle) (see FIG. 29) formed by the second arm 912 of the link 910 with respect to the base 32.

Since the pivot magnet 925 is fixed to the pivot center of the link 910 and pivots together when the link pivots, the link angle θs may have a certain relationship with the position θm of the pivot magnet 925. Accordingly, the link angle calculation unit 927*d* may process the link angle θs information based on the relationship between the link angle θs and the position θm of the pivot magnet 925. The link angle calculation unit 927*d* may obtain the link angle θs information through a look-up table based on a relationship between the link angle θs and the position Cm of the pivot magnet 925. The encoder device 927 may further include a memory (not shown) for storing the lookup table. Thereafter, the interface unit 927*e* may receive the link angle information θs output from the link angle calculation unit 927*d*, and send a command to adjust the movement of the link 910 based on the angle information θs.

Meanwhile, the electrical signal output from the magnet position calculation unit 927*c* or the electrical signal output from the link angle calculation unit 927*d* may be converted into an analog signal by a digital-to-analog conversion circuit (hereinafter, DAC) (not shown).

Meanwhile, the magnetic sensor 927*a* may sense a magnetic field formed by the pivot magnet 925 at a constant sampling period. For example, the magnetic sensor 927*a* may sense the magnetic field of the pivot magnet 925 in a unit of milliseconds and output a sampling electrical signal.

When the sampling period is short, there is an advantage in that it can respond sensitively even to minute rotation of the pivot magnet 925, but the number of occurrences of errors between respective sampling output values may increase due to various causes. Accordingly, the magnet position calculation unit 927*c* may perform an operation of correcting the sampling output value. For example, the magnet position calculation unit 927*c* may calculate the position information of the pivot magnet by grouping and averaging a plurality of sampling output values received from the magnetic sensor 927*c* in a certain unit.

For example, the magnet position calculation unit 927*c* may receive an electrical signal output sampled in millisecond units and convert an average value of every 40 sampled output values into an electrical signal. In this case, the sampling interval is shorter than in the case of sampling every 40/1000 seconds, so that the error range can be reduced while sensitively responding to the position change of the pivot magnet 925.

Referring to FIG. 64, position information θm of the pivot magnet 925 may be expressed as an angle (°) for convenience, and an electric signal corresponding to the position information of the pivot magnet 925 may be represented as a voltage signal Vout. The location information θm may be represented as a position code. The voltage signal Vout may be represented by a digital code corresponding to the position code.

Different unique voltage signals Vout corresponding to the position of the pivot magnet 925 may be output through the magnet position calculation unit 927*c*. Due to the characteristics of the magnetic absolute encoder, the value of the output voltage signal Vout may represent a linear graph in a one-to-one correspondence with the value of the position of the pivot magnet 925. The voltage signal Vout may form a waveform having a constant period with respect to a position change of the pivot magnet 925.

For example, the voltage signal Vout may basically have one period per one rotation of the pivot magnet 925, that is, one period per 360° rotation. At this time, when the voltage signal Vout output from the magnet position calculator 927*d* is the minimum value VL, the position of the pivot magnet 925 may be defined as 0°, and when the voltage signal Vout has a maximum value VH, the position of the pivot magnet 925 may be defined as 360°. Within one period, the voltage signal Vout may have a waveform proportional to the position of the pivot magnet 925.

Meanwhile, the period of the output waveform of the voltage signal Vout may be shortened by changing the number and disposition of the magnetic sensors 927*a* or the processing process of the controller 1000. For example, the voltage signal Vout may have two periods per one rotation of the pivot magnet 925, that is, two periods per 360° rotation. That is, whenever the pivot magnet 925 rotates 180°, the same voltage signal waveform may be repeated. In this case, when the voltage signal Vout output from the magnet position calculation unit 927*d* is a minimum value VL, the position of the pivot magnet 925 may be defined as 0°, and when the voltage signal Vout is a maximum value VH, the position of the pivot magnet 925 may be defined as 180°.

As the period of the voltage signal waveform becomes shorter, a wider range of electrical signal values may be processed for the position change of the same pivot magnet 925, and the resolution for detecting the position change of the pivot magnet 925 may be increased.

Meanwhile, it is preferable that the period of the voltage signal has a longer period than the change range Rir1, Rir2 (see FIGS. 67 and 71) of the link angle θs. For example, when the change range Rir1, Rir2 of the link angle θs is 90°, it is preferable that the period of the voltage signal has a period of less than 4 periods per rotation by 360° of the pivot magnet 925. That is, it is preferable that the period of the voltage signal Vout exceeds 90°. Details on this will be described later.

Figure 65:
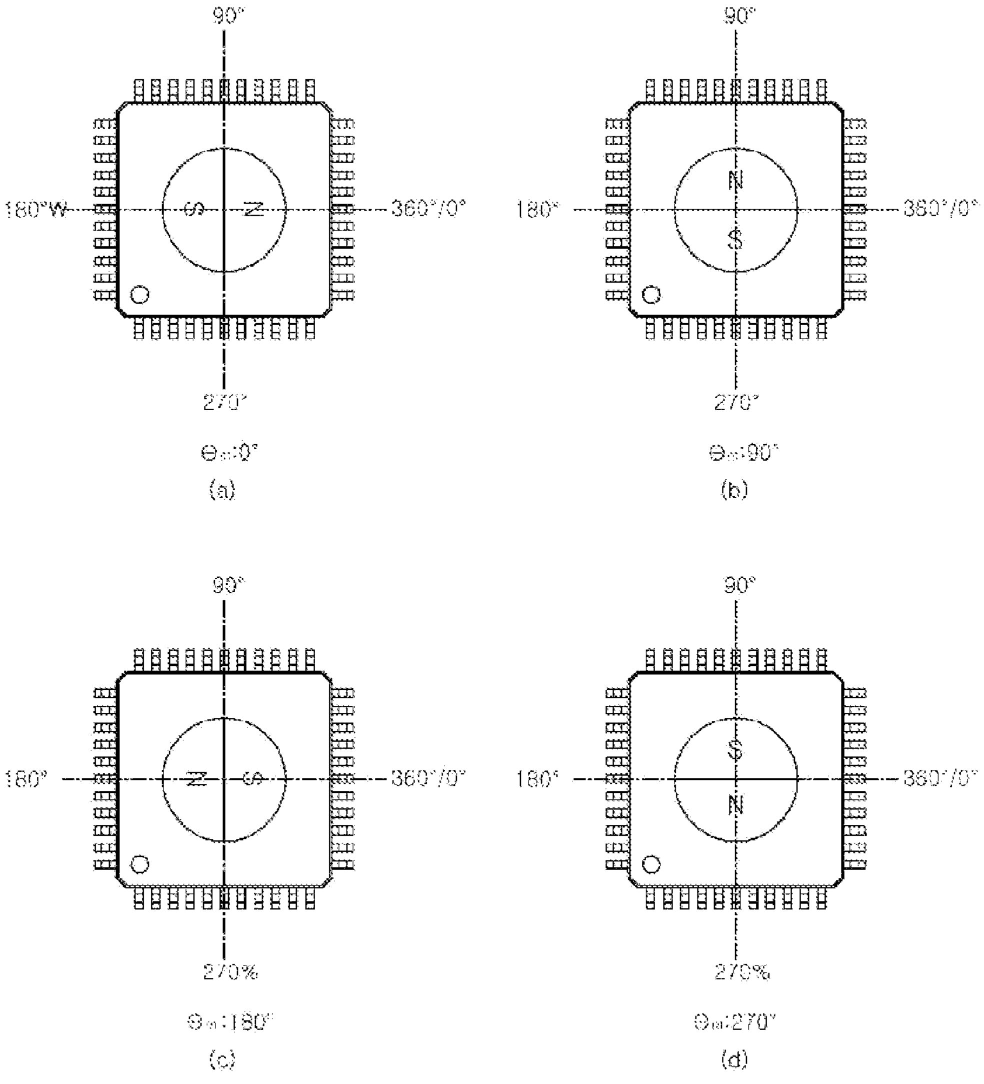

Referring to FIG. 65, in the present disclosure, position information θm (position code) of the pivot magnet 925 recognized by the encoder device 927 according to a different disposition of the pivot magnet 925 is shown. The position information (θm) according to the disposition of magnet shown in this drawing is an exemplary diagram for reference for convenience of description, and may vary depending on the configuration and processing process of the encoder device 927.

Figure 66:
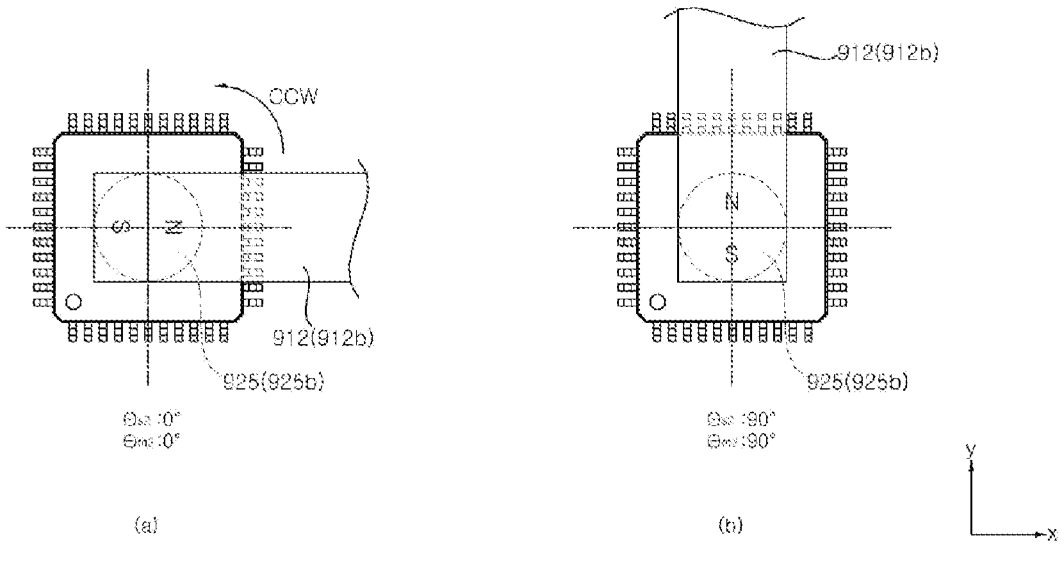
Figure 67:
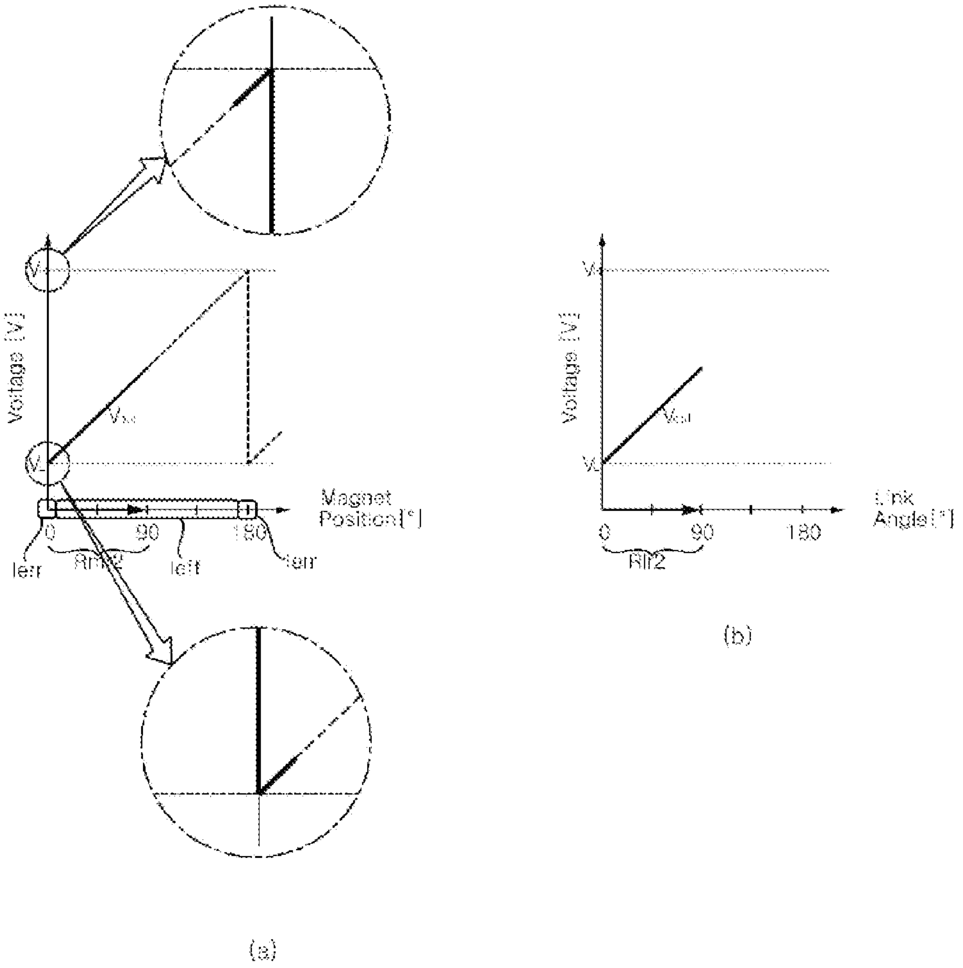

Referring to FIGS. 66 and 67, since the pivot magnet 925 is fixed to the pivot center of the link 910, the range Rmr in which the position of the pivot magnet 925 is changed may be the same as the angular range Rir in which the second arm 912 of the link 910 is pivoted. For example, when the change range Rir of the link angle θs is 90°, the change range Rmr of the position θm of the pivot magnet 925 may also be 90°. Hereinafter, the second pivot magnet 925*b* fixed to the pivot center of the second arm 912*b* of the left link 910*b* will be described as an example.

When viewed from the front, if the second arm 912*b* pivots counterclockwise, the second pivot magnet 925*b* may pivot counterclockwise, and if the second arm 912*b* pivots clockwise, the second pivot magnet 925*b* may pivot clockwise. The link angle θs2 (hereinafter, a second link angle) of the second arm 912*b* of the left link 910*b* may increase if the second arm 912*b* pivots counterclockwise, and may decrease if the second arm 912*b* pivots clockwise. Similarly, the position θm2 of the second pivot magnet 925*b* may increase if the second pivot magnet 925*b* pivots counterclockwise, and decrease if the second pivot magnet 925*b* pivots clockwise.

The second link angle θs2 and the position θm2 of the second pivot magnet 925*b* may be expressed as follows.

$$\Theta s2 = \theta m2$$

Meanwhile, referring to FIG. 67, the voltage signal Vout corresponding to the position θm2 of the second pivot magnet 925*b* on a one-to-one basis may have a waveform that is repeated according to a constant period. The waveform may be a sawtooth waveform. The voltage signal Vout having two periods per one rotation of the second pivot magnet 925*b*, that is, two periods per 360° rotation is shown as an example.

The voltage signal Vout may have a minimum value VL when the position θm2 of the second pivot magnet 925*b* is 0° and have a maximum value VH when the position θm2 is 180°. At this time, when the position θm2 of the second pivot magnet 925*b* is around 180(n−1)° (n=1,2,3, . . . , hereinafter omitted), the voltage signal Vout may have the minimum value VL and the maximum value VH.

Meanwhile, the position section of the pivot magnet may be divided into an effective position section Ieff and an error position section Ierr.

The error position section Ierr may be defined as a section within a position of the pivot magnet at which the voltage signal Vout indicates the minimum value VL and the maximum value VH±allowable error when the position θm2 of the second pivot magnet 925*b* changes by a minimum unit. For example, referring to FIG. 67, the error position section Ierr may mean a section within 180(n−1)° of a position θm2 of the second pivot magnet 925*b*±allowable error.

In the process of sensing the position θm2 of the pivot magnet 925 by the magnetic sensor 927*a* (see FIG. 63), an error may occur in the output voltage Vout due to various causes. Therefore, the allowable error may be a position change range of the pivot magnet 925 due to an error in the output voltage Vout. For example, the allowable error may be ±1.2°.

Meanwhile, the effective position section Ieff is defined as a remaining area excluding the error position section Ierr from the position of the pivot magnet 925. For example, referring to FIG. 67, when the allowable error is ±1.2°, the effective position section Ieff may include a range within a range of 1.2° to 178.8°.

When the partial position value θm2 within the position change range Rmr2 of the pivot magnet 925*b* is within the error position section Ierr, the possibility of occurrence of a peak error increases. Therefore, it is preferable that the position change range of the magnet is within the effective position section (see FIGS. 69 and 71) This will be explained below.

Figure 68:
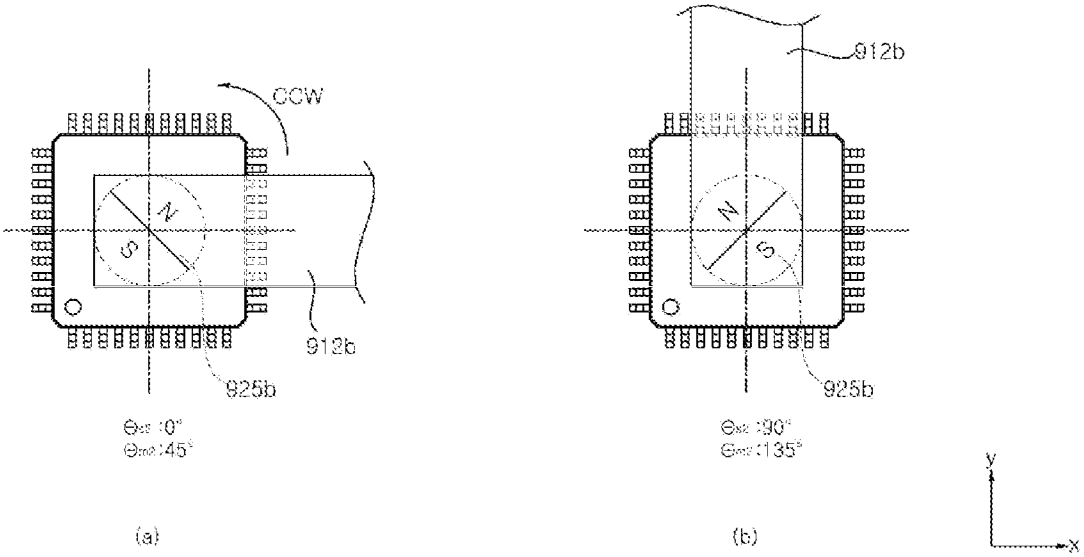
Figure 69:
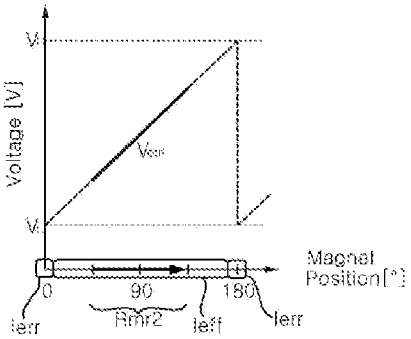
Figure 69:
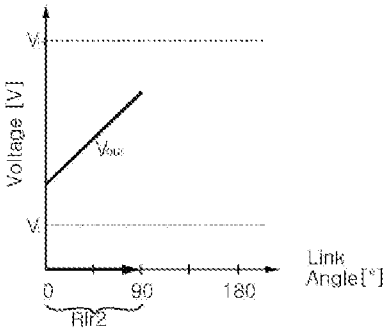

Referring to FIGS. 68 and 69, the second link angle θs2 and the position θs2 of the second pivot magnet 925*b* may be represented by the following relationship.

$$\theta s2=\theta m2+\alpha 2$$

The α2 may be an angular value corrected so that the position change range of the pivot magnet 925*b* is within the effective position section Ieff. For example, α2 may be 450.

The controller 1000 (see FIG. 63) may calculate link angle θs2 information corresponding to the voltage signal Vout, based on a look-up table for the relationship between the voltage signal Vout, the link angle θs2, and the position θm2 of the pivot magnet 925*b*. In order to correct the angle as much as α2, as shown, the disposition in which the pivot magnet 925 and the pivot center of the second arm 912*b* are coupled may be changed. Alternatively, the position of the magnetic sensor may be changed or the processing process may be changed to correct the angle by α2.

Figure 71:
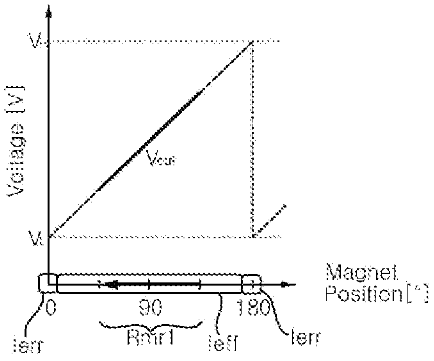
Figure 71:
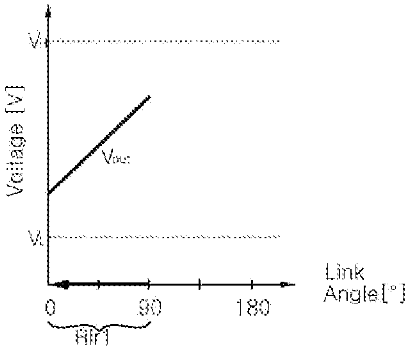

Referring to FIGS. 70 and 71, since the first pivot magnet 925*a* is fixed to the pivot center of the right link 910*a*, the range in which the position of the first pivot magnet 925*a* changes may be the same as the angle range in which the second arm 912*a* of the right link 910*a* is pivoted.

For example, when the change range Rir1 of the link angle θs1 (hereinafter, a first link angle) of the second arm 912*a* of the right link 910*a* is 90°, the change range Rmr1 of the position θm1 of the first pivot magnet 925*a* may also be 90°.

When viewed from the front, when the second arm 912*a* pivots clockwise, the first pivot magnet 925*a* may pivot clockwise, and when the second arm 912*a* pivots counterclockwise, the first pivot magnet 925*a* may pivot counterclockwise. At this time, contrary to the second link angle θs2 (see FIG. 68), the first link angle θs1 may increase when the second arm 912*a* pivots clockwise, and may decrease when the second arm 912*a* pivots counterclockwise. The position θm1 of the first pivot magnet 925*a* may decrease when the first pivot magnet 925*a* pivots clockwise, and may increase when the first pivot magnet 925*a* pivots counterclockwise.

The first link angle θs1 and the position θm1 of the first pivot magnet 925*a* may be represented by the following relationship.

$$180°-\theta s1=\theta m1+\alpha 1$$

The α1 may be an angular value corrected so that the position change range of the pivot magnet 925*a* is within the effective position section Ieff. For example, α1 may be 45°. The controller 1000 (see FIG. 63) may calculate link angle θs1 information corresponding to the voltage signal Vout, based on a look-up table for the relationship between the voltage signal Vout, the link angle θs1, and the position θm1 of the pivot magnet 925*b*.

Figure 72:
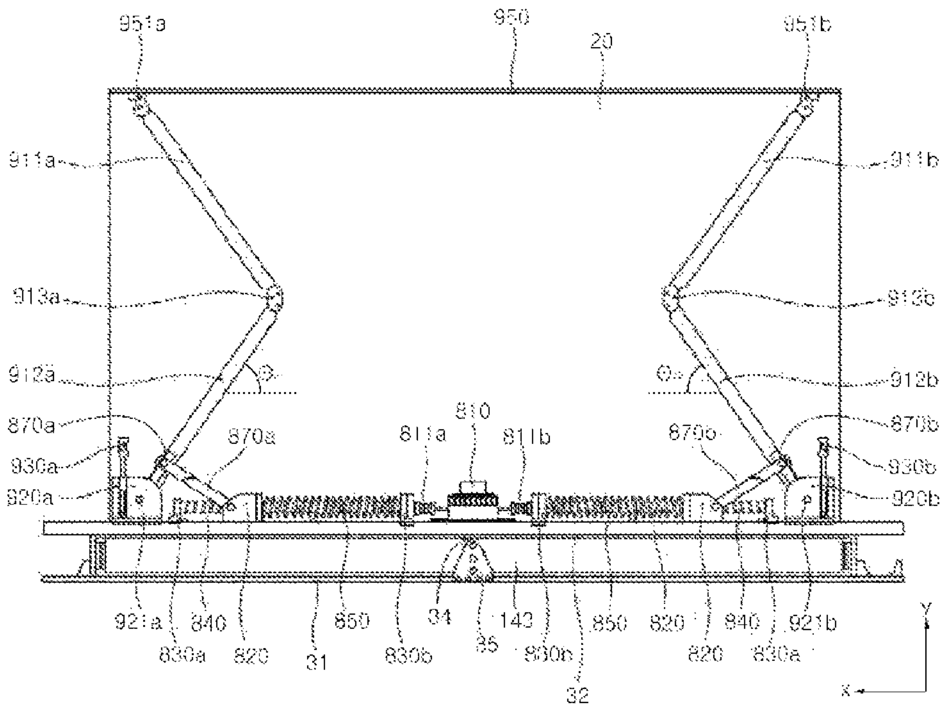
Figure 73:
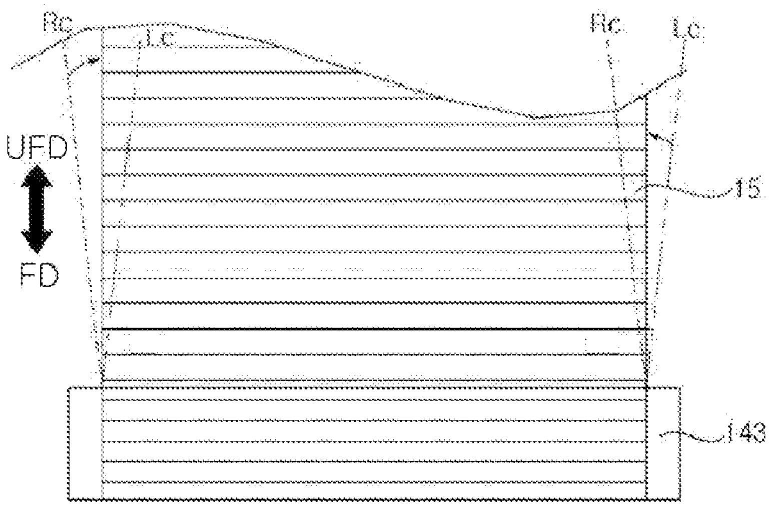

Referring to FIGS. 72 and 73, the controller 1000 may compare the first link angle θs1 and the second link angle θs2 to adjust the movement of the link 910*a*, 910*b*. Unlike the above-described embodiments, the right link 910*a* and the left link 910*b* may move independently of each other. That is, although it is preferable that the degree of standing up the right link 910*a* with respect to the base 31 and the degree of standing up the left link 910*b* with respect to the base 31 are the same, it is possible to adjust them differently from each other.

For example, during a folding operation FD in which the display panel 10 and the module cover 15 are wound around the roller 143 or an unfolding operation UFD in which the display panel 10 and the module cover 15 are unwound from the roller 143, the display panel 10 and the module cover 15 may be tilted to the right Rc or left Lc. At this time, the controller 1000 adjusts the standing degree of each of the right link 910*a* and the left link 910*b* with respect to the base 31, so that the display panel 10 and the module cover 15 may be aligned in the center without tilting to the right or left.

In order to independently move the right link 910*a* and the left link 910*b*, the right driving shaft and the left driving shaft of the motor assembly 810 may independently rotate. The motor assembly 810 may include a plurality of motors. Alternatively, unlike the above-described embodiments, the motor assembly 810 may be connected to the shaft 912*a* formed in the right link mount 910*a* and the shaft 912*b* formed in the left link mount 910*b* respectively, so that the right link 910*a* and the left link 910*b* may be independently moved.

Figure 74:
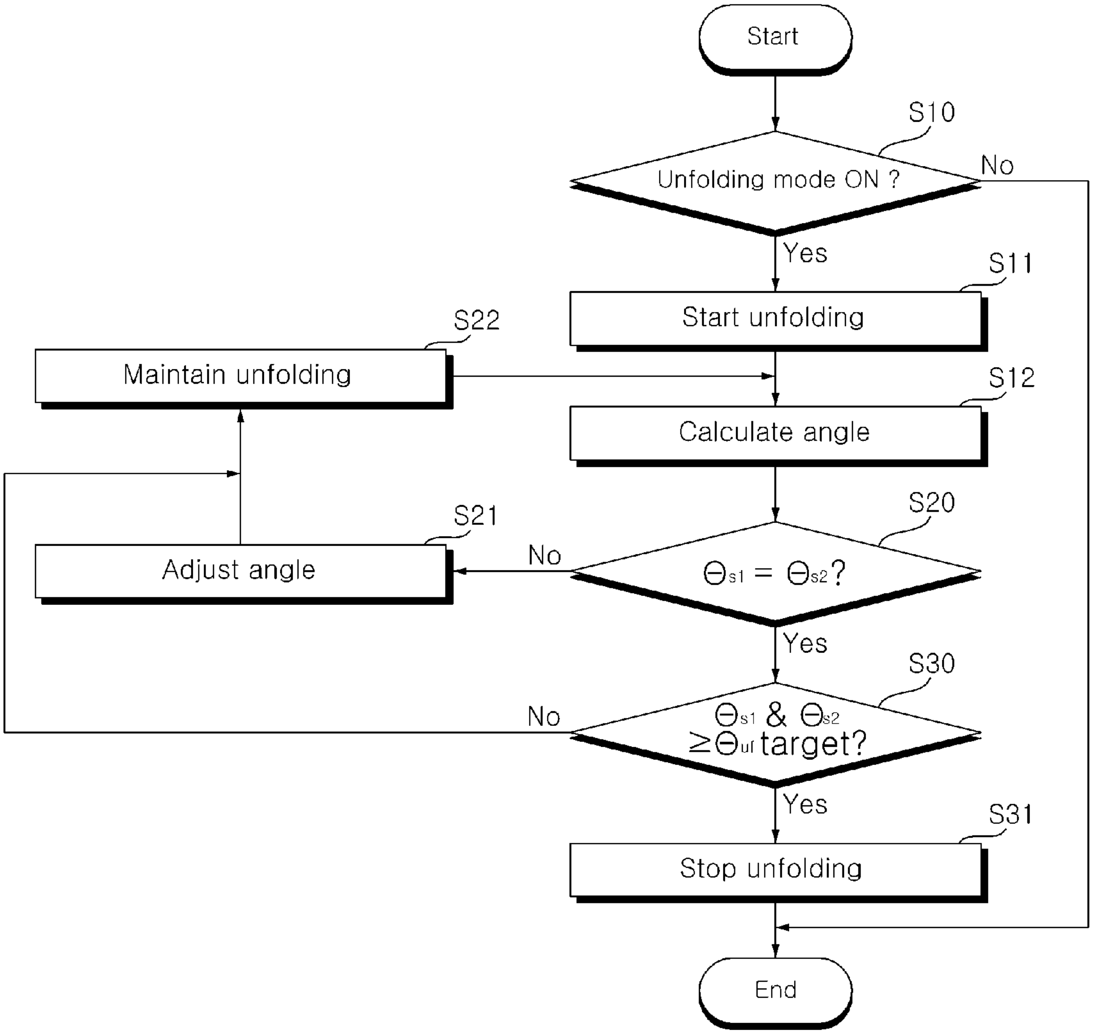
Figure 75:
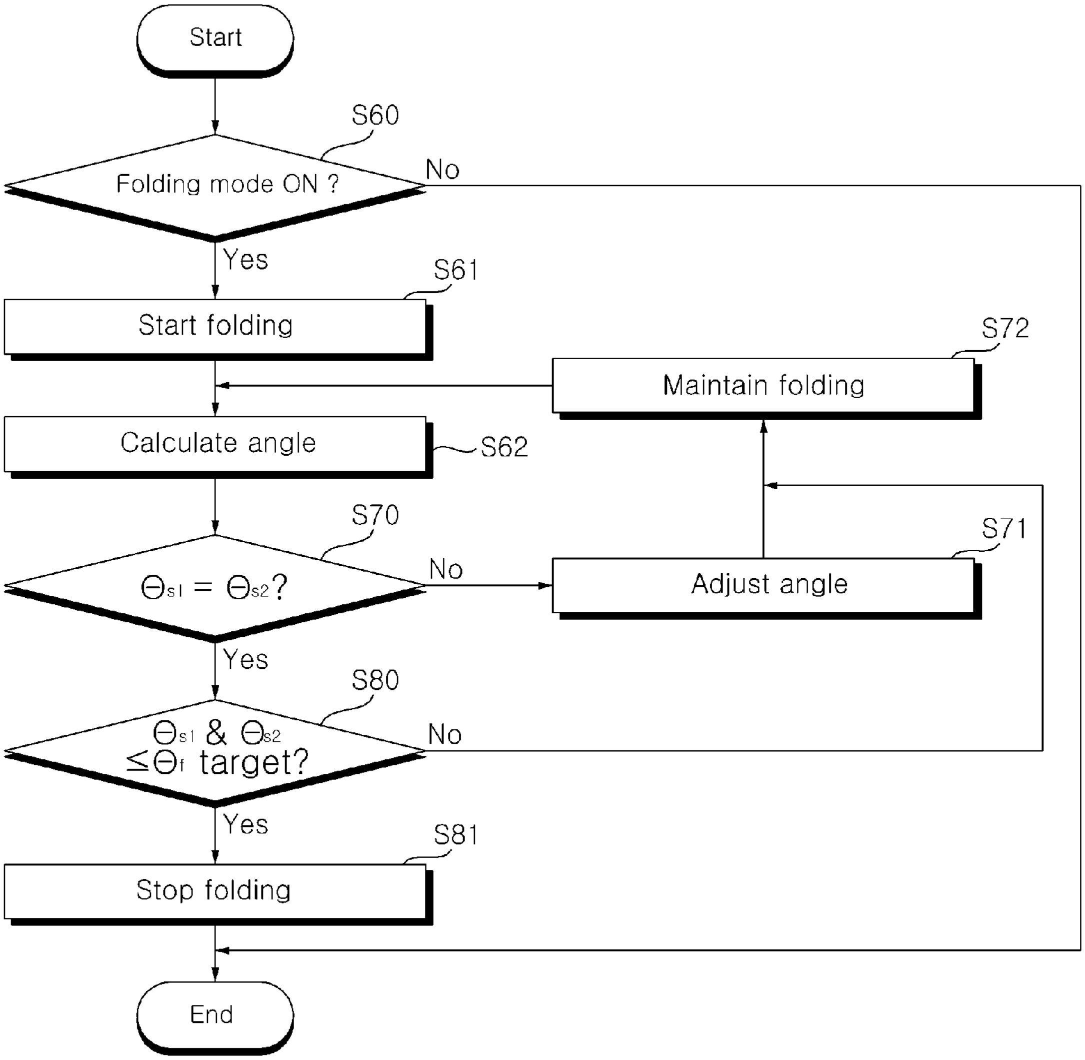
Figure 76:
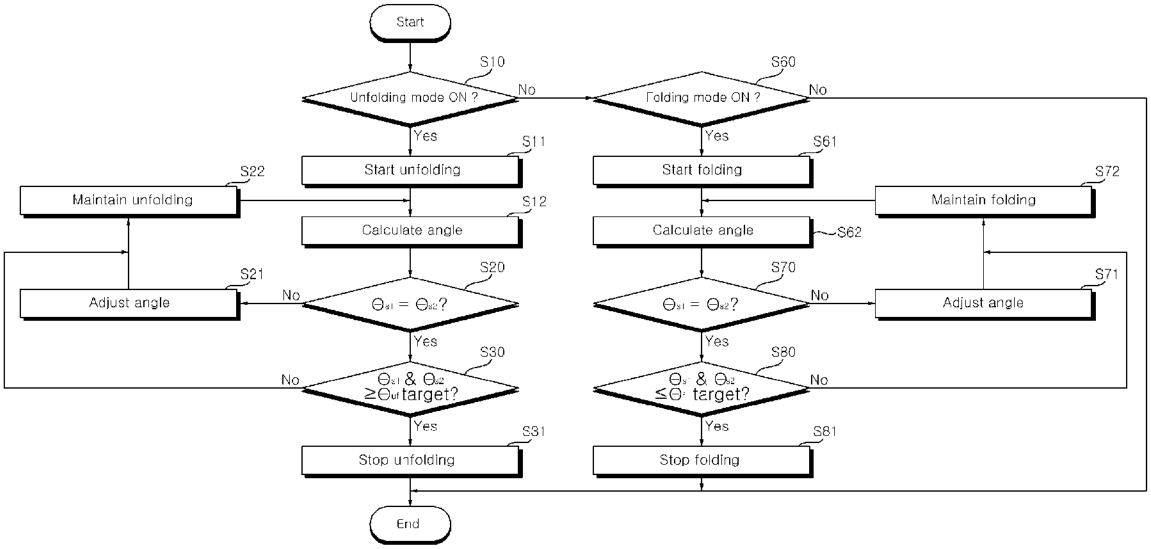

Referring to FIGS. 74 and 76, when an unfolding mode ON signal for unwinding the display panel 10 and the module cover 15 from the roller 143 is input (Yes at S10), the controller 1000 may control the display panel 10 and the module cover 15 to be unwound from the roller 143 by adjusting the movement of the link 910*a*, 910*b* through the rotational operation of the motor assembly 810 (S11). During the progress of S11, the link 910*a*, 910*b* may stand while pivoting. At this time, the magnetic sensor 927*a* may detect the positions of the first pivot magnet 925*a* and the second pivot magnet 925*b*, and the controller 1000 may calculate a first link angle θs1 and a second link angle θs2 based on the positions of the pivot magnet 925*a*, 925*b* (S12).

After S12, the controller 1000 may compare the first link angle θs1 and the second link angle θs2 to determine whether they are matched with each other (S20). If it is determined that the link angles θs1 and θs2 are not matched with each other (No in S20), the link angles θs1 and θs2 can be matched by adjusting the movement of the link 910*a*, 910*b* (S21).

Specifically, when the first link angle θs1 is smaller than the second link angle θs2, the link angles θs1 and θs2 may be matched by controlling the movement of the links 910*a* and 910*b* so that the speed at which the first link angle θs1 increases is higher than the speed at which the second link angle θs2 increases. That is, the pivot speed of the right link 910*a* may be controlled higher than the pivot speed of the left link 910*b*. Conversely, when the second link angle θs2 is smaller than the first link angle θs1, the link angles θs1 and θs2 may be matched by controlling the movement of the links 910*a* and 910*b* so that the speed at which the second link angle θs2 increases is higher than the speed at which the first link angle θs1 increases. That is, the pivot speed of the left link 910*b* can be controlled higher than the pivot speed of the right link 910*a*.

After S21 or during S21, the controller 1000 may return to operation S12 while maintaining unfolding (S22).

Meanwhile, if it is determined that the link angles θs1 and θs2 coincide with each other at S20 (Yes at S20), it is determined whether the link angles θs1 and θs2 are equal to or greater than an unfolding target angle θuf_target (S30). The unfolding target angle θuf_target can be understood as a link angle θs1, θs2 at a time when the link 910*a*, 910*b* stands up to the maximum and the display panel 10 and the module cover 15 are maximally unwound from the roller 143.

Here, a state in which the display panel 10 and the module cover 15 are maximally wound around the roller 143 is a state in which a user watching is terminated and the entire display unit 20 is located inside the housing 30, may be understood as a state where the display panel 10 is located at the bottom dead center, and may be adjusted arbitrarily through the device settings. In addition, a state in which the display panel 10 and the module cover 15 are maximally unwound from the roller 143 is a state in which a part of the display unit 20 is exposed to the outside of the housing 30 for a watching viewing, may be understood as a state where the display panel 10 is located at the top dead center, and may be adjusted arbitrarily through the device settings.

If it is determined that the link angle θs1, θs2 is not equal to or greater than the unfolding target angle θuf_target (No at S30), the controller 1000 may return to operation S12 while maintaining unfolding (S22). When it is determined that the link angle θs1, θs2 is equal to or greater than the unfolding target angle θuf_target (Yes at S30), the controller 1000 may stop unfolding (S31).

Through S20, S21 and S22, the controller 1000 may adjust the movement of the link 910*a*, 910*b* so that the display panel 10 and the module cover 15 are unwound from the roller 143, and may stop the movement of the link 910*a*, 910*b* when the magnetic sensor 927*a* detects the position θm1, θm2 of the pivot magnet corresponding to the unfolding target angle θuf_target.

Accordingly, the display panel 10 may be accurately moved from a state of being located at the bottom dead center to a state of being located at the top dead center in response to an unfolding mode ON signal. In addition, the movement of the link 910*a*, 910*b* is individually controlled by calculating and comparing the link angles θs1 and θs2 based on the magnet position θm1, θm2 having a minimized error, so that the left-right height error of the display panel 10 can be minimized.

Referring to FIGS. 74 and 76, when the folding mode ON signal for the display panel 10 and the module cover 15 to wind around the roller 143 is input (Yes at S60), the controller 1000 may control the display panel 10 and the module cover 15 to wind around the roller 143 by adjusting the movement of the link 910*a*, 910*b* through the rotational operation of the motor assembly 810 (S61). During the progress of S61, the link 910*a*, 910*b* may pivot and lie down. At this time, the magnetic sensor 927*a* may detect the positions of the first pivot magnet 925*a* and the second pivot magnet 925*b*, and the controller 1000 may calculate a first link angle θs1 and a second link angle θs2 based on the position of the pivot magnet 925*a*, 925*b* (S62).

After S62, the controller 1000 may compare the first link angle θs1 and the second link angle θs2 to determine whether they are matched with each other (S70). If it is determined that the link angles θs1 and θs2 are not matched with each other (No in S70), the link angles θs1 and θs2 may be matched by adjusting the movement of the link 910*a*, 910*b* (S71).

Specifically, when the first link angle θs1 is greater than the second link angle θs2, the link angles θs1 and θs2 may be matched by controlling the movement of the links 910*a* and 910*b* so that the speed at which the first link angle θs1 decreases is higher than the speed at which the second link angle θs2 decreases. That is, the pivot speed of the right link 910*a* may be controlled higher than the pivot speed of the left link 910*b*. Conversely, when the second link angle θs2 is greater than the first link angle θs1, the link angles θs1 and θs2 may be matched by controlling the movement of the links 910*a* and 910*b* so that the speed at which the second link angle θs2 decreases is higher than the speed at which the first link angle θs1 decreases. That is, the pivot speed of the left link 910*b* can be controlled higher than the pivot speed of the right link 910*a*.

After S71 or during S71, the controller 1000 may return to operation S62 while maintaining unfolding (S72). Meanwhile, if it is determined that the link angles θs1 and θs2 coincide with each other at S70 (Yes at S70), it is determined whether the link angles θs1 and θs2 are equal to or less than a folding target angle θf_target (S80). The folding target angle θf_target can be understood as a link angle θs1, θs2 at a time when the link 910*a*, 910*b* is laid to the maximum and the display panel 10 and the module cover 15 are maximally wound around the roller 143.

If it is determined that the link angle θs1, θs2 is not equal to or less than the folding target angle θf_target (No at S80), the controller 1000 may return to operation S62 while maintaining folding (S72). When it is determined that the link angle θs1, θs2 is equal to or less than the folding target angle θf_target (Yes at S80), the controller 1000 may stop folding (S81).

Through S70, S71 and S72, the controller 1000 may adjust the movement of the link 910*a*, 910*b* so that the display panel 10 and the module cover 15 are wound around the roller 143, and may stop the movement of the link 910*a*, 910*b* when the magnetic sensor 927*a* detects the position θm1, θm2 of the pivot magnet corresponding to the folding target angle θf_target.

Accordingly, the display panel 10 may be accurately moved from a state of being located at the top dead center to a state of being located at the bottom dead center in response to a folding mode ON signal. In addition, the movement of the link 910*a*, 910*b* may be individually controlled by calculating and comparing the link angles θs1 and θs2 based on the magnet position θm1, θm2 having a minimized error, so that the left-right height error of the display panel 10 can be minimized.

Figure 77:
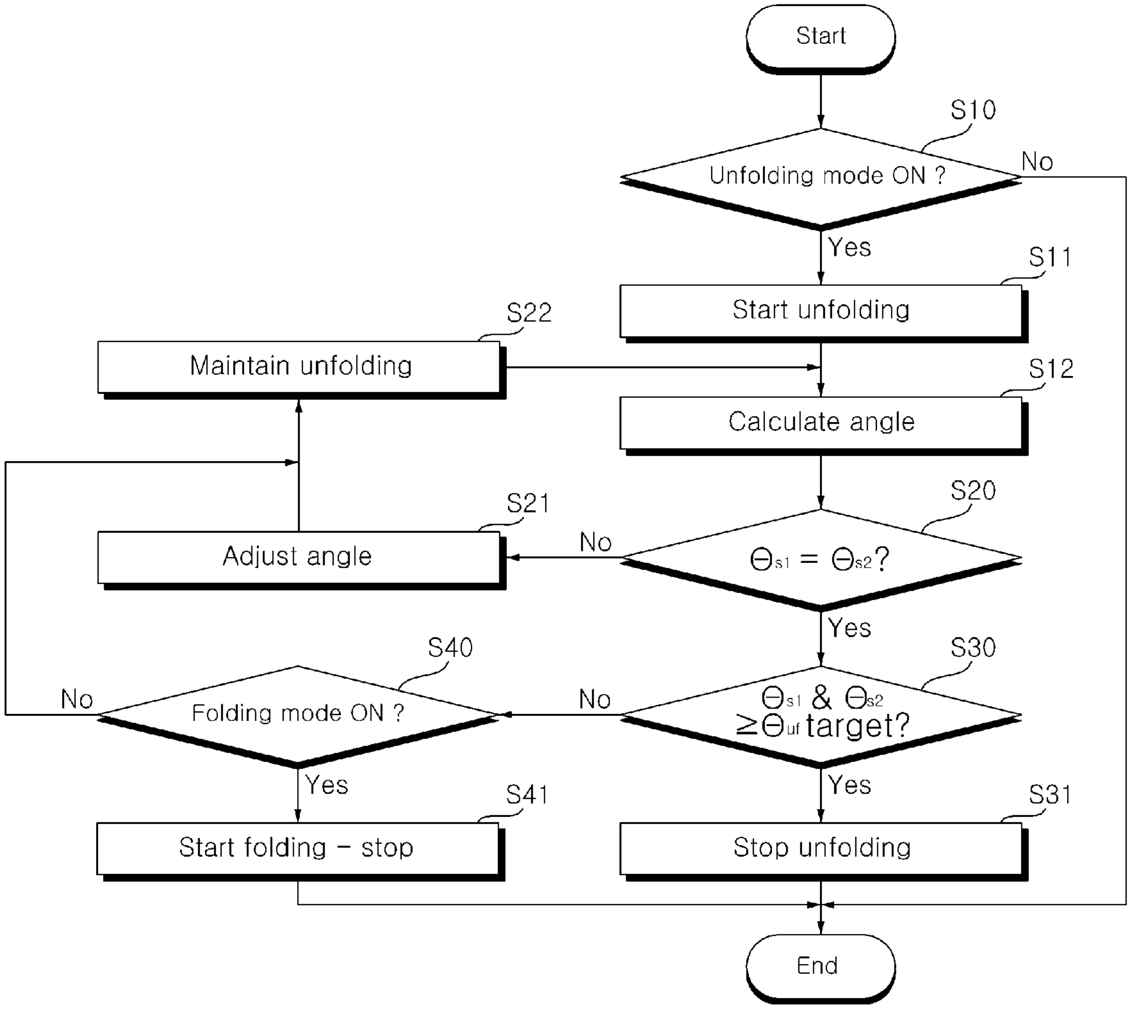
Figure 78:
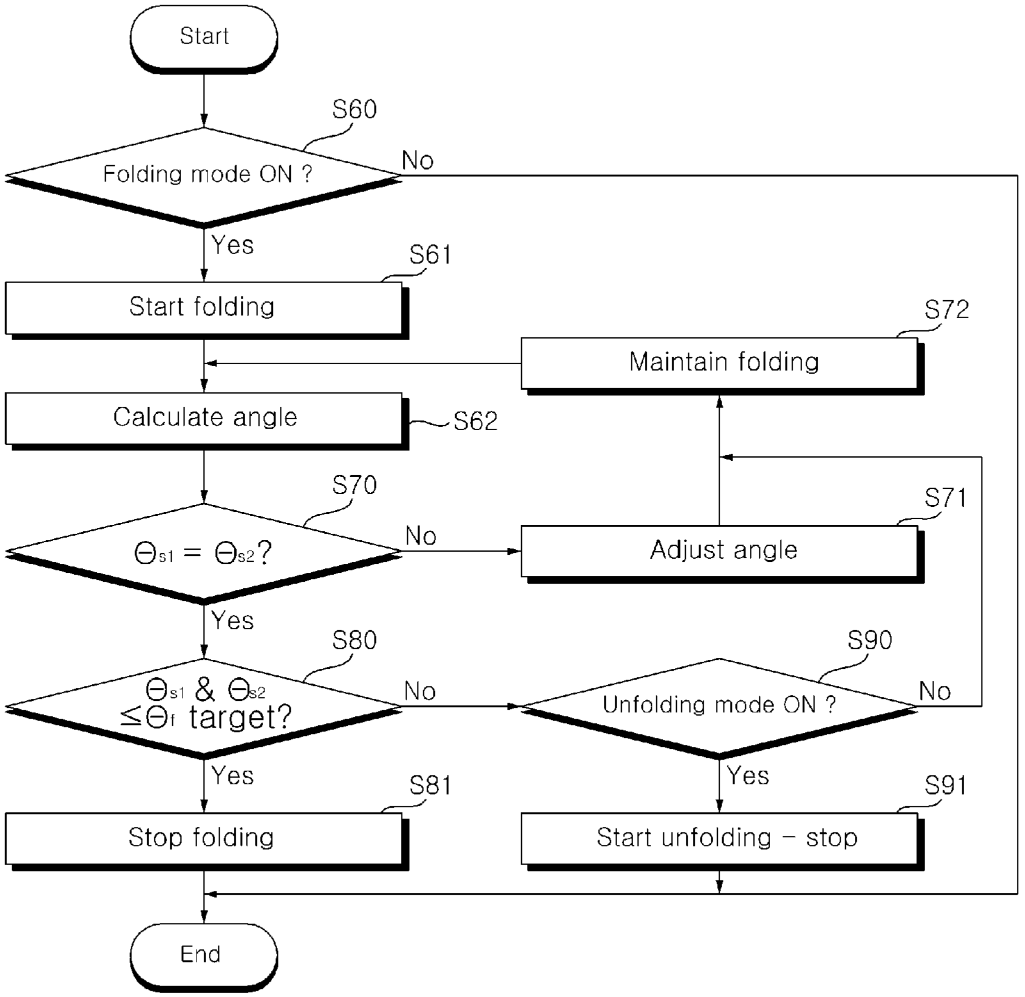
Figure 79:
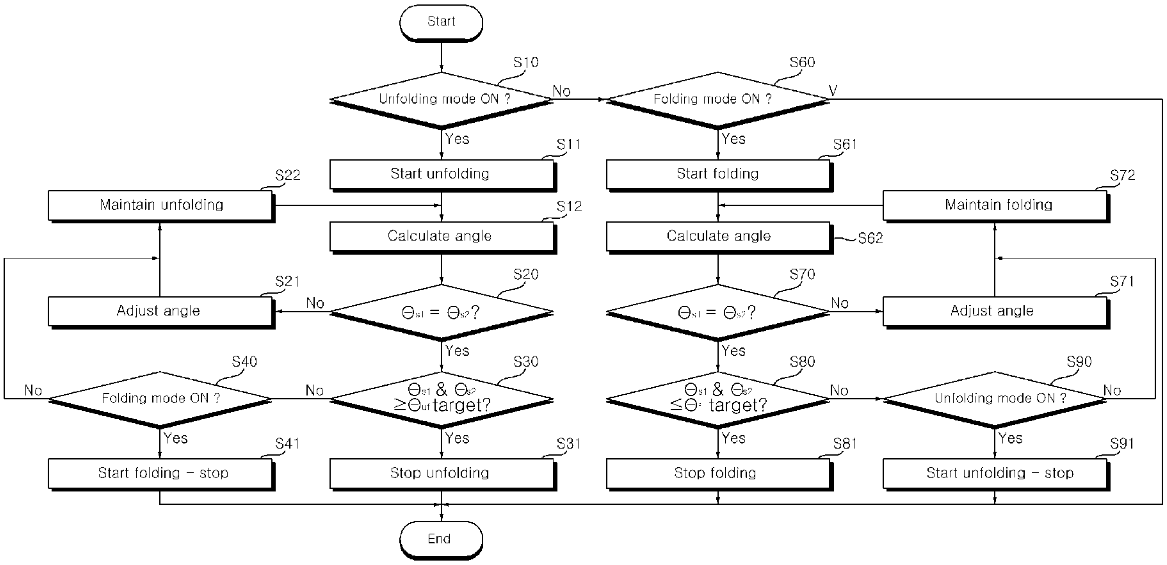

Referring to FIGS. 77 to 79, while the display panel 10 and the module cover 15 are unwound from the roller 143 in response to the unfolding mode ON signal, the folding mode ON signal may be input. In addition, while the display panel 10 and the module cover 15 are wound around the roller 143 in response to the folding mode ON signal, the unfolding mode ON signal may be input.

Referring to FIGS. 77 and 79, after the start of unfolding (S11), when it is determined that the link angle θs1, θs2 is less than the unfolding target angle θuf_target (No at S30), the controller 1000 may determine whether the folding mode ON signal is input (S40).

When it is determined that the folding mode ON signal is not input at S40 (No at S40), the controller 1000 may maintain the unfolding mode until it is determined that the link angle θs1, θs2 is equal to or greater than the unfolding target angle θuf_target (S22). When it is determined that the folding mode ON signal is input at S40 (Yes at S40), the mode is switched to the folding mode and then stopped after folding is started (S41). Further, S41 may be subdivided into S41*a*, S41*b*, S41*c*, S41*d*, S41*e* and S41*f* described later.

Figure 80:
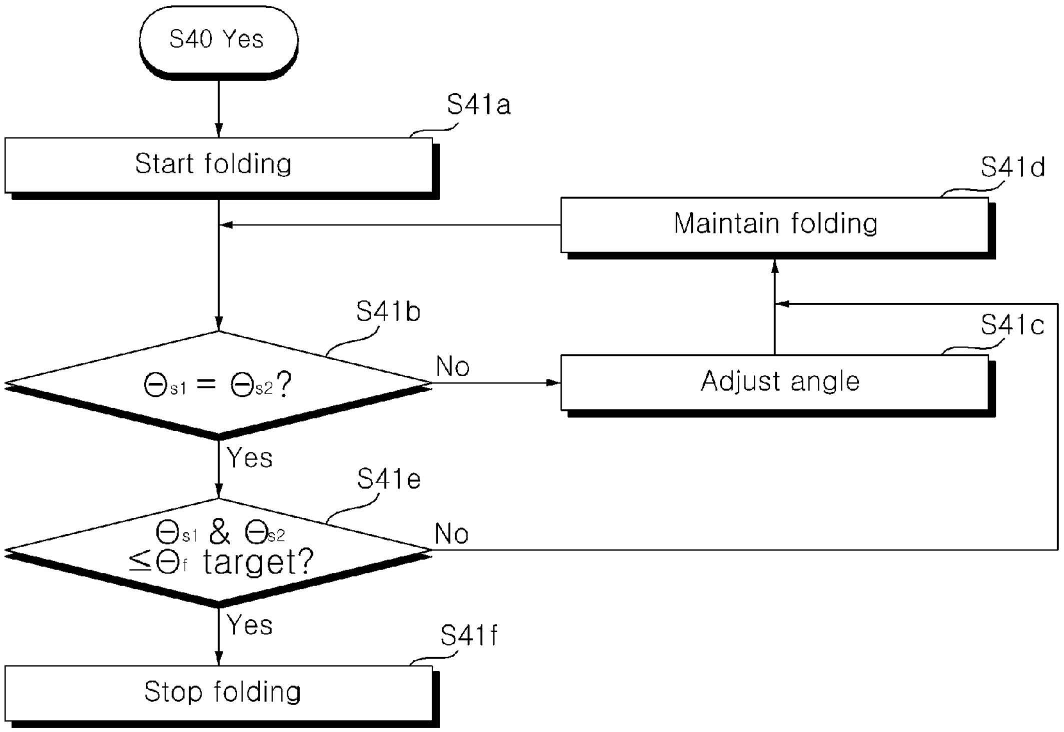

Referring to FIG. 80, after Yes at S40, the controller 1000 adjusts the movement of the link 910*a*, 910*b* through the rotational operation of the motor assembly 810 so that the display panel 10 and the module cover 15 may be controlled to be wound around the roller 143 (S41*a*). During the progress of S41*a*, the link 910*a*, 910*b* may pivot and lie down. At this time, the magnetic sensor 927*a* detects the positions of the first pivot magnet 925*a* and the second pivot magnet 925*b*, the controller 1000 may calculate and compare the first link angle θs1 and the second link angle θs2 based on the position of the pivot magnet 925*a*, 925*b* (S41*b*). If No at S41*b*, the link angles θs1 and θs2 are not matched with each other, and the controller 1000 may match the link angles θs1 and θs2 by adjusting the movement of the link 910*a*, 910*b* (S41*c*). After S41*c* or during S41*c*, the controller 1000 may return to step S41*b* while maintaining folding (S41*d*).

If Yes at S41*b*, the link angles θs1 and θs2 are matched with each other, and the controller 1000 determines whether the link angles θs1 and θs2 are equal to or less than the folding target angle θf_target (S41*e*). When it is determined that the link angles θs1 and θs2 are not equal to or less than the folding target angle θf_target, the controller 1000 may maintain folding (S41*d*). When it is determined that the link angles θs1 and θs2 are equal to or less than the folding target angle θf_target, the controller 1000 may stop folding (S41*f*).

Referring to FIGS. 78 and 79, after the start of folding (S61), when it is determined that the link angles θs1, θs2 are not equal to or less than the folding target angle θf_target (No at S80), the controller 1000 may determine whether an unfolding mode ON signal is input (S40).

If it is determined that the unfolding mode ON signal is not input at S90 (No at S90), the controller 1000 may maintain the folding mode until it is determined that the link angles θs1 and θs2 are equal to or less than the folding target angle θf_target (S72). If it is determined that the unfolding mode ON signal is input at S90 (Yes at S90), the mode may be switched to the unfolding mode and may be stopped after unfolding is started (S91). Further, S91 can be subdivided into S91*a*, S91*b*, S91*c*, S91*d*, S91*e* and S91*f* described later.

Figure 81:
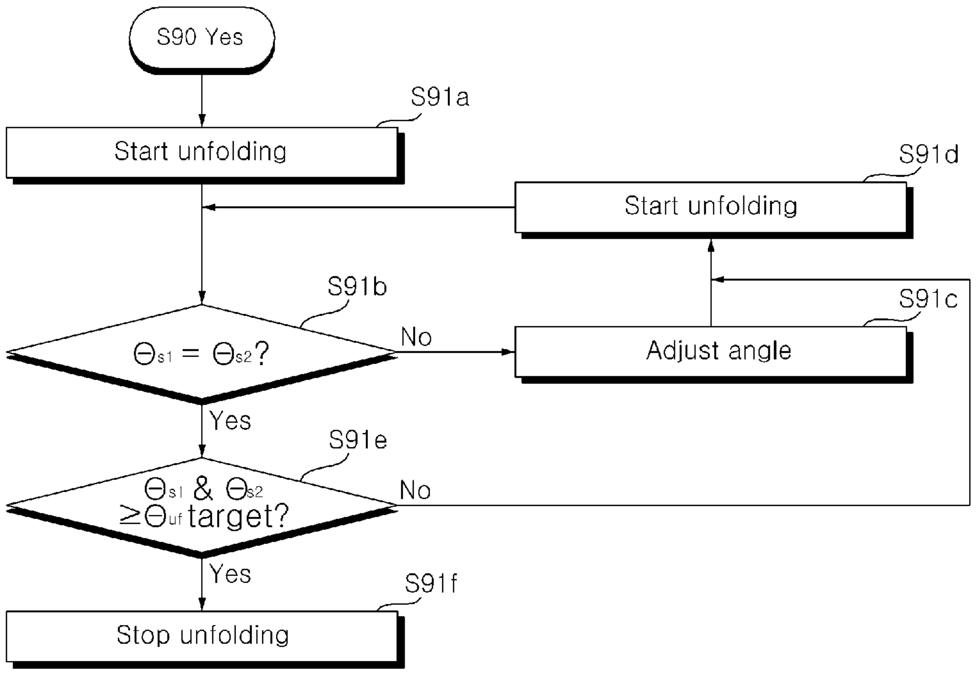

Referring to FIG. 81, after Yes at S90, the controller 1000 adjusts the movement of the link 910*a*, 910*b* through the rotational operation of the motor assembly 810 so that the display panel 10 and the module cover 15 may be controlled to be unwound from the roller 143 (S91*a*). During the progress of S91*a*, the link 910*a*, 910*b* may pivot and lie down. At this time, the magnetic sensor 927*a* detects the positions of the first pivot magnet 925*a* and the second pivot magnet 925*b*, and the controller 1000 may calculate and compare the first link angle θs1 and the second link angle θs2 based on the position of the pivot magnet 925*a*, 925*b* (S91*b*).

If No at S91*b*, the link angles θs1 and θs2 are not matched with each other, and the controller 1000 may match the link angles θs1 and θs2 by adjusting the movement of the link 910*a*, 910*b* (S91*c*). After S91*c* or during S91*c*, the controller 1000 may return to the operation S91*b* while maintaining unfolding (S91*d*).

If Yes at S91*b*, the link angles θs1 and θs2 are not matched with each other, and the controller 1000 determines whether the link angles θs1 and θs2 are equal to or greater than the unfolding target angle θuf_target (S91*e*). If it is determined that the link angles θs1 and θs2 are not equal to or less than the unfolding target angle θuf_target, the controller 1000 may maintain unfolding (S91*d*). If it is determined that the link angles θs1 and θs2 are equal to or less than the unfolding target angle θuf_target, the controller 1000 may stop unfolding (S91*f*).

Accordingly, even if a mode is switched to the folding mode during the unfolding mode, the display panel 10 can be accurately moved to the position of bottom dead center. Further, even if a mode is switched to the unfolding mode during the folding mode, the display panel 10 can be accurately moved to the position of top dead center. In addition, the link angle θs1, θs2 is calculated and compared based on the magnet positions θm1, θm2 having a minimized error to individually control the movement of the link 910*a*, 910*b*, thereby minimizing a left-right height error of the display panel 10.

According to an aspect of the present disclosure, there is provided a display device including: a flexible display panel; a roller around which the display panel is wound or from which the display panel is unwound; a base which extends in a longitudinal direction of the roller, and in which the roller is rotatably installed; a link mount supported by the base; a link which is pivotally connected to the link mount, and lifts the display panel; a pivot magnet fixed to a pivot center of the link; a magnetic sensor which detects a position of the pivot magnet; and a controller which controls a movement of the link, wherein when a position section of the pivot magnet is divided into an effective position section Ieff and an error position section Ierr, a position of the pivot magnet is changed within the effective position section, wherein the controller calculates angle information formed by the link with respect to the base from position information of the pivot magnet, and adjusts movement of the link based on the angle information.

In addition, according to an aspect of the present disclosure, the magnetic sensor has a constant period, and outputs an electrical signal corresponding to the position of the pivot magnet, wherein the controller calculate position information of the pivot magnet based on the electrical signal, wherein the error position section is defined as a section within a position of pivot magnet at which the electrical signal indicates a minimum value and a maximum value±allowable error when the position of the pivot magnet changes by a minimum unit.

In addition, according to another aspect of the present disclosure, the magnetic sensor corresponds to the position of pivot magnet, and outputs an electrical signal having a waveform of 1 period or more and less than 4 periods per one rotation of the pivot magnet.

In addition, according to another aspect of the present disclosure, the magnetic sensor samples and outputs an electrical signal corresponding to the position of pivot magnet according to a constant period, wherein the controller calculates position information of the pivot magnet by grouping and averaging a plurality of sampling output values received from the magnetic sensor in a certain unit.

In addition, according to another aspect of the present disclosure, when an unfolding mode signal for unwinding the display panel from the roller is input, the controller adjusts the movement of the link so that the display panel is unwound from the roller, and stops movement of the link, when the magnetic sensor detects a signal corresponding to an unfolding target point, based on the angle information.

In addition, according to another aspect of the present disclosure, the link includes a right link and a left link, wherein the controller adjusts the movement of the link by comparing a first link angle formed by the right link with respect to the base with a second link angle formed by the left link with respect to the base, while adjusting the movement of the link according to the unfolding mode signal.

In addition, according to another aspect of the present disclosure, the controller matches the first link angle and the second link angle, by adjusting a pivot speed of the right link when the first link angle is smaller than the second link angle, and adjusting a pivot speed of the left link when the second link angle is smaller than the first link angle.

In addition, according to another aspect of the present disclosure, the controller adjusts the movement of the link so that the display panel is wound around the roller as much as the link is moved according to the unfolding mode signal, when a folding mode signal for winding the display panel around the roller is input while adjusting the movement of the link according to the unfolding mode signal.

In addition, according to another aspect of the present disclosure, when a folding mode signal for winding the display panel around the roller is input, the controller adjusts the movement of the link so that the display panel is wound around the roller, and stops the movement of the link, when the magnetic sensor detects a signal corresponding to a folding target point, based on the angle information.

In addition, according to another aspect of the present disclosure, the link includes a right link and a left link, wherein the controller adjusts the movement of the link by comparing a first link angle formed by the right link with respect to the base with a second link angle formed by the left link with respect to the base, while adjusting the movement of the link according to the folding mode signal.

In addition, according to another aspect of the present disclosure, the controller matches the first link angle and the second link angle, by adjusting a pivot speed of the right link when the first link angle is smaller than the second link angle, and adjusting a pivot speed of the left link when the second link angle is smaller than the first link angle.

In addition, according to another aspect of the present disclosure, the controller adjusts the movement of the link so that the display panel is unwound from the roller as much as the link is moved according to the folding mode signal, when an unfolding mode signal for unwinding the display panel from the roller is input while adjusting the movement of the link according to the folding mode signal.

In addition, according to another aspect of the present disclosure, the display device further includes a memory for storing a lookup table based on a relationship between the angle information and the position of the pivot magnet, wherein the controller calculates the angle information based on the lookup table.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
- a flexible display panel;
- a roller around which the display panel is wound or from which the display panel is unwound;
- a base which extends in a longitudinal direction of the roller, and in which the roller is rotatably installed;
- a link mount supported by the base;
- a link pivotably connected to the link mount, and arranged to lift the display panel;
- a pivot magnet fixed to a pivot center of the link and arranged to rotate along with the link;
- a magnetic sensor detecting a position of the pivot magnet; and
- a controller which controls a movement of the link which changes as the pivot magnet rotates,
- wherein the controller calculates angle information formed by the link with respect to the base from position information of the pivot magnet, and adjusts the movement of the link based on the angle information.

2. The display device of claim 1,
- wherein the magnetic sensor has a constant period, and outputs an electrical signal corresponding to the position of the pivot magnet,
- wherein the controller calculates the position information of the pivot magnet based on the electrical signal.

3. The display device of claim 1, wherein a position of the magnetic sensor corresponds to the position of the pivot magnet, and the magnetic sensor outputs an electrical signal having a waveform of 1 period or more and less than 4 periods per one rotation of the pivot magnet.

4. The display device of claim 1,
- wherein the magnetic sensor samples and outputs an electrical signal corresponding to the position of the pivot magnet according to a constant period,
- wherein the controller calculates the position information of the pivot magnet by grouping and averaging a plurality of sampling output values received from the magnetic sensor in a certain unit.

5. The display device of claim 1,
- wherein, when an unfolding mode signal for unwinding the display panel from the roller is input, the controller;
- adjusts the movement of the link so that the display panel is unwound from the roller, and stops the movement of the link, when the magnetic sensor detects a signal corresponding to an unfolding target point, based on the angle information.

6. The display device of claim 5, wherein the link comprises a right link and a left link, and wherein the controller adjusts the movement of the link by comparing a first link angle formed by the right link with respect to the base with a second link angle formed by the left link with respect to the base, while adjusting the movement of the link according to the unfolding mode signal.

7. The display device of claim 6, wherein the controller matches the first link angle and the second link angle by:

adjusting a pivot speed of the right link when the first link angle is smaller than the second link angle, and adjusting a pivot speed of the left link when the second link angle is smaller than the first link angle.

8. The display device of claim 5, wherein the controller adjusts the movement of the link so that the display panel is wound around the roller as much as the link is moved according to the unfolding mode signal, when a folding mode signal for winding the display panel around the roller is input while adjusting the movement of the link according to the unfolding mode signal.

9. The display device of claim 1, wherein, when a folding mode signal for winding the display panel around the roller is input, the controller;

adjusts the movement of the link so that the display panel is wound around the roller, and stops the movement of the link, when the magnetic sensor detects a signal corresponding to a folding target point, based on the angle information.

10. The display device of claim 9, wherein the link comprises a right link and a left link, and wherein the controller adjusts the movement of the link by comparing a first link angle formed by the right link with respect to the base with a second link angle formed by the left link with respect to the base, while adjusting the movement of the link according to the folding mode signal.

11. The display device of claim 10, wherein the controller matches the first link angle and the second link angle, by:

adjusting a pivot speed of the right link when the first link angle is smaller than the second link angle, and adjusting a pivot speed of the left link when the second link angle is smaller than the first link angle.

12. The display device of claim 9, wherein the controller adjusts the movement of the link so that the display panel is unwound from the roller as much as the link is moved according to the folding mode signal, when an unfolding mode signal for unwinding the display panel from the roller is input while adjusting the movement of the link according to the folding mode signal.

13. The display device of claim 1, further comprising a memory for storing a lookup table based on a relationship between the angle information and the position of the pivot magnet, wherein the controller calculates the angle information based on the lookup table.

14. The display device of claim 1, wherein the pivot magnet comprises a first pole and a second pole with opposite polarities, and wherein the first pole and the second pole are next to each other and each of the first pole and the second pole forms a semicircle.

15. The display device of claim 14, wherein the link is elongated and has one end pivotably coupled to the link mount, and wherein a longitudinal axis of the link:

extends along a direction intersecting with a boundary between the first pole and the second pole, and forms an acute angle or an obtuse angle with respect to the boundary.

16. The display device of claim 15, wherein the link is pivotable within a range of 0 to 90 degrees.

* * * * *